(12) United States Patent
Trumper et al.

(10) Patent No.: US 11,296,587 B2
(45) Date of Patent: Apr. 5, 2022

(54) HIGH FORCE AND LOW NOISE LINEAR FINE-TOOTH MOTOR

(71) Applicant: Massachusetts Institute of Technology, Cambridge, MA (US)

(72) Inventors: David L. Trumper, Plaistow, NH (US); Jun Young Yoon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/341,759

(22) PCT Filed: Nov. 30, 2017

(86) PCT No.: PCT/US2017/063980
§ 371 (c)(1),
(2) Date: Apr. 12, 2019

(87) PCT Pub. No.: WO2018/102561
PCT Pub. Date: Jun. 7, 2018

(65) Prior Publication Data
US 2020/0266692 A1     Aug. 20, 2020

Related U.S. Application Data

(60) Provisional application No. 62/428,239, filed on Nov. 30, 2016.

(51) Int. Cl.
*H02K 41/03*     (2006.01)
*H02K 1/34*     (2006.01)
(Continued)

(52) U.S. Cl.
CPC ............ *H02K 41/031* (2013.01); *H02K 1/34* (2013.01); *H02K 3/28* (2013.01); *H02K 7/08* (2013.01);
(Continued)

(58) Field of Classification Search
CPC .... H02K 41/031; H02K 1/34; H02K 2213/03; H02K 7/08; H02K 2201/03; H02K 3/28; H02K 2201/06
(Continued)

(56) References Cited

U.S. PATENT DOCUMENTS 3,787,716 A * 1/1974 La France ................ B62D 1/28
318/135
3,851,231 A * 11/1974 Eastham .............. H02K 41/025
318/135
(Continued)

FOREIGN PATENT DOCUMENTS

EP     0 949 748 A1     10/1999
EP     1 322 027 A1     6/2003
(Continued)

OTHER PUBLICATIONS

PCT Search Report of the ISA for PCT Appl. No. PCT/US2017/063980 dated Mar. 1, 2018; 6 pages.
(Continued)

*Primary Examiner* — John K Kim
(74) *Attorney, Agent, or Firm* — Daly, Crowley, Mofford & Durkee, LLP

(57) ABSTRACT

High force and low noise linear fine-tooth motors are described herein. Such motors can include armatures having fine teeth separated by narrow slots such that a ratio of a pitch between teeth and a pitch between permanent magnet poles is less than that of a conventional iron-core linear motor. In one embodiment, such a linear motor can include a first component having an armature including a plurality of iron cores surrounded by coil windings, and a second component having a plurality of permanent magnets with alternating polarity. The plurality of iron cores can be spaced apart from one another by an iron core pitch distance and the plurality of permanent magnets can be spaced apart from
(Continued)

one another by a permanent magnet pole pitch distance, and a ratio of the iron core pitch to the magnetic pole pitch can be less than 1.33.

28 Claims, 48 Drawing Sheets

(51) Int. Cl.
  *H02K 3/28* (2006.01)
  *H02K 7/08* (2006.01)
(52) U.S. Cl.
  CPC ..... *H02K 2201/03* (2013.01); *H02K 2201/06* (2013.01); *H02K 2213/03* (2013.01)
(58) Field of Classification Search
  USPC ..................................................... 310/12.25
  See application file for complete search history.

(56) References Cited

U.S. PATENT DOCUMENTS

| | | | | |
|---|---|---|---|---|
| 4,450,396 | A * | 5/1984 | Thornton | H02K 29/12 318/696 |
| 4,868,431 | A * | 9/1989 | Karita | H02K 41/03 310/12.24 |
| 5,231,336 | A * | 7/1993 | van Namen | F16F 7/1011 318/128 |
| 6,853,105 | B2 * | 2/2005 | Nakano | H02K 29/03 310/156.47 |
| 10,177,627 | B2 * | 1/2019 | Noh | F04D 13/064 |
| 2001/0010433 | A1 * | 8/2001 | Watanabe | H02K 41/031 310/12.24 |
| 2003/0117026 | A1 * | 6/2003 | Korenaga | H02K 41/031 310/12.26 |
| 2005/0173991 | A1 | 8/2005 | Watarai et al. | |
| 2005/0242675 | A1 * | 11/2005 | Thornton | H02K 1/08 310/166 |
| 2006/0076839 | A1 | 4/2006 | Kawai | |
| 2006/0162650 | A1 * | 7/2006 | Kido | H01L 51/0004 118/305 |
| 2008/0001483 | A1 * | 1/2008 | Kitamura | H02K 41/03 310/12.04 |
| 2011/0219989 | A1 * | 9/2011 | Yugawa | H02K 41/03 108/20 |
| 2012/0049657 | A1 * | 3/2012 | Shikayama | H02K 41/03 310/12.25 |
| 2012/0223599 | A1 * | 9/2012 | Nakamura | H02K 15/12 310/45 |
| 2014/0035393 | A1 * | 2/2014 | Chung | H02K 1/14 310/12.15 |
| 2015/0028699 | A1 | 1/2015 | Hofstetter et al. | |
| 2016/0149477 | A1 * | 5/2016 | Nagata | F04B 35/045 417/416 |

FOREIGN PATENT DOCUMENTS

| | | |
|---|---|---|
| EP | 2 634 913 A1 | 9/2013 |
| WO | WO 03/029651 A2 | 4/2003 |
| WO | WO 2013/025170 A1 | 2/2013 |

OTHER PUBLICATIONS

PCT Written Opinion of the ISA for PCT Appl. No. PCT/US2017/063980 dated Mar. 1, 2018; 9 pages.
International Preliminary Report on Patentability dated Jun. 13, 2019 for International Application No. PCT/US2017/063980; 9 Pages.

* cited by examiner

FIG. 9
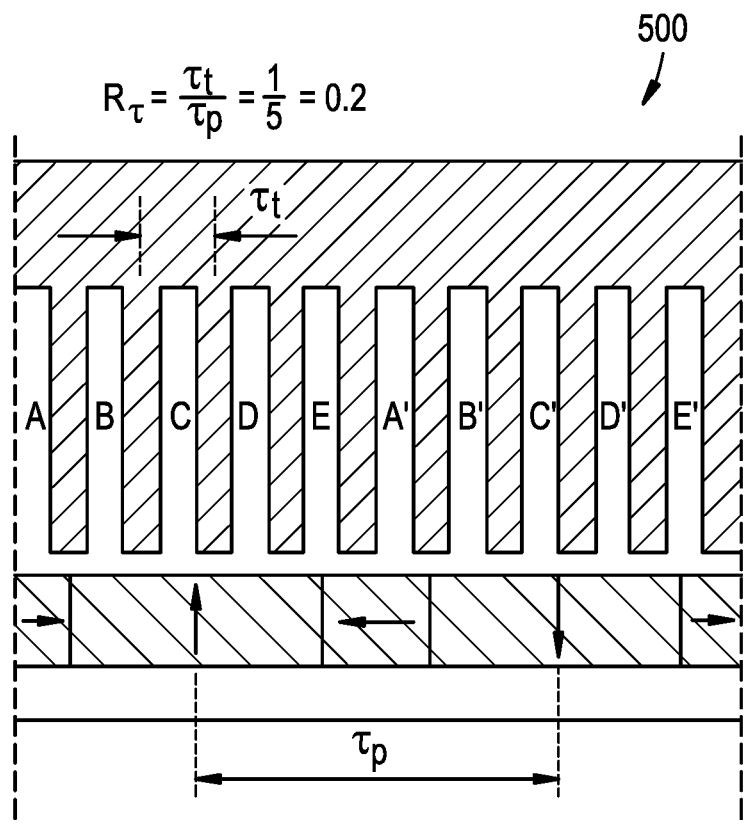
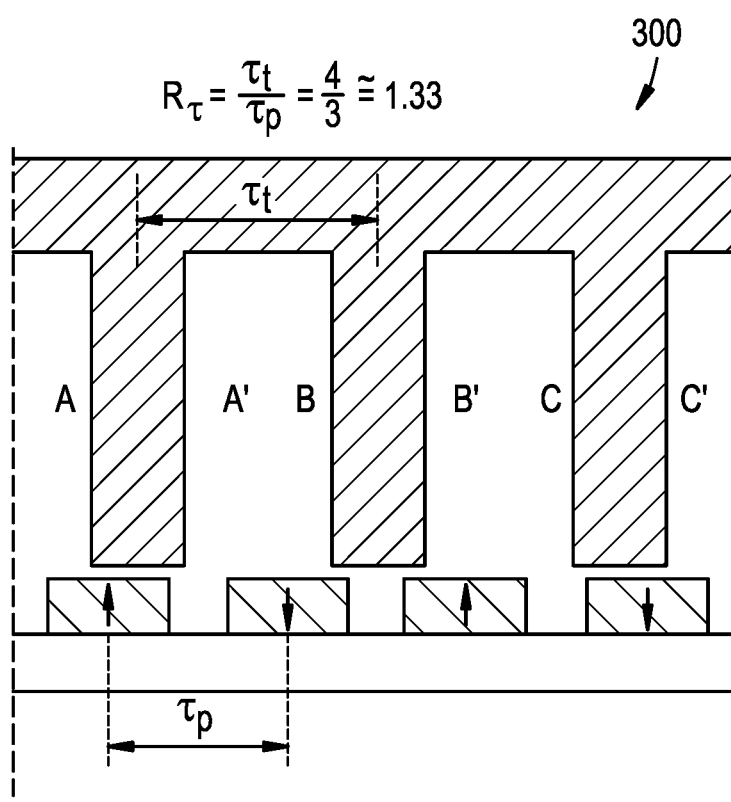

| Fine-Tooth Motor | Input Variables | | | | | | | Output Parameters | | Comparing Parameters |
|---|---|---|---|---|---|---|---|---|---|---|
| | $W_t=W_s$ | $R_{slot}$ | $PM_{thick}$ | N | AWG | Current, I[A] | Common | $P_{diss}$[W] | $J_{max}$ [A/mm] | |
| Case 1 | 1.5mm | 10 | 1 | 42 | 23 | [0,5,10,20,3 0,40,50,100] | | 2.120 $I^2$ | 3.878I | - Shear stress [N/mm$^2$] |
| Case 2 | 1.8mm | 10 | 1 | 42 | 21 | [0,5,10,20,3 0,40,50,100] | - $N_{slot}$=5 -$f_{magnet}$=07 - Amp-turns - N40 magnets - Halbach array - Skewed PM - Gap:500um | 1.416 $I^2$ | 2.440I | -Final stage accel. [m/s$^2$] - Force Density [N/kg] |
| Case 3 | 1.8mm | 15 | 1 | 42x1.5 =63 | 21 | [0,5,10,20,3 0,40,50,100] /1.5 | | 2.124 $I^2$ | 2.440I | |
| Case 4 | 1.8mm | 20 | 1 | 42x2= 84 | 21 | [0,5,10,20,3 0,40,50,100] /2 | | 2.832 $I^2$ | 2.440I | |
| Case 5 | 2.0mm | 10 | 1 | 42 | 20 | [0,5,10,20,3 0,40,50,100] | | 1.167 $I^2$ | 1.930I | |
| Case 6 | 2.5mm | 10 | 1 | 42 | 18 | [0,5,10,20,3 0,40,50,100] | | 0.803 $I^2$ | 1.214I | Limitation Factors |
| Case 7 | 2.5mm | 10 | 1 | 42x2= 84 | 21 | [0,5,10,20,3 0,40,50,100] /2 | | 3.220 $I^2$ | 2.440I | -RMS current density, $J_{rms}$ due to heat |
| Case 8 | 2.0mm | 15 | 1 | 42x1.5 =63 | 20 | [0,5,10,20,3 0,40,50,100] /1.5 | - $N_{slot}$=5 -$f_{magnet}$=0.7 - Amp-turns - N40 magnets - Halbach array - Skewed PM - Gap:250um | 1.751 $I^2$ | 1.930I | -Current amplitude due to power amplifier |
| Case 9 | 2.0mm | 15 | 0.7 | 42x1.5 =63 | 20 | [0,5,10,20,3 0,40,50,100] /1.5 | | 1.751 $I^2$ | 1.930I | -Total power due to wall power limit |
| Case 10 | 2.0mm | 15 | 0.5 | 42x1.5 =63 | 20 | [0,5,10,20,3 0,40,50,100] /1.5 | | 1.751 $I^2$ | 1.930I | |
| Case 11 | 2.0mm | 15 | 0.3 | 42x1.5 =63 | 20 | [0,5,10,20,3 0,40,50,100] /1.5 | | 1.751 $I^2$ | 1.930I | |
| Tecnotion Motor | | | | 141 | SWG 22 | | - Skewed PM - Gap:500 or 250um | 2.580 $I^2$ | 2.520I | |

| Drawing Name | Lamination |
|---|---|
| Material | M19 |
| Quantity | 2 Stators |
| Scale | 1:3 (unless otherwise specified) |
| Dimension | Millimeters (Tolerance: +/-0.05mm) |
| Note on Lamination | -Lamination Thickness: 350 micrometers<br>-Number of slot: 180 |
| Stack Width | 52mm +/- 1 Lamination |

Filet of R0 .20 is typical
for all 10 edges
for each mounting slot

DETAIL B
SCALE 5 :1

R1
(TYP for 180 slots)
DETAIL C
SCALE 2 :1

TYP FOR ADDITIONAL 8 MOUNTING SLOTS
FIRST MOUNTING SLOT IS DISTANCED BY 24mm FROM REFERENCE 'R'
EACH MOUNTING SLOTS ARE DISTANCED BY 85mm (AS DESCRIBED IN PAGE#1)

FIG. 24A
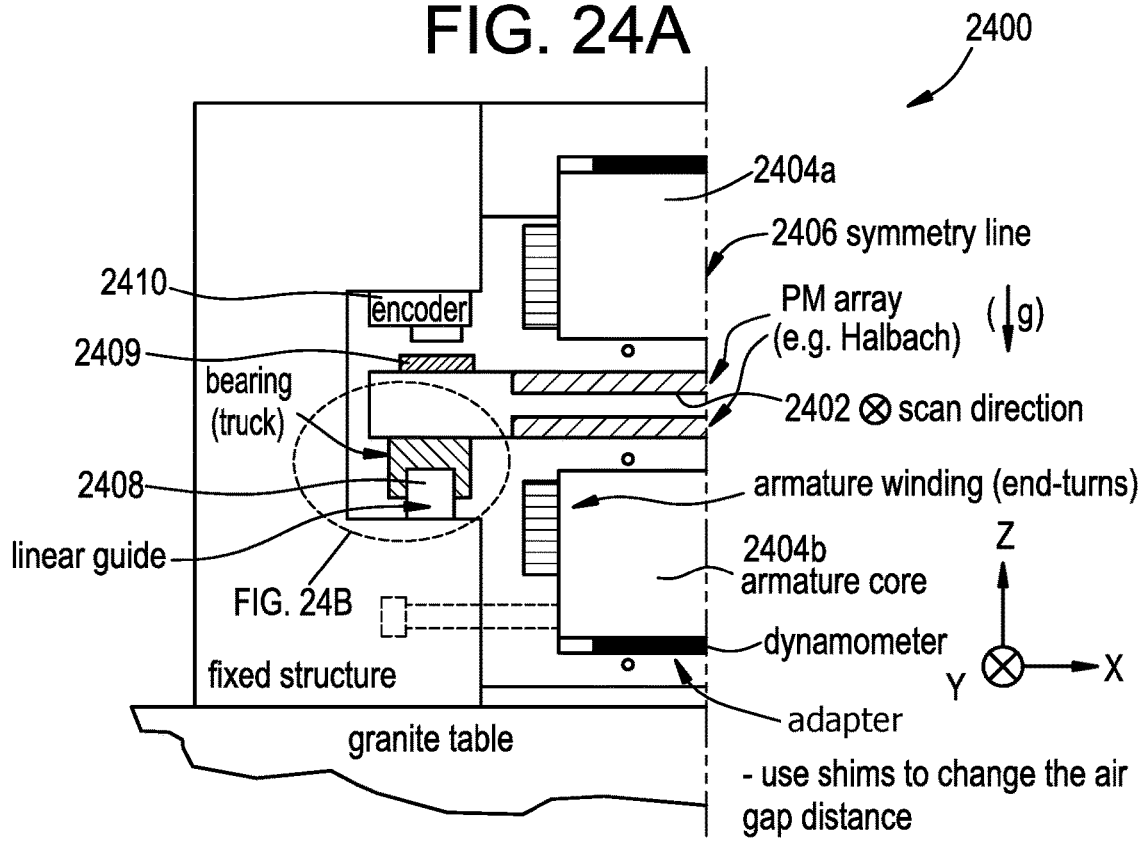
FIG. 24B
FIG. 24C
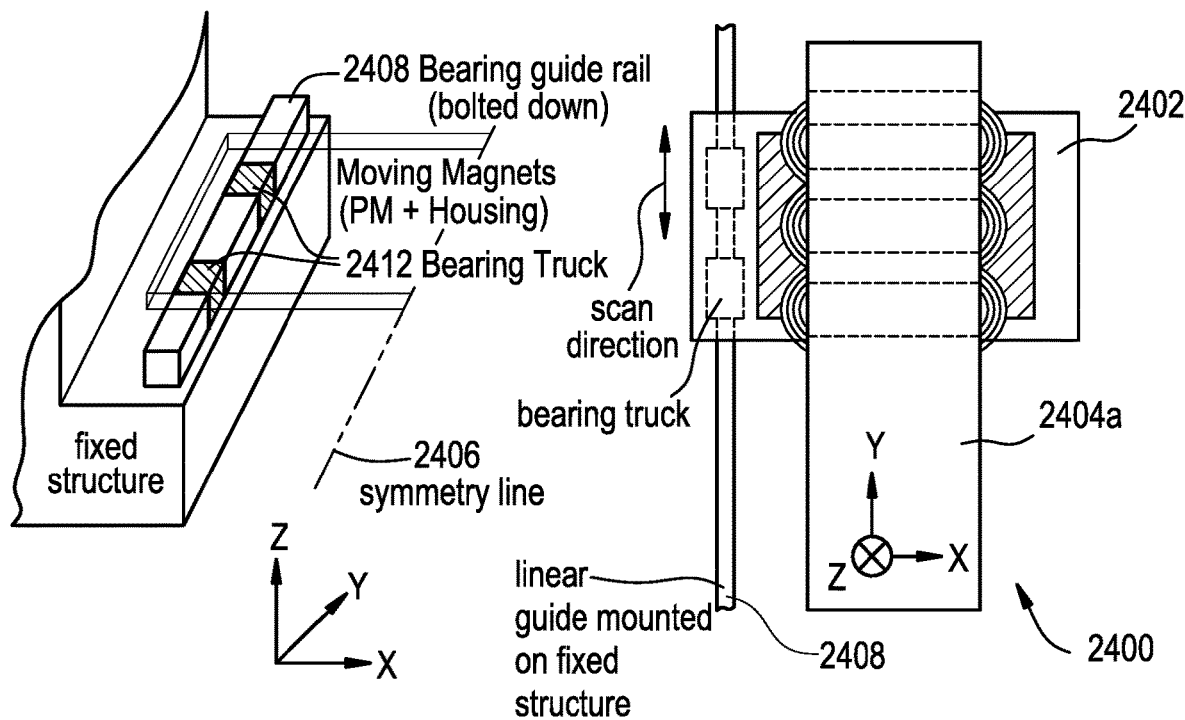

FIG. 41
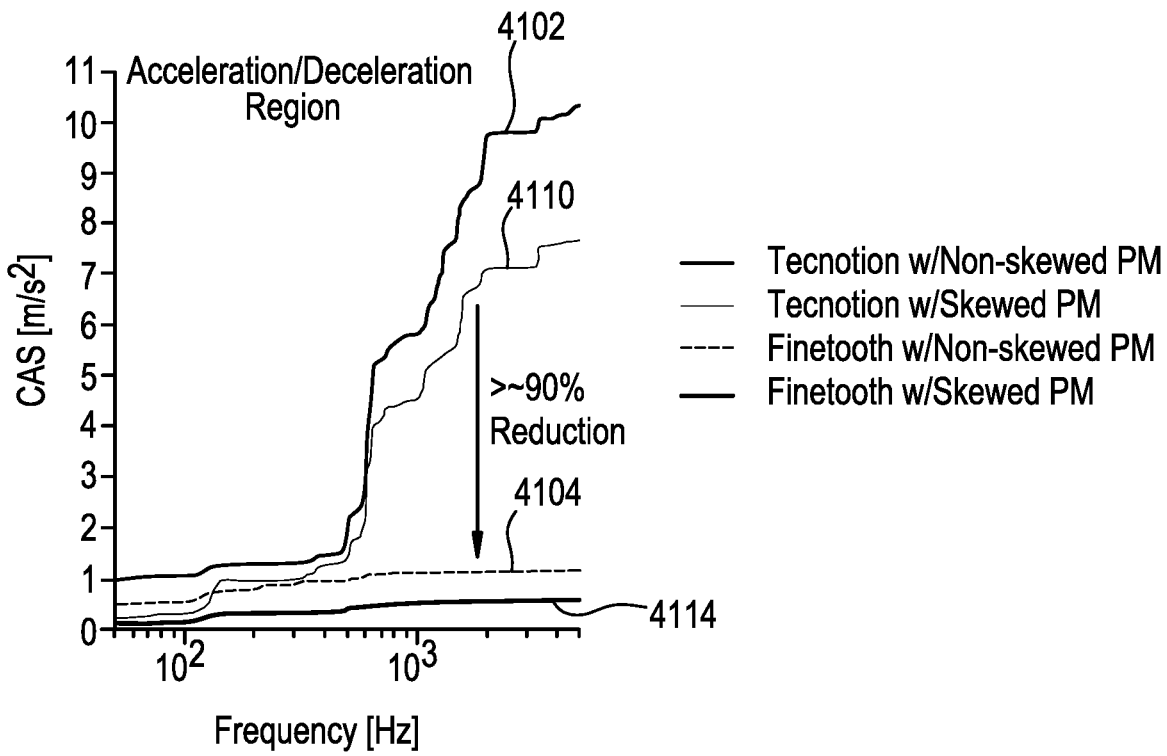
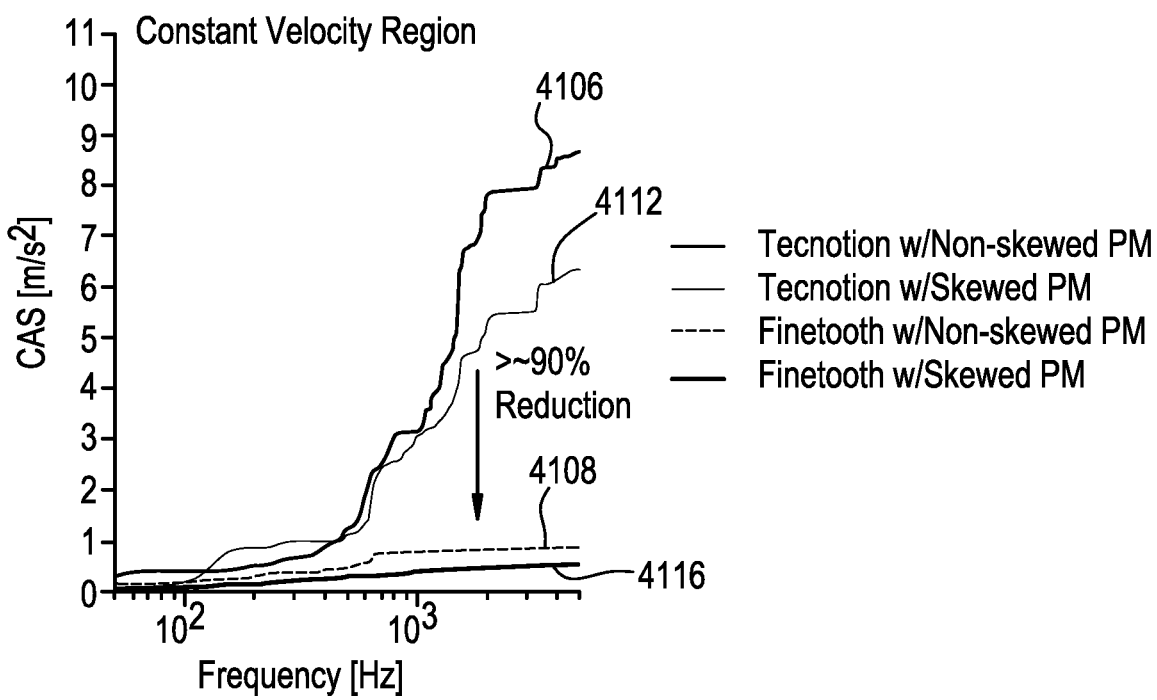

FIG. 42
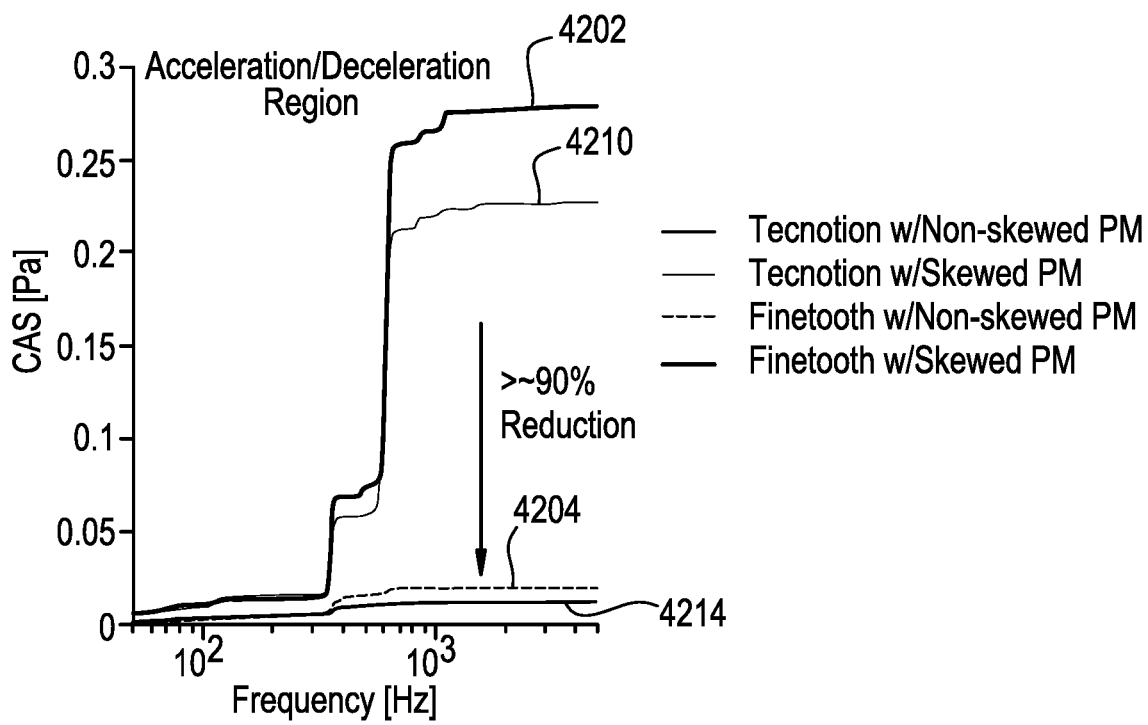
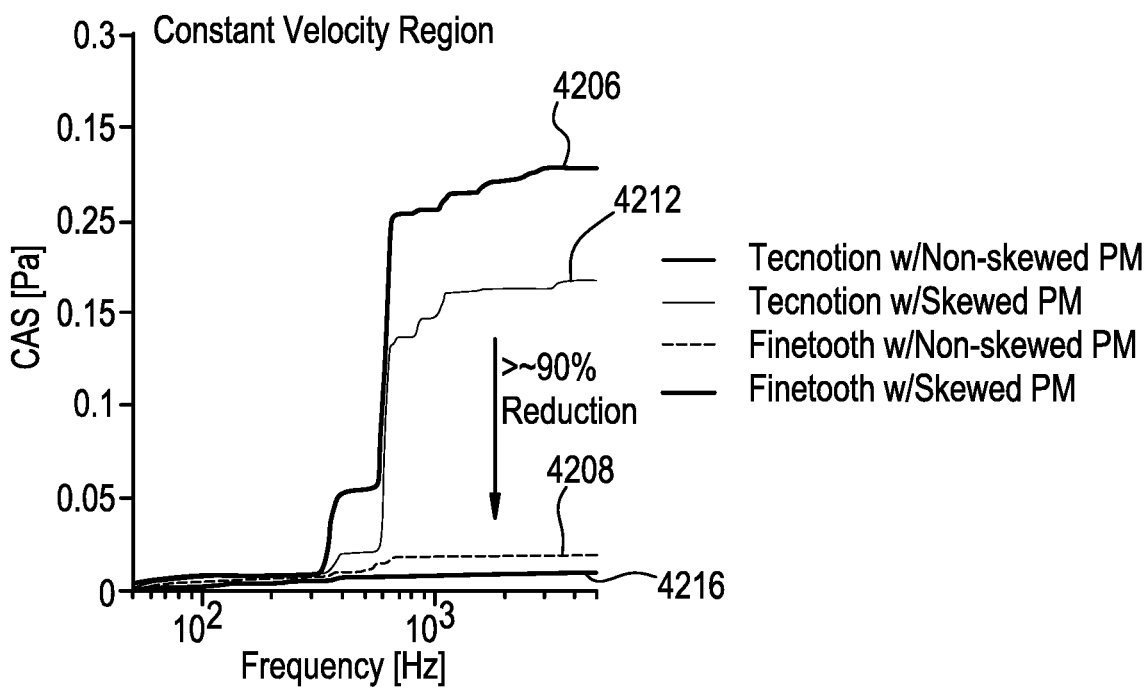

FIG. 47
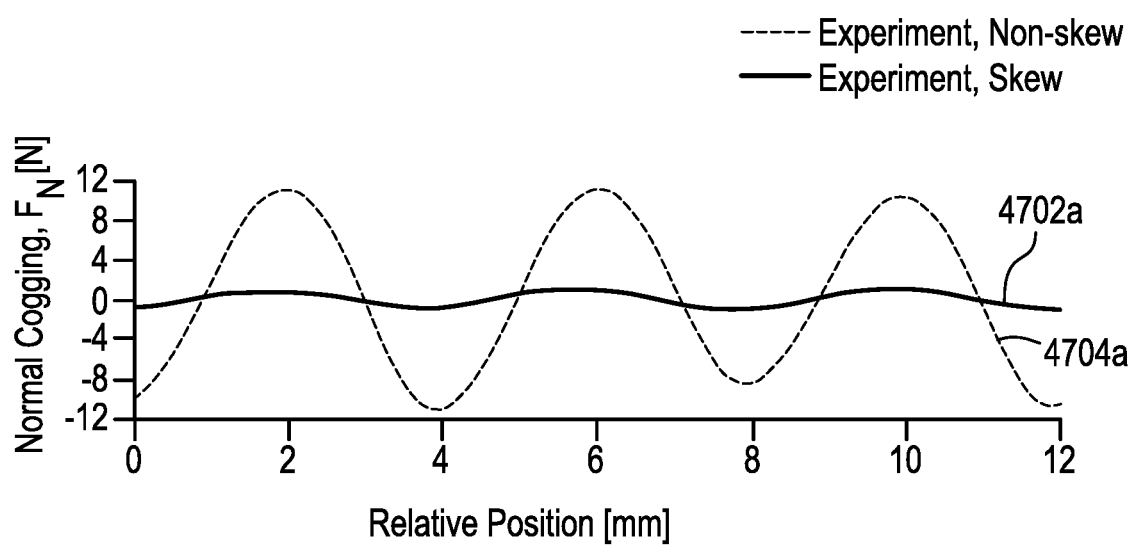
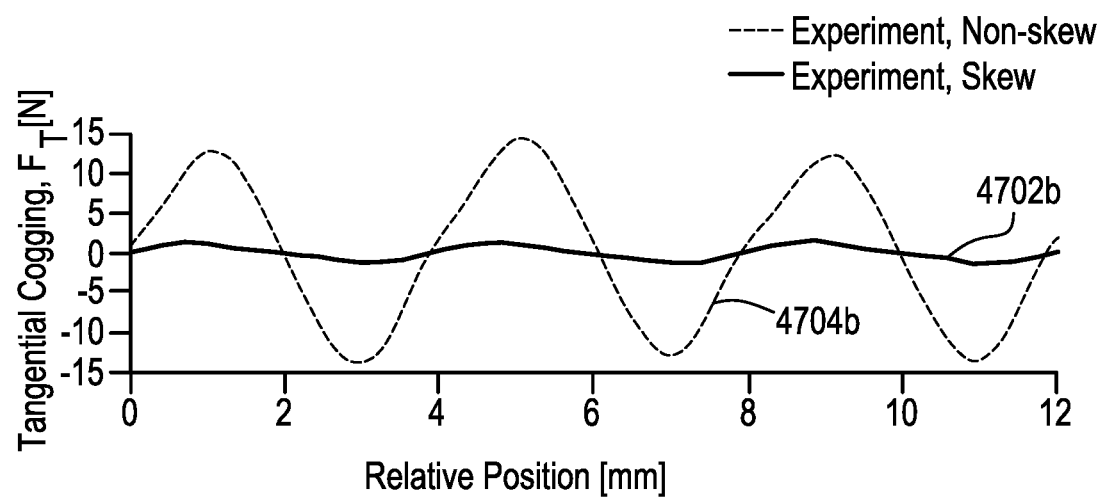

HIGH FORCE AND LOW NOISE LINEAR FINE-TOOTH MOTOR

CROSS REFERENCE TO RELATED APPLICATIONS

This application is a U.S. National Stage of PCT application PCT/US2017/063980 filed in the English language on Nov. 30, 2017, and entitled "HIGH FORCE AND LOW NOISE LINEAR FINE-TOOTH MOTOR," which claims the benefit under 35 U.S.C. § 119 of provisional application No. 62/428,239 filed Nov. 30, 2016, which application is hereby incorporated herein by reference.

FIELD

This disclosure relates generally to electric machines and, more particularly, to iron-core permanent magnet linear motors.

BACKGROUND

Acoustic noise and associated vibration are potentially troubling characteristics of electric machines including variable-reluctance motors, induction machines, and permanent magnet synchronous motors. The severity of this problem depends on the types of motors and their applications. One exemplary case where the vibro-acoustic noise becomes especially detrimental is iron-core linear motors operating at high acceleration and targeted for high accuracy applications. Iron-core permanent magnet linear motors have the potential for high force density, but such motors can have a problem managing large normal and tangential forces acting between the permanent magnets and the iron. These forces can introduce vibrations and acoustic noise. The acoustic noise and associated vibration of linear iron-core permanent magnet motors can be caused by high frequency force harmonics vibrating the moving stage. Such stage vibration can be transmitted through the system structure and can also radiate as acoustic noise, thereby disturbing precision machines.

Vibro-acoustic noise issues of other machines, such as rotary motors, have been researched over the years, but not as much work has been done for linear machines whose major causes of noise generation can be different from rotary motors and other machines due to structural differences. For example, in rotary motors attractive forces between the rotor and stator, as well as their fluctuations in the radial direction, are balanced and canceled, and therefore need not be considered in motor design. In linear motors, such forces are not balanced and force fluctuation normal to the direction of travel can cause vibro-acoustic noise. Further, in rotary permanent magnet motors, the magnet array is periodic and endless such that there is no start or end point, and therefore no effect on movement. Linear motors have finite lengths of both stationary and moving components, each of which can have end effects in the moving direction. These end effects can contribute to force ripple in both moving and normal directions and must be taken into account when designing a linear motor.

One example where the effects of vibro-acoustic noise in linear motors is problematic is in the semiconductor industry where printing chips on silicon wafers using photo-lithography is an essential process. Pursuing manufacture of denser integrated circuits (ICs) at higher rates, lithography machine technology has advanced rapidly, including following Moore's law of doubling the number of transistors per square inch on ICs every two years. The industry has also demanded faster production speeds in addition to increased density. Lithography scanners often include a linear motor stage that cycles to carry a wafer or photo-mask, also called a reticle, at tens of G's to achieve high throughput while keeping the position error extremely low, e.g., within less than a nanometer.

There have been efforts to increase the reticle stage acceleration further by replacing iron-less Lorentz motors with iron-core permanent magnet motors since they produce higher shear stress (i.e., force divided by force-generating area) and higher force density (i.e., ratio of force to moving mass). When conventional linear iron-core motors are used to cycle the reticle stage, however, it can be observed that such motors emit a significant amount of noise, which is transmitted in both structural- and air-borne pathways. Such vibrations disturb other components of the system and deteriorate system accuracy and performance. Thus, current lithography machines typically use iron-less Lorentz actuators for the reticle stage. In the pursuit of smaller chip size and faster speed of production, next generation lithography machines (e.g., Extreme Ultra-Violet Lithography machines) require higher acceleration than the current generation scanners (e.g., Deep Ultra-Violet Lithography) with even tighter accuracy requirements.

Lithography is just one example of an application requiring high throughput precision linear movement. Other exemplary industries that could benefit from similar enhancement of linear motor performance can include high speed transportation (e.g., trains, etc.), conveyance systems, cutting machines (e.g., laser cutters, waterjets, etc.), printers, additive manufacturing systems, robotics, and any of a variety of other applications requiring high speed/acceleration and high accuracy/low vibro-acoustic noise at the same time.

Accordingly, there is a need for a new high force linear motor that is also quiet. Moreover, there is a need for iron-core permanent magnet linear motors that can deliver enhanced shear stress density (i.e., high force performance) while minimizing vibro-acoustic noise in comparison to conventional iron-core linear motors. By simultaneously providing high force and low noise performance, such a motor could help enable higher throughput without compromising required system accuracy in a variety of applications.

SUMMARY

The present disclosure generally provides improved linear motors having high force performance and low vibro-acoustic noise. More particularly, described herein are various iron-core permanent magnet linear synchronous motors that provide enhanced force/acceleration and reduced vibro-acoustic noise in comparison to conventional iron-core permanent magnet linear motors. The motors described herein are generally referred to as fine-tooth linear motors due to the use of armatures having a plurality of fine teeth separated by narrow slots such that a ratio of a pitch distance between iron-core teeth and a pitch distance between permanent magnet poles is less than that of a conventional iron-core linear motor. In certain embodiments, the motors described herein can also include additional phases in the windings around the iron-core teeth (e.g., more than the three phases of conventional iron-core linear motors) and can make use of various permanent magnet arrangements, such as a Halbach array of permanent magnets aligned or skewed relative to the iron-core teeth.

The fine-tooth motors described herein can generate reduced force harmonics, and thereby emit less noise and vibration. Fine teeth densely placed together can produce a smoother stator magneto-motive force (MMF) with less high frequency harmonics. Further, using additional features, such as a Halbach permanent magnet array, can not only produce a smoother rotor MMF with less high harmonics, but also generate higher force due to the enhanced magnetic field created by such an array on the side of the working air-gap.

The fine-tooth motors described herein can also generate higher thrust than conventional motors. This is because magnetic force is generated from areas where the iron-core teeth ends are engaged with magnets, and the fine-tooth motors described herein structurally contain more of such areas than a conventional motor, thereby allowing greater force generation.

Cogging forces, which are force fluctuations caused by the magnetic interaction between iron-core teeth and permanent magnets, can also be reduced to further minimize vibrations and acoustic noises. Cogging forces can be minimized, for example, by skewing either the magnets or the iron-core teeth to cover one full tooth pitch. The small tooth pitch of the fine-tooth motors described herein can allow reduced cogging with only slightly skewed magnets, which advantageously minimizes cogging forces without compromising thrust. More significant skewing is required in conventional motors having larger tooth pitch and can significantly reduce the thrust created by the motor.

These and other features of the fine-tooth motors described herein can significantly reduce vibro-acoustic noise of linear iron-core motors while substantially enhancing the shear stress density in comparison to conventional "3-4" combination iron-core motors that span four permanent magnets with three iron-core teeth. For example, the overall acoustic noise level in Pascals can be reduced by 93% during an acceleration period with non-skewed magnets. In terms of sound pressure level (SPL), this is a significant noise reduction from 83 dB to 60 dB. Cogging-driven and velocity dependent noise, which is dominant in constant velocity regions, can also be significantly reduced. For example, the fine-tooth motor designs described herein can reduce cogging forces by a factor of 10-to-1 when using skewed magnets, thereby reducing cogging-driven acoustic noise by 90% in Pascals. Still further, the fine-tooth motors described herein can exhibit significant shear stress improvements of 28% (from 0.090 N/mm² to 0.115 N/mm²) at a practical power level of 10 W/mm and 84% (from 0.167 N/mm² to 0.308 N/mm²) at an ultimate RMS (root mean square) current density limit relative to a conventional motor.

In one aspect, a linear motor is provided that can include a first component having an armature including a plurality of iron cores surrounded by coil windings, as well as a second component having a plurality of permanent magnets with alternating polarity. The first component and the second component can be adjacent and configured to translate relative to one another along a movement axis. Further, the plurality of iron cores can be spaced apart from one another by an iron core pitch distance and the plurality of permanent magnets can be spaced apart from one another by a permanent magnet pole pitch distance. Still further, a ratio of the iron core pitch to the magnetic pole pitch can be less than 1.33.

The devices and methods described herein can have a number of additional features and/or variations, all of which are within the scope of the present disclosure. In some embodiments, for example, the above-described ratio of the iron core pitch to the magnetic pole pitch can be less than about 1. In still other embodiments, the ratio can be less than about 0.5. For example, in one embodiment, the ratio can be about 0.2.

A variety of configurations of moving and stationary components can be employed in the claimed linear motor. For example, in some embodiments, the first component can be stationary and the second component can be configured to translate relative to the first component. In other embodiments, the second component can be stationary and the first component can be configured to translate relative to the second component.

In addition, there are a variety of configurations of the relative lengths of the first and second components. In some embodiments, the first component can have a length extending along the movement axis that is greater than a length of the second component extending along the movement axis. In other embodiments, the second component can have a length extending along the movement axis that is greater than a length of the first component extending along the movement axis.

The plurality of permanent magnets of the second component can have a variety of configurations. In some embodiments, the plurality of permanent magnets can be arranged in a Halbach array. Further, in some embodiments a longitudinal axis of each of the plurality of permanent magnets can be normal to the movement axis. In other embodiments, a longitudinal axis of each of the plurality of permanent magnets can be oblique to the movement axis. In certain embodiments, for example, an angle ($\alpha$) between the longitudinal axis of each permanent magnet and the movement axis is based on the iron core pitch distance ($\tau_t$) and a depth of the armature (D) such that:

$$\alpha = 90 - \tan^{-1}\frac{\tau_t}{D}$$

In some embodiments, an angle between the longitudinal axis of each permanent magnet and the movement axis can be between about 80 degrees and about 90 degrees. For example, in one embodiment, the angle can be about 85.6 degrees.

In some embodiments, the linear motor can further include a power source coupled to the coil windings and configured to selectively energize the coil windings to cause relative movement of the first component and the second component. In some embodiments, the coil windings can include a plurality of separate phase windings. Further, in some embodiments the coil windings can include greater than three phase windings. For example, in one embodiment the coil windings can include five phase windings.

In certain embodiments, the plurality of permanent magnets can be disposed on a surface of the second component, and the first component and the second component can be arranged such that the surface of the second component having the plurality of permanent magnets faces the armature of the first component. In some embodiments, such a linear motor can further include a third component having a second armature including a plurality of iron cores surrounded by coil windings, as well as a second plurality of permanent magnets with alternating polarity disposed on an opposite surface of the second component from the surface having the plurality of permanent magnets. The second component can be disposed between the first component and the third component such that each of the armatures faces one of the plurality of permanent magnets disposed on the second component. In another embodiment, a linear motor can further include a third component having a second plurality of permanent magnets with alternating polarity disposed on a surface thereof, and the first component can be disposed between the second component and the third component.

In another aspect, a method of reducing acoustic noise and vibration in a linear motor is provided that can include providing a first component having a plurality of iron cores surrounded by coil windings, as well as providing a second component adjacent to the first component, where the second component has a plurality of permanent magnets with alternating polarity. The method can further include selectively energizing the coil windings to cause relative translation of the first component and the second component along a movement axis. Further, the plurality of iron cores can be spaced apart from one another by an iron core pitch distance and the plurality of permanent magnets can be spaced apart from one another by a permanent magnet pole pitch distance, and a ratio of the iron core pitch to the magnetic pole pitch can be less than 1.33.

As with the devices described above, a number of variations and additional features are possible. For example, in some embodiments the above-described ratio of the iron core pitch to the magnetic pole pitch can be about 0.2. In certain embodiments, the method can further include skewing each of the plurality of permanent magnets such that a longitudinal axis of each permanent magnet is oblique to the movement axis. In some embodiments, an angle between the longitudinal axis of each permanent magnet and the movement axis can be about 85.6 degrees.

In some embodiments, the method can further include providing a second plurality of permanent magnets with alternating polarity on an opposite side of the second component from the plurality of permanent magnets, as well as positioning a third component having a second plurality of iron cores surrounded by coil windings such that the second component is disposed between the first component and the third component and each of the armatures faces one of the plurality of permanent magnets of the second component to balance forces normal to the movement axis.

In still other embodiments, the method can further include providing a third component having a second plurality of permanent magnets with alternating polarity, as well as positioning the third component such that the first component is disposed between the second component and the third component.

Any of the features or variations described above can be applied to any particular aspect or embodiment of the disclosure in a number of different combinations. The absence of explicit recitation of any particular combination is due solely to the avoidance of repetition in this summary.

BRIEF DESCRIPTION OF THE DRAWINGS

FIG. 9 is an illustration comparing ratios of iron-core tooth pitch to permanent magnet pole pitch for one embodiment of a fine-tooth iron-core permanent magnet linear motor and a conventional 3-4 combination iron-core linear motor;
FIG. 11A. is a table which shows various cases of fine-tooth motor design parameters;
FIG. 24A is a front view illustration of one embodiment of a fine-tooth iron-core permanent magnet linear motor having a moving short magnet and a stationary long coil;

FIG. 24B is a perspective detail view of the fine-tooth linear motor of FIG. 24A;

FIG. 24C is a top view of the fine-tooth linear motor of FIG. 24A;

FIG. 41 is a plot of cumulative amplitude spectrum (CAS) of accelerometer measurements for one embodiment of a conventional iron-core linear motor and one embodiment of a fine-tooth iron-core permanent magnet linear motor during both acceleration and constant velocity regions;

FIG. 42 is a plot of cumulative amplitude spectrum (CAS) of microphone measurements for one embodiment of a conventional iron-core linear motor and one embodiment of a fine-tooth iron-core permanent magnet linear motor during both acceleration and constant velocity regions;

FIG. 47 is a plot of cogging force measurements for one embodiment of a fine-tooth iron-core permanent magnet linear motor with non-skewed magnets and one embodiment of a fine-tooth iron-core permanent magnet linear motor with skewed magnets.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present application. Further, in the present disclosure, like-numbered components of the embodiments generally have similar features, and thus within a particular embodiment each feature of each like-numbered component is not necessarily fully elaborated upon. To the extent features are described herein as being a "first feature" or a "second feature," such numerical ordering is generally arbitrary, and thus such numbering can be interchangeable.

As noted above, acoustic noise and associated vibration are potentially troubling characteristics of electric machines including permanent magnet linear synchronous motors. Acoustic noise and vibration of electric motors can be generated by many causes including magnetic, mechanical, electrical, and fluid dynamical sources. The high force and low noise linear motors described herein can significantly reduce vibro-acoustic noise resulting from some of the strongest of these noise sources, including magnetic force harmonics, cogging force, and mechanical dynamics of a rotor (or moving stage). Experimental studies of vibro-acoustic noise show that these noise sources can be dominant and can be particularly strong when the force harmonics excite the natural resonances of components in the system.

Figure 1:
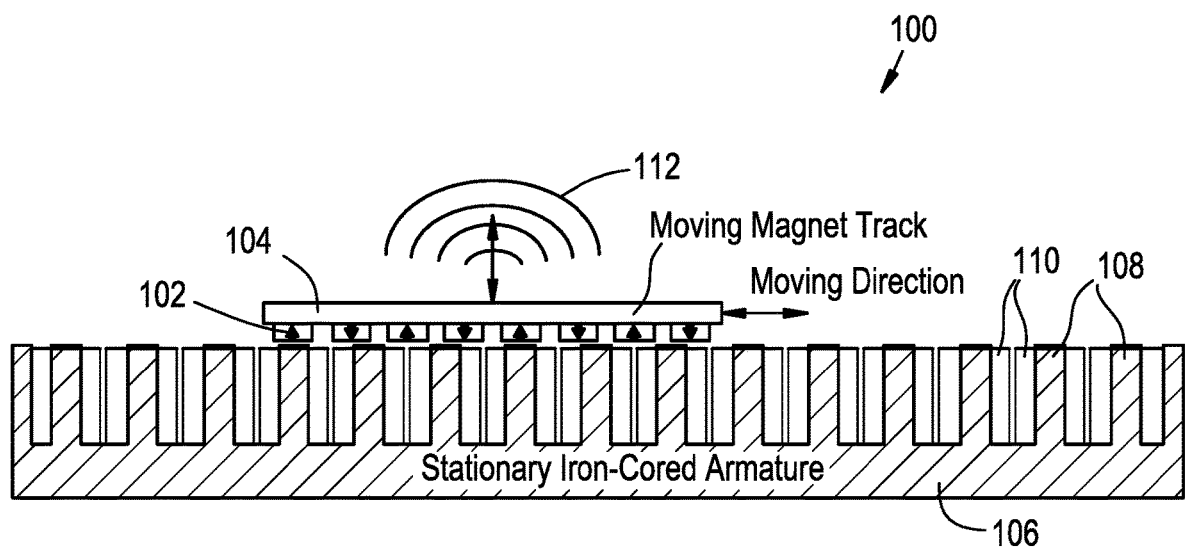
FIG. 1 is an illustration of a prior art linear motor and associated propagation of vibro-acoustic noise.

FIG. 1 shows a schematic configuration of a conventional linear motor 100 with moving permanent magnets 102 mounted on a moving stage 104 and a stationary armature 106 having a plurality of iron-core teeth 108 surrounded by coil windings 110. When such a motor is operated, it can experience two major forces: one is a coil-driven force and the other is a force disturbance, such as cogging. As noted above, cogging force is a force fluctuation caused by magnetic interaction between the iron-core teeth 108 (geometric saliency) and the permanent magnets 102. Depending on the magnetic design of a motor, these forces can have high harmonics. The high force harmonics can vibrate the moving stage 104 and can be especially severe when the stage dynamics are excited. This vibration of the moving stage 104 can be transmitted through the system structure into other components thereof and can also radiate as acoustic noise as illustrated by the waves 112 in FIG. 1.

Figure 2:
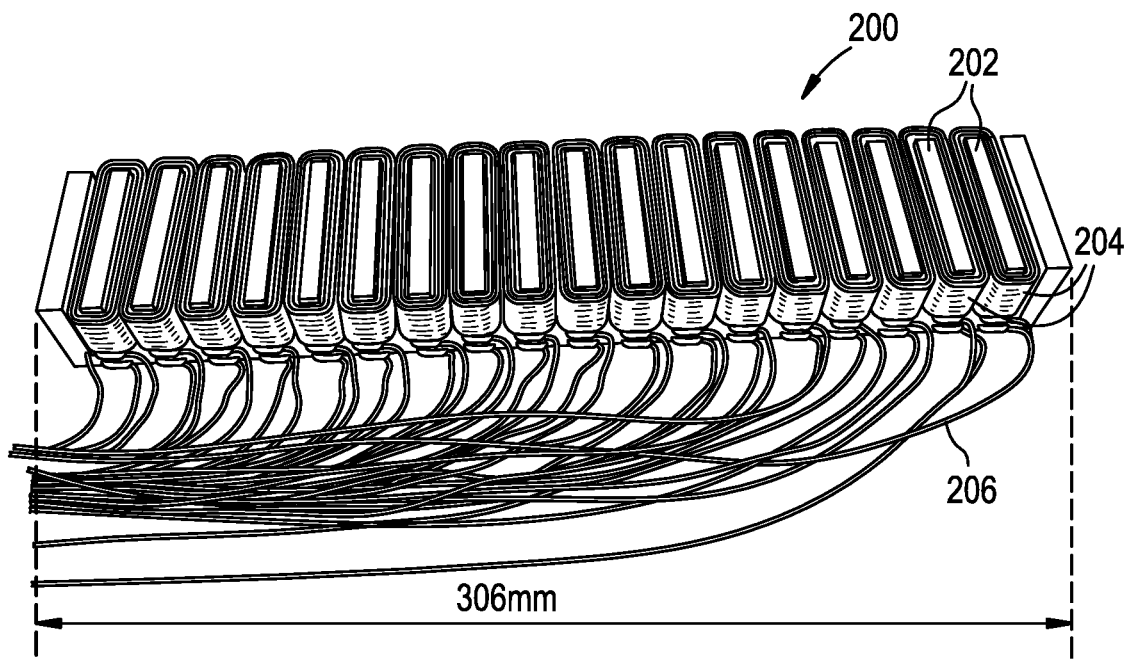
FIG. 2 is a photograph of one embodiment of a prior art stator armature of a conventional linear iron-core motor.

The magnetic design of a conventional linear motor has three coils/poles interacting periodically with four permanent magnets to generate a force. This is why such a motor is often called a 3-4 combination motor. FIG. 2 shows a picture of a stator armature 200 of such a conventional three-phase iron-core motor. As can be seen in the figure, the iron-core teeth 202 are widely separated from each other, creating a large slot space therebetween that is filled by lumped phase windings 204. Wires 206 extend from the windings 204 and can be coupled to a power source for selective energization during operation of the motor. In addition to the armature 200 with iron-core teeth 202, conventional linear iron-core motors include a permanent magnet array with back iron. The magnetic configuration of such a motor can vary depending on which of these components is long or short and which is moving or stationary. In the illustrated embodiment of FIG. 2, the armature 200 has an overall length of 306 mm, but other lengths are also possible.

Figure 3:
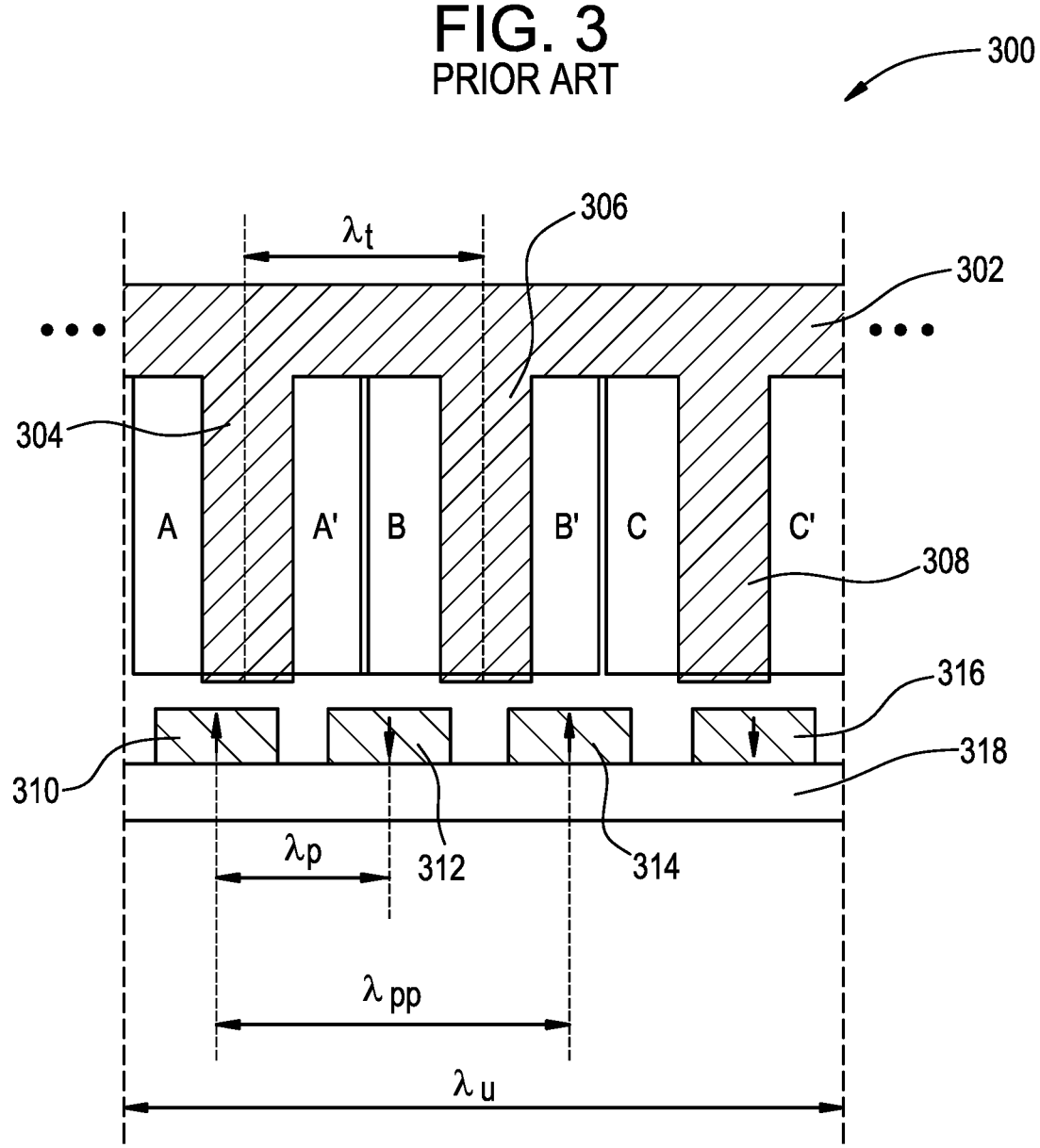
FIG. 3 is an illustration of a magnetic design of a prior art conventional 3-4 combination linear iron-core motor.

FIG. 3 depicts a schematic of the magnetic design of a conventional 3-4 combination linear iron-core motor 300. The stator armature 302 has three phase windings A, B, and C wound on three iron core teeth 304, 306, 308. Note that the prime variables of A', B', and C' indicate the returning coils. The three coils A, B, C magnetically interact with four magnets 310, 312, 314, 316 in the magnet track 318. This is why this type of motor is often called a 3-4 combination motor. That is, three iron-core teeth 304-308 and four magnets 310-316 are a fundamental magnetic unit to generate thrust in such conventional iron-core motors. The length of this basic motor unit is shown as $\lambda_u$ in FIG. 3. This parameter is related to other key geometric parameters of the motor with the relations of Equations 1 and 2 below where $\lambda_t$, $\lambda_p$, and $\lambda_{pp}$ are the iron-core tooth pitch, the magnet pole pitch (e.g. from N to S as shown by arrows on the magnets 310-316), and the magnet pole-pair pitch (e.g. from N to N), respectively. Magnetic flux is interacted between the stator armature and the magnets to generate a force. In order to have the magnetic flux path closed, both the armature 302 and the magnet track 318 have back iron.

$$\lambda_t = \frac{\lambda_u}{3} = 16 \text{ mm} \qquad \text{Eq. 1}$$

( ∵ 3 coils/teeth per unit)

$$\lambda_p = \frac{\lambda_{pp}}{2} = \frac{\lambda_u}{4} = 12 \text{ mm} \qquad \text{Eq. 2}$$

Figure 4:
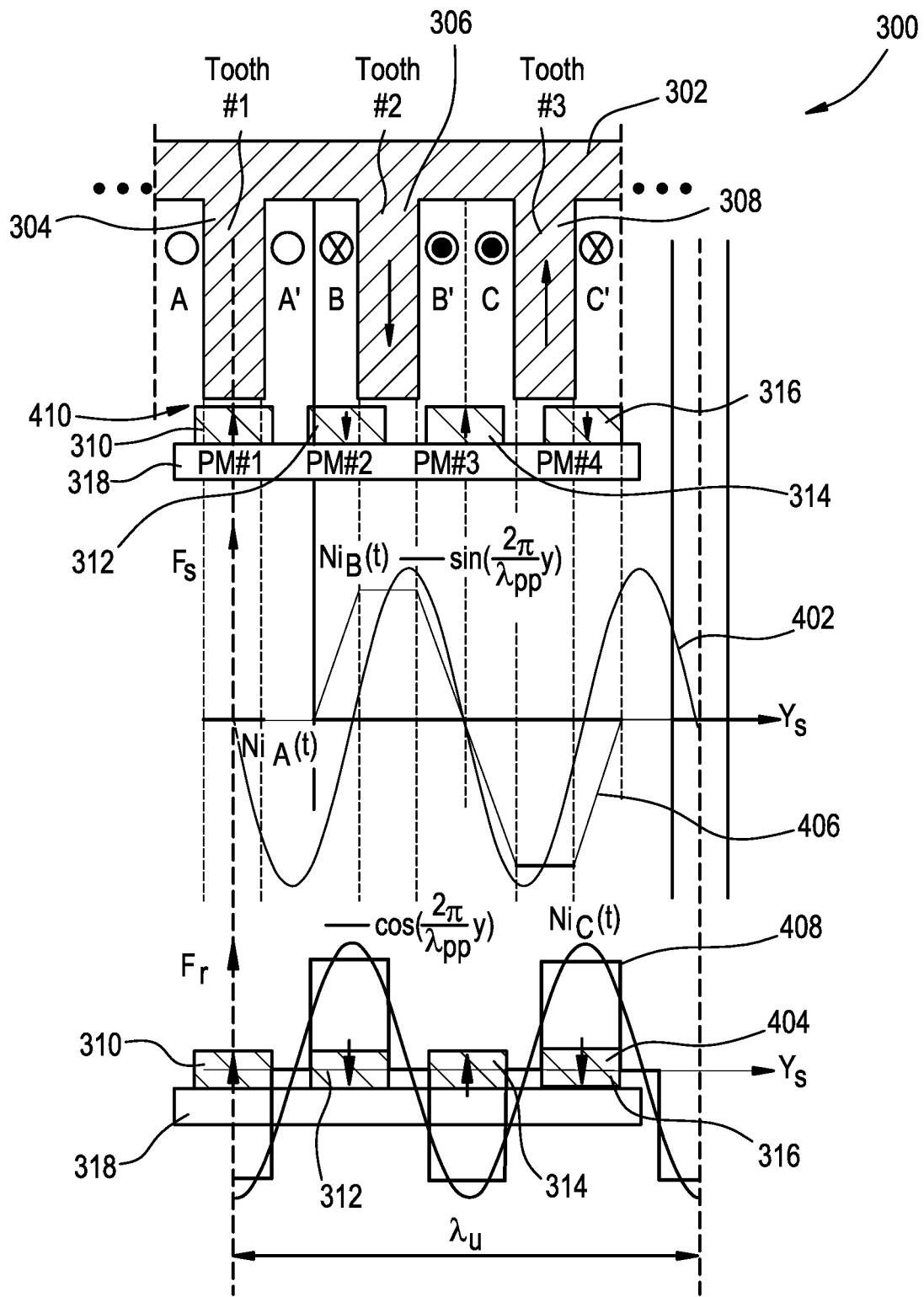
FIG. 4 is an illustration of magneto-motive force (MMF) waveforms of the stator and magnet track of a prior art conventional linear iron-core motor.

( ∵ 4 magnets per unit),

FIG. 4 illustrates the magneto-motive force (MMF) waveforms of the stator armature and the magnet track of the conventional 3-4 combination linear iron-core motor 300. The magnetic force of a motor is generated by two interacting magnetic fields and is proportional to the cross product of the MMFs of those interacting fields, as in Equation 3 below where the vector components are the direct and quadrature axes, and where $\mathcal{F}_s$, $\mathcal{F}_r$, and $\delta_{sr}$ are the stator MMF amplitude, the rotor MMF amplitude, and the phase difference in the electrical angle between the stator and rotor MMFs, respectively. The electrical angle of $\theta_e = 2\pi$ corresponds to a linear position displacement by a distance equal to the magnet pole-pair pitch, $\lambda_{pp}$. The magnetic force is produced by the tendency of the rotor (magnet track 318) MMF, $\mathcal{F}_r$, to align with the stator MMF, $\mathcal{F}_s$, which is a traveling wave created by commutation of the armature phase currents. To have the maximum thrust for a given magnetic design of a motor, $\mathcal{F}_s$ has to lead or lag $\mathcal{F}_r$ by an electrical angle of $\pi/2$, which means $\sin(\delta_{sr})=1$ in Equation 3 below.

$$F_{thrust} \propto \mathcal{F}_s \mathcal{F}_r \sin(\delta_{sr}) \qquad \text{Eq. 3}$$

The thrust force relation in Equation 3 can be rewritten as in Equation 4 below so as to consider the harmonics (n) of the MMFs generating the force harmonics. Note that in the assumed periodic system, only like numbered harmonics generate thrust. From Equation 4, the ideal MMF waves for both the stator and the rotor are sinusoidal, as shown by lines 402 and 404 in FIG. 4, such that only the fundamentals to generate the thrust are present without any high harmonics. The curves 402, 404 in the FIG. 4 are therefore the ideal sinusoidal MMF waves for the stator 302 and the rotor or magnet track 318. Note that the stator MMF, $\mathcal{F}_s$ leads the rotor MMF, $\mathcal{F}_r$ by $\lambda_{pp}/4$, which corresponds to the electrical angle of $\pi/2$ discussed earlier.

$$F_{thrust} \propto \sum_{n=1}^{\infty} \mathcal{F}_{s,n} \mathcal{F}_{r,n} \sin(\delta_{sr,n}) \qquad \text{Eq. 4}$$

The realistic stator and rotor MMF waves of the conventional motor, however, are different from the ideal waveforms, as shown with the stator line 406 and rotor line 408 in FIG. 4. The stator MMF, which can be considered as the magnetic potential $\psi_s$ at the air gap 410 between the stator and rotor, is estimated with the relation of Equation 5 below where $\mathcal{R}$, $\varphi$, l, A, $\mu$, B, H, and Ni are the magnetic reluctance of an iron-core tooth, the magnetic flux through the tooth, the characteristic length of the flux path, the cross-section area of the flux path, the magnetic permeability of the iron-core material, the magnetic flux density in the flux path, the magnetic field strength in the flux path, and the ampere-turns enclosed by the flux path, respectively.

$$\mathcal{F}_s = \psi_s = \mathcal{R}\phi = \left(\frac{l}{\mu A}\right)(AB) = \frac{B}{\mu}l = \oint H\, dl = Ni \qquad \text{Eq. 5}$$

At the instant depicted in FIG. 4, the first tooth 304 and the first magnet 310 are instantaneously aligned so that the phase A coil needs to be turned off ($i_A(t)=0$). This means that there is no potential drop or increase from the armature back iron to the tooth tip at the air gap 410. Thus, there is also zero potential ($\mathcal{F}_s=0$) across the first tooth 304, assuming a zero potential at the armature back iron. This zero potential continues through the slot area (with zero current density) until the start of the phase B coil. In order to generate a thrust in the rightward direction on the magnet track 318, the phase B and the phase C coils have to be turned on such that (1) the magnetic flux direction in the second tooth 306 is the same as the second permanent magnet 312 to pull the magnet to the rightward direction, and is opposite to the third permanent magnet 314 to push it to the rightward direction, and (2) the magnetic flux direction in the third tooth 308 is the same as the third permanent magnet 314 to pull it to the rightward direction, and is opposite to the fourth permanent magnet 316 to push it to the rightward direction. Thus, the magnetic potential at the second tooth 306 is a positive constant while it is a negative constant value at the third tooth 308. Note the sign convention where the ampere-turns (Ni) is positive when it creates a magnetic flux downward as can be seen in the second tooth 306 in the figure. The MMF and magnetic potential changes linearly across a slot when there are energized coils because the potential change is proportional to the ampere-turns (Ni) in the slot, as in Equation 5.

The stator MMF, $\mathcal{F}_s$ as described above, is plotted as the line 406 in FIG. 4. This realistic $\mathcal{F}_s$ curve can be considered as a sampled version of the ideal sinusoidal waveform (line 402) with the iron-core tooth locations as the sampling points. As can be seen in the figure, the realistic $\mathcal{F}_s$ waveform is coarsely sampled so that it contains significant higher harmonics. The realistic MMF waveform of the magnet track (rotor) 318, $\mathcal{F}_r$ is plotted with the line 408 in the figure with the same sign convention. This pulsating waveform of $\mathcal{F}_r$ also contains significant higher harmonics. Since both the stator and rotor MMFs have such higher harmonic content, it can be expected that the generated force by the conventional motor also contains high force harmonics as can be seen from Equation 4.

Figure 5:
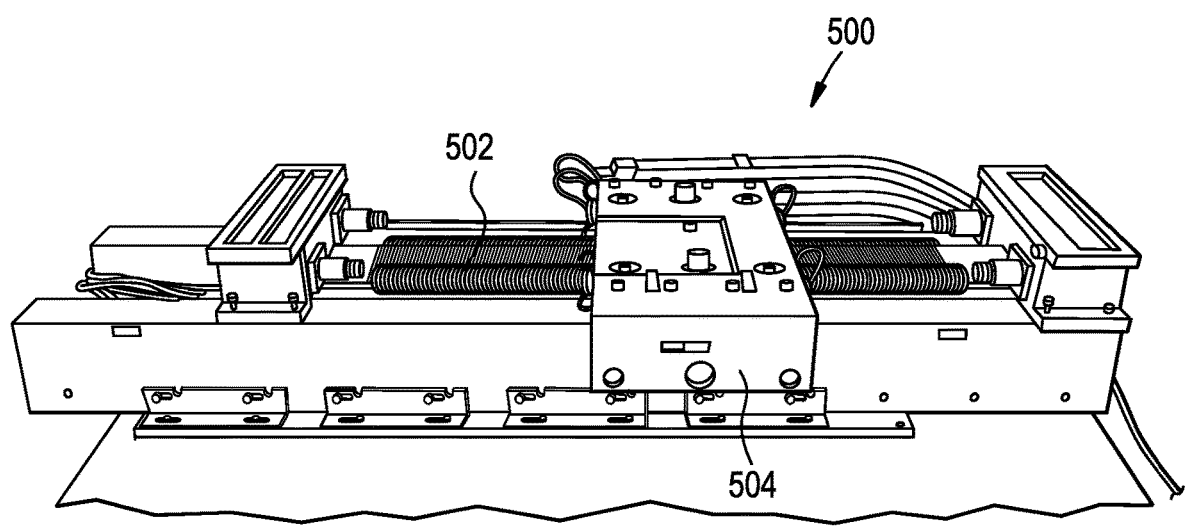
FIG. 5 is a side perspective view photograph of one embodiment of a fine-tooth iron-core permanent magnet linear synchronous motor according to the present disclosure.
Figure 6:
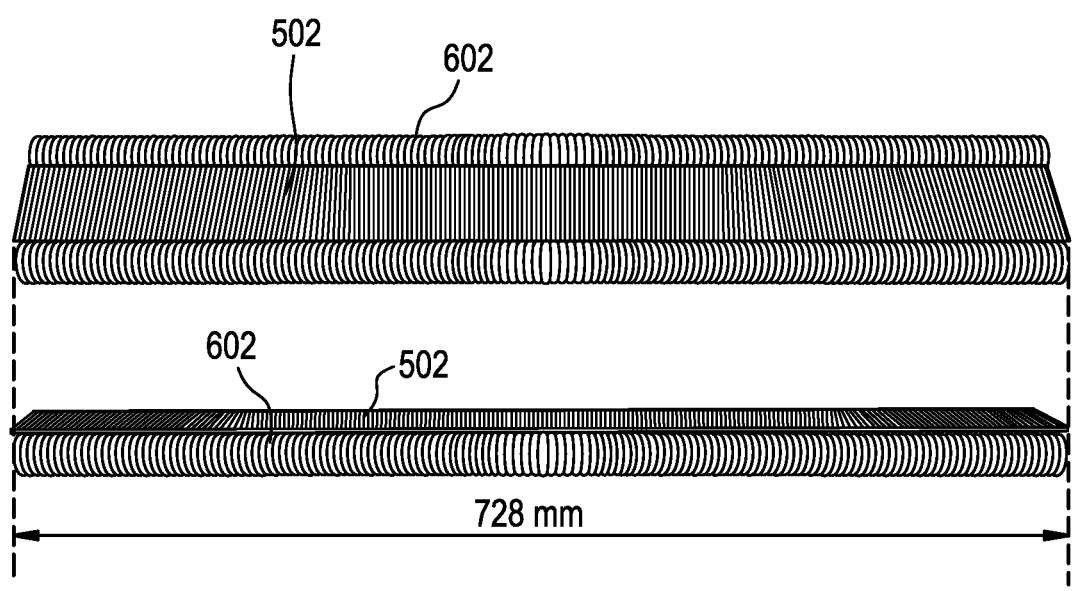
FIG. 6 shows top and side-view photographs of one embodiment of a fine-tooth iron-core linear motor stator armature.

FIG. 5 illustrates one embodiment of a new linear motor 500 according to the present disclosure. The motor 500 generally includes an armature 502 having a plurality of fine teeth separated by narrow slots that contain windings having more than the conventional three phases, as well as a moving stage 504 having a Halbach magnet array. Such a magnetic design can produce smoother stator and rotor MMF waveforms with less harmonic content, thereby generating less force harmonics while enhancing the shear stress density. This, of course, is just one embodiment of a linear motor according to the present disclosure and other embodiments considered within the scope of the disclosure can include any of a variety of variations, substitutions, etc., as described herein. FIG. 6 illustrates the stator armature 502 and windings 602 of the motor 500 in isolation. As shown in the figure, the illustrated embodiment has an overall length of 728 mm, though other lengths are possible in different embodiments.

As discussed above, the conventional 3-4 combination iron-core motor generates high force harmonics since its magnetic design produces high harmonics in the magneto-motive forces (MMFs) of both the stator and rotor (magnet track). In particular, the stator MMF waveform of such a motor is significantly coarse due to the small number (only 3 per unit) of iron-core teeth with a large tooth pitch ($\lambda_u/3$), as shown in FIG. 4. Note that the motor unit length $\lambda_u$ is the minimal length of a motor required to generate thrust. This length encompasses three iron-core teeth and four permanent magnets for the conventional motor.

Figure 7:
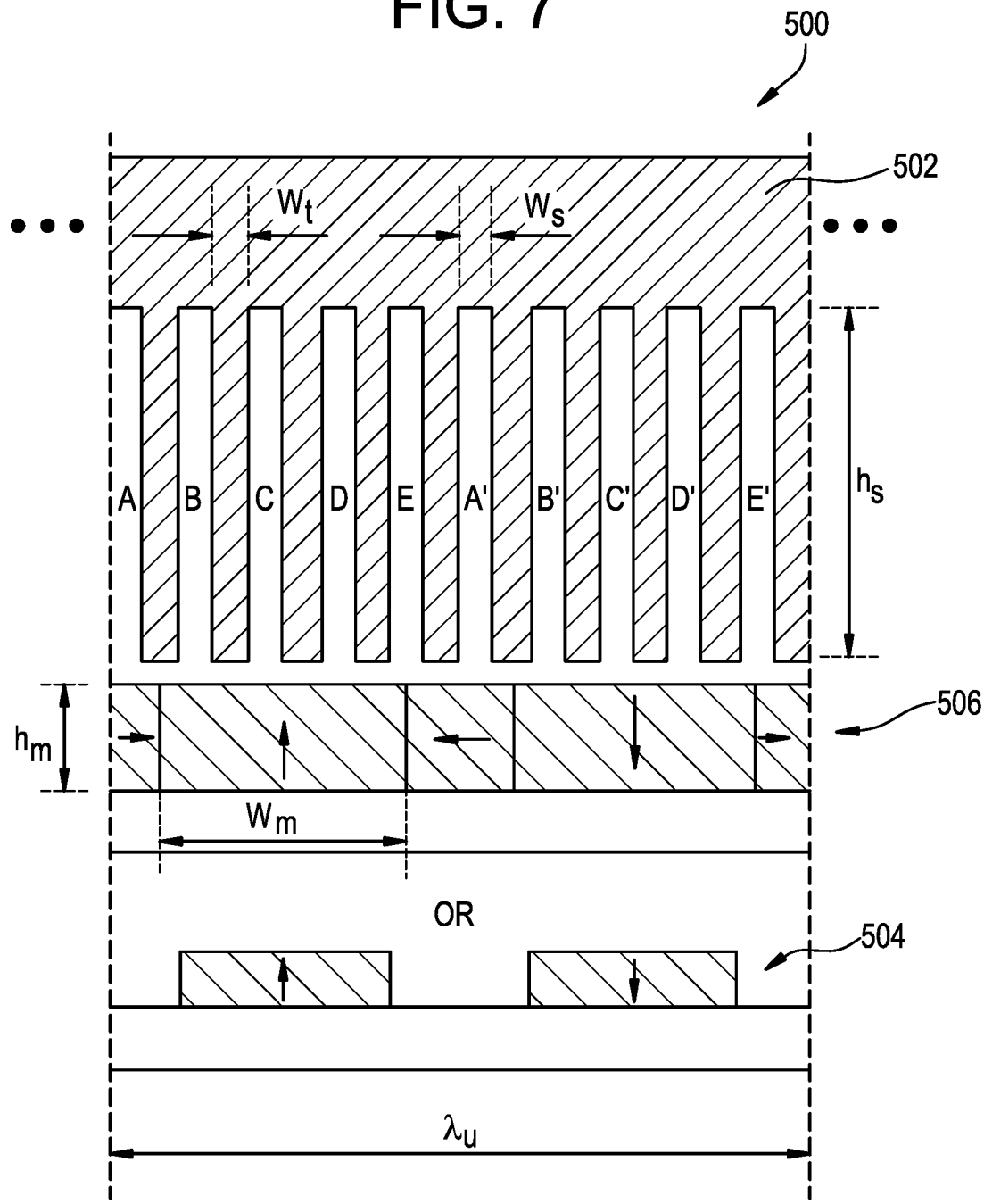
FIG. 7 is an illustration of a magnetic design of one embodiment of a fine-tooth iron-core permanent magnet linear synchronous motor.

In order to generate smaller force harmonics, the fine-tooth linear motors described herein have multiple fine teeth with a small tooth pitch so as to create a stator MMF with reduced harmonics. The schematic magnetic design of the motor 500 is illustrated in FIG. 7. Compared to the conventional iron-core motor design of FIG. 3, the motor 500 has fine teeth, deep slots, and more phases. The motor 500 has a unit length $\lambda_u$ that encompasses one pole pair of permanent magnets and includes a 5-phase stator 502, but any number of phases can be implemented in other embodiments. The illustrated magnet array can be either a conventional N-S pattern 504 or a Halbach array 506. The Halbach array pattern produces magnetic fields with less harmonics and enhances the field strength on one side while reducing it on the other side.

Figure 8:
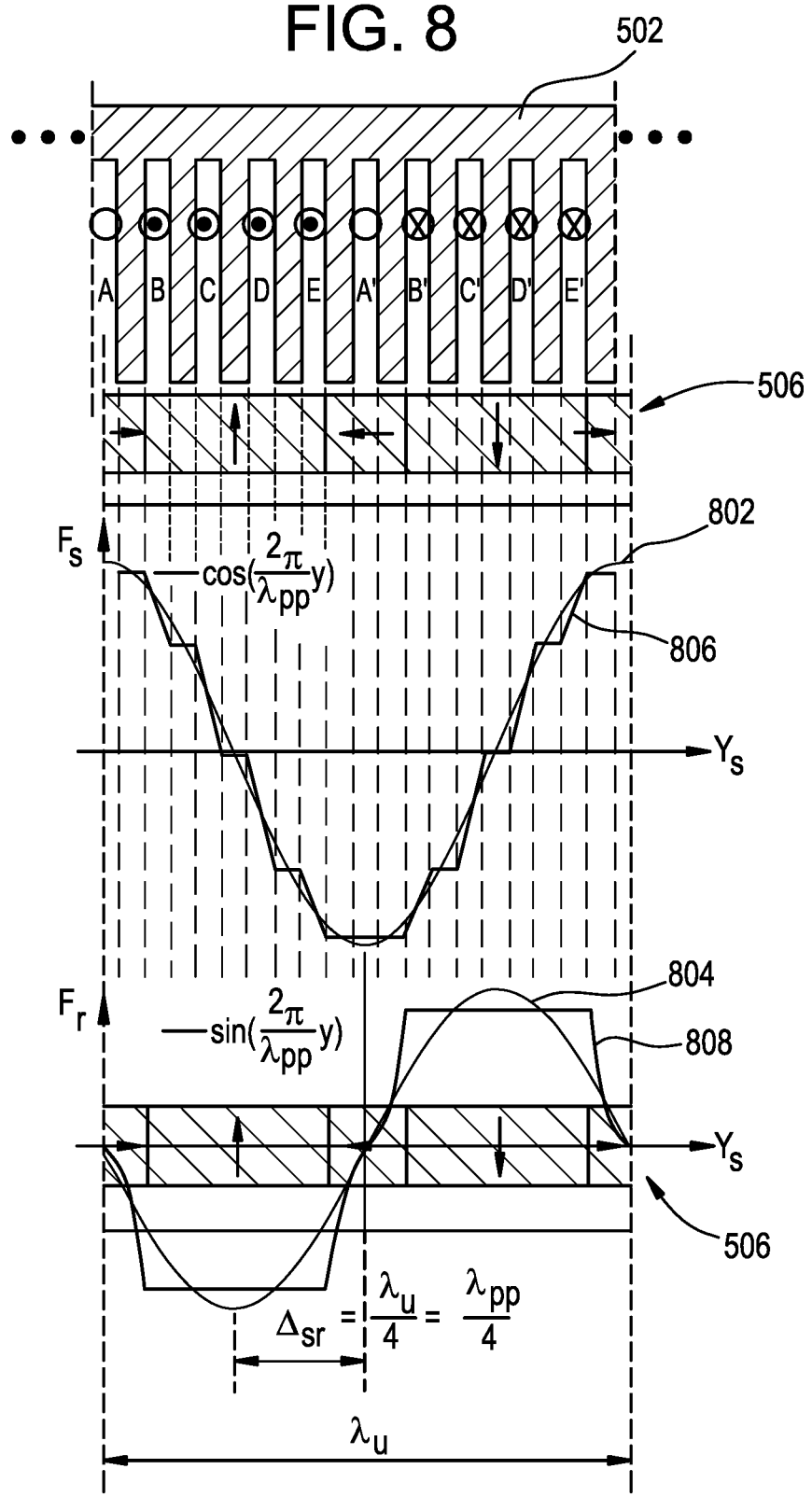
FIG. 8 is an illustration of magneto-motive force (MMF) waveforms of the stator and magnet track of one embodiment of a fine-tooth iron-core permanent magnet linear synchronous motor.

As noted above, the thrust force of a linear motor is generated by the tendency of two interacting magnetic fields to align their magnetic axes, and it is proportional to the cross product of two MMFs as in Eq. 6 below where $\vec{\mathcal{F}}_s$, $\vec{\mathcal{F}}_r$, $\mathcal{F}_s$, $\mathcal{F}_r$, and $\delta_{sr}$ are the stator MMF vector, rotor (magnet track) MMF vector, stator MMF amplitude, rotor MMF amplitude, and phase angle difference between the stator and rotor MMF vectors, respectively. The proportional factor is determined by the geometry of motor magnetic designs. The thrust force of the motor 500 can thus be written as in Eq. 7 below where $\mu_0$, $N_{pp}$, D, g, $\lambda_{pp}$, and $\Delta_{sr}$ are the magnetic permeability of air, number of pole-pair, motor depth, air-gap distance, magnet pole-pair pitch, and phase position difference between the stator and rotor MMFs, respectively. The phase angle difference, $\delta_{sr}$, in Equation 6 is in polar coordinates and can be replaced by $2\pi\Delta_{sr}/\lambda_{pp}$ to express the phase difference in terms of linear position. The phase position difference, $\Delta_{sr}$ is illustrated in FIG. 8 and is in the Y direction of the Cartesian coordinates. The thrust force from Equation 7 below is a simplified force calculation with the assumptions of no material saturation and no leakage flux.

$$F_{thrust} \propto \vec{\mathcal{F}}_s \times \vec{\mathcal{F}}_r = \mathcal{F}_s \mathcal{F}_r \sin(\delta_{sr}) \qquad \text{Eq. 6}$$

$$F_{thrust} = \left(\frac{\mu_0 N_{pp} D\pi}{g}\right) \mathcal{F}_s \mathcal{F}_r \sin\left(\frac{2\pi}{\lambda_{pp}}\Delta_{sr}\right), \qquad \text{Eq. 7}$$

As shown by Equations 6 and 7 above, the thrust will contain high harmonics if the stator and rotor MMFs have high harmonics. Again, this is why the conventional 3-4 combination motor has significant high force harmonic content, as discussed above. In contrast, the multiple fine teeth in the motor 500 reduce the force harmonics content by producing relatively smooth stator and rotor MMFs, as shown in FIG. 8. The ideal desired MMF waveforms for both stator (line 802) and rotor (line 804) are sinusoidal and have only the fundamental to generate the thrust without high harmonics. However, the MMFs cannot be harmonically pure in reality and behave like the stator line 806 and the stator line 808 in the figure. The realistic stator MMF can be considered as a sampled version of the ideal sinusoidal waveform with the iron-core tooth locations as the sampling points. As is apparent when comparing FIGS. 4 and 8, however, the increased number of iron-core teeth and reduced iron-core tooth pitch distance allow the realistic stator and rotor MMFs to much more closely align with the ideal curves 802, 804 than is possible with the conventional 3-4 combination linear motor. The magnet track (rotor) MMF is also smoother when using a Halbach array pattern, as shown in FIG. 8, than that of a conventional motor magnet track, as shown in FIG. 4. Since there are less harmonics in both the stator and rotor MMFs, when these interact, there can be less force harmonics in the magnetically generated force, and thereby less vibro-acoustic noise with the fine tooth motor of the present disclosure.

One method for defining a fine tooth iron-core permanent magnet synchronous motor according to the present disclosure is to consider a ratio ($R_\tau$) of iron-core tooth pitch distance ($\tau_t$) to permanent magnet pole pitch distance ($\tau_p$). Such a ratio for fine-tooth motors according to the present disclosure can have low values that are below those for conventional 3-4 combination linear motors. FIG. 9 illustrates a comparison of the ratio $T_\tau$ for the conventional motor 300 at right and the above-described 5-phase fine-tooth motor 500 at left. As shown in the figure and in Equation 8 below, the conventional motor 300 has a ratio $R_\tau$ of about 1.33, while the fine-tooth motor 500 has a ratio $R_\tau$ of about 0.2. As noted above and described in more detail below, fine-tooth motors according to the present disclosure can include any of a variety of iron-core tooth and magnetic pole pitches, depending on various design factors. Accordingly, any motor having such a ratio below 1.33 can be considered a fine-tooth motor even if the ratio $R_\tau$ is either below 0.2 of the illustrated embodiment or between 0.2 and 1.33.

$$R_\tau = \frac{\tau_t}{\tau_p} = \frac{4}{3} \cong 1.33 \qquad \text{Eq. 8}$$

$$R_\tau = \frac{\tau_t}{\tau_p} = \frac{1}{5} = 0.2 \qquad \text{Eq. 9}$$

As noted above, the schematic design of one embodiment of a fine-tooth motor is shown in FIG. 7. There are a number of design parameters associated with such a motor that can be selected based on desired operating characteristics, motor size, materials for construction, etc. Exemplary relevant parameters are listed in Table 1 below. The design parameters are categorized into two groups: one for the stator armature section and one for the magnet track section. For the stator armature, the number of phases, $N_{slot}$ which is the same as the number of teeth/slots per pole, can be determined along with the size of the teeth and slots. Note that in some embodiments there is a one-to-one ratio between the tooth width ($w_t$) and the slot width ($w_s$). The slot depth can be represented by the slot aspect ratio, $R_{slot}$. The number of winding turns N can be determined for the armature, along with the winding wire gauge AWG.

TABLE 1

| Stator Armature | |
|---|---|
| $N_{slot}$ | Number of slots per pole ( #of phase) |
| $W_t$, Ws | Tooth and slot width (assumed one-to-one) |
| $R_{slot}$ | Slot aspect ratio ($h_s = R_{slot} \times w$) |
| N | Number of winding turns |
| AWG | Wire gauge for winding |

TABLE 1-continued

| Stator Armature | |
|---|---|
| Magnet Track | |
| $f_{magnet}$ | fraction of vertical magnet ( $f_{magnet} = w_m/\lambda_p$ |
| $PM_{thick}$ | Magnet aspect ratio ($h_m = PM_{thick} \times w_m$) |

For the permanent magnet track design, a Halbach array ratio can be determined and represented by the fraction of vertical magnets, $f_{magnet}$, out of a pole pitch. Magnet thickness as a parameter of the magnet aspect ratio $PM_{thick}$ can also be determined. Determination of these parameters can be based on various design constraints and simulation modeling to determine optimum force performance (e.g., in terms of shear stress and acceleration) for a given set of design parameter constraints.

Figure 10:
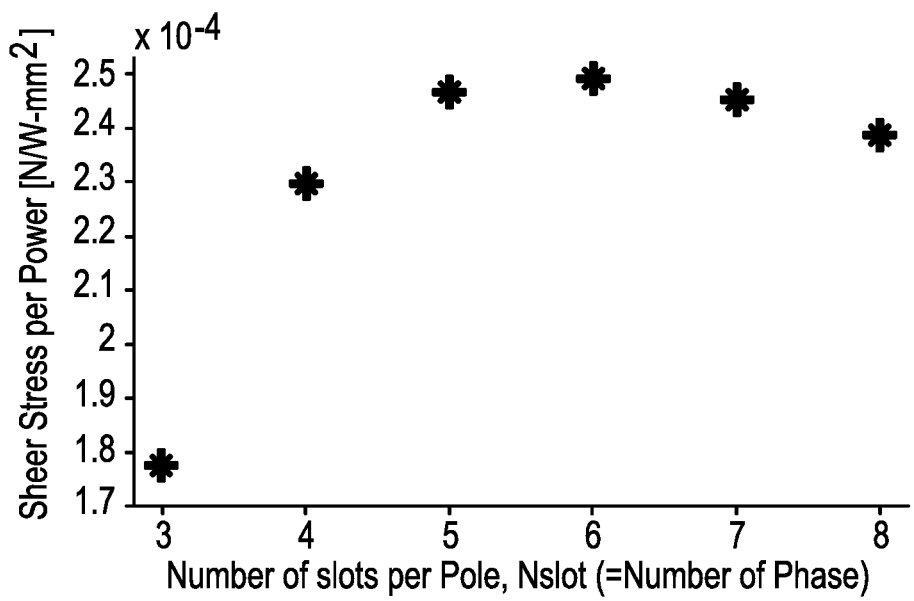
FIG. 10 is a plot of simulated shear stress per power versus the number of motor phases for one embodiment of a fine-tooth iron-core permanent magnet linear motor.

For example, in one embodiment the number of phases to use in a fine-tooth motor can be determined by calculating motor shear stress per power versus the number of phases, as shown in FIG. 10. A simulation model can be utilized to determine the force calculation for each case while keeping other parameters the same. The shear stress relates to a magnetic pressure in the working air-gap of a linear motor and therefore tells how forceful the motor is. The power dissipation level can also be taken into account by dividing the shear stress to allow for a more direct comparison between scenarios. As can be seen in the figure, in this simulation embodiment 5-7 phases shows relatively higher shear power performance than the other cases. In other embodiments, however, different results may be achieved and, in general, for a constant tooth and slot size, a motor design with a higher number of phases will produce a higher attractive force. There can be countervailing design considerations, however. For example, for a full-pitch winding, a higher number of phases can require larger overlapping areas for winding end-turns, thereby making the winding process more difficult and time consuming. Accordingly, when faced with the results of FIG. 10 that 5-7 phases is ideal, there can be reasons to balance selection of the higher number of phases for higher force performance with a lower number of phases for reduced manufacturing complexity.

By way of further example with regard to the moving stage parameters, recall that in some embodiments a Halbach magnet array pattern can be used to increase the thrust by the enhanced magnetic field strength in the working air-gap side and to smooth the rotor (magnet track) MMF waveform to reduce the high harmonic contents, as shown in FIG. 8. A Halbach array pattern contains permanent magnets magnetized both vertically (e.g., in a Z-axis direction) and horizontally (e.g., in a Y-axis direction) and it can be important to determine the ratio between them since the generated force depends on it. The Halbach magnet array ratio is represented by the fraction of the vertical magnets, $f_{magnet}$, out of a pole pitch as written in Equation 10 below where $w_m$ and $\lambda_p$ are the width of the vertical magnets and the magnet pole pitch, respectively.

$$f_{magnet} = \frac{w_m}{\lambda_p} \qquad \text{Eq. 10}$$

Figure 11:
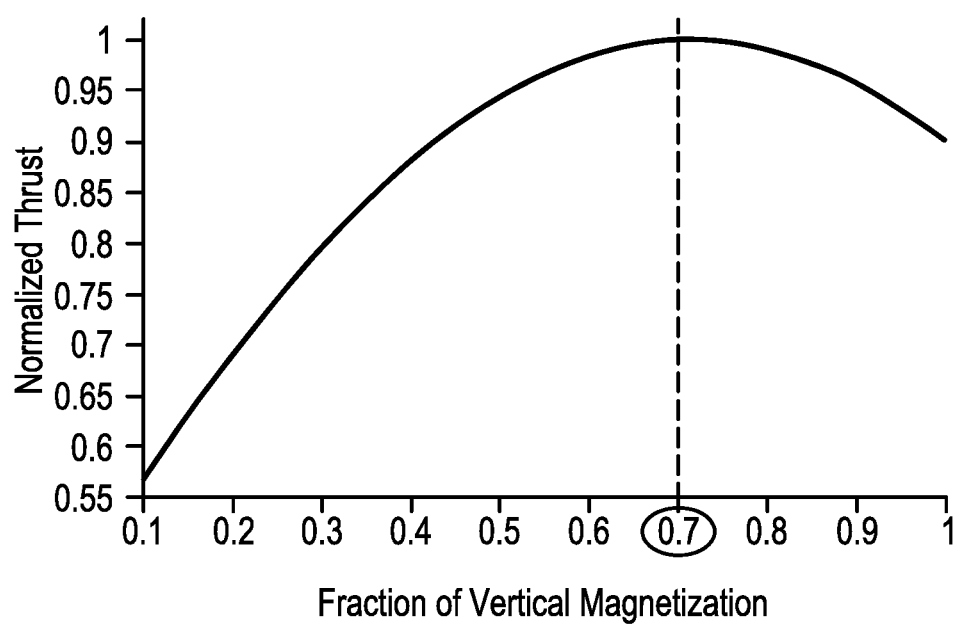
FIG. 11 is a plot of normalized simulated thrust versus Halbach array ratio for one embodiment of a fine-tooth iron-core permanent magnet linear motor.
Figure 12:
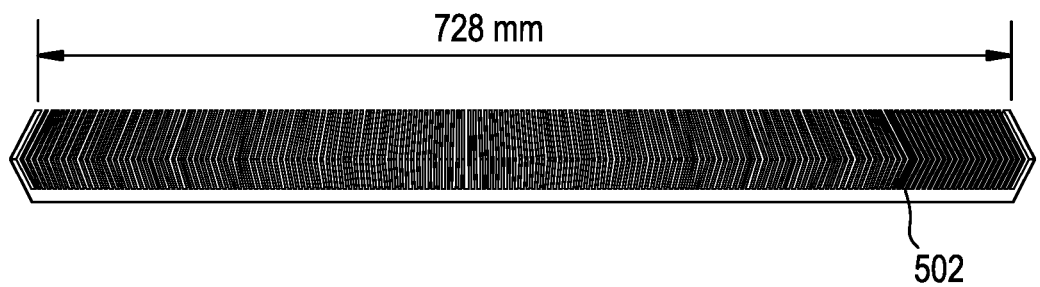
FIG. 12 shows a perspective view photograph of one embodiment of a fine-tooth iron-core linear motor stator lamination.

In order to determine this ratio, thrust can be calculated using a simulation model to plot the normalized thrust versus the vertical magnet fraction, $f_{magnet}$, as shown in FIG. 11. For this calculation, stator armature geometry and magnet thickness can be kept the same while only changing the fraction value. Based on the plot of FIG. 11, a value of $f_{magnet}=0.7$ can be selected in this embodiment because it shows maximum thrust. This value means that this embodiment of a fine-tooth motor can have 70% vertically oriented permanent magnets and 30% horizontally oriented permanent magnets. Of course, this is just one embodiment of a parameter determination or optimization process. Performing the same operation with different constraints for a different linear motor may produce different results.

Moreover, the above-described processes of parameter determination can be performed for a variety of parameters using different scenarios. FIG. 11A, for example, shows various cases of fine-tooth motor design parameters with four different parameters being varied for optimization, e.g., tooth/slot width $w_t$ ($w_s$ being equal to $w_t$), slot aspect ratio $R_{slot}$, magnet aspect ratio $PM_{thick}$, winding turns N, and wire gauge AWG.

One embodiment of final design parameters determined through the above-described selection process are organized in Table 2 below along with several substitutions possible for prototyping economics. As shown in the figure, this embodiment of a fine-tooth motor can have five phases, a tooth/slot width of 2 mm. This results in the tooth pitch $\lambda_s$, the magnet pole pitch $\lambda_p$, and the fundamental unit length $\lambda_u$ as in Equations 11-13 below where $\lambda_{pp}$ is the magnet pole-pair pitch. The slot aspect ratio is selected as $R_{slot}=15$, and this makes the slot depth $h_s$ as in Equation 14 below.

$$\lambda_s = w_t + w_s = 4 \text{ mm} \quad \text{Eq. 11}$$

$$\lambda_p = N_{slot}(w_t + w_s) = 20 \text{ mm} \quad \text{Eq. 12}$$

$$\lambda_u = \lambda_{pp} = 2\lambda_p = 40 \text{ mm} \quad \text{Eq. 13}$$

$$h_s = w_s \times R_{slot} = 30 \text{ mm} \quad \text{Eq. 14}$$

For the magnet track, the sizes of vertical and horizontal magnets are shown in Equations 15-17 below where $w_{m,vertical}$, $w_{m,horizontal}$, and $h_m$ are the width of vertical magnets, width of horizontal magnets, and magnet thickness, respectively.

$$w_{m,vertical} = f_{magnet}\lambda_p = 14 \text{ mm} \quad \text{Eq. 15}$$

$$w_{m,horizontal} = (1 - f_{magnet})\lambda_p = 6 \text{ mm} \quad \text{Eq. 16}$$

$$h_m = w_m \times PM_{thick} = 7 \text{ mm} \quad \text{Eq. 17}$$

TABLE 2

| | | | | REASON |
|---|---|---|---|---|
| STATOR | | | | |
| Material | Cobalt Iron (Hyperco50) | → | Silicone Iron (M-19) | Cost Lead time |
| Lam. Cost | $9.5k/stator | 80% | $2.0 k/stator | |
| Lead Time | | ↓ | 3 weeks | |
| | | → | | |
| $N_{slot}$ | | 5 | | |
| $w_t, w_s$ [mm] | | 2 | | |
| $R_{slot}$ | | 15 | | Easier handling |
| N | 63 | → | 126 | End-turn reduction |
| AWG | 20 | → | 23 | |
| MAGNET TRACK | | | | |
| $f_{magnet}$ | | 0.7 | | |
| $PM_{thick}$ | | 0.5 | | |
| Back Iron | Cobalt Iron w/3mm thick | → | C1018 steel w/4.76 mm thick | Cost, Lead time (pre-ground plate) Structural integrity |

As noted above, Table 2 includes several possible design modifications to reduce material cost and speed manufacturing time. For example, cobalt iron was first selected for the stator material due to its high saturation limit of about 2.4 T. To reduce cost and manufacturing time in some embodiments, however, it can be possible to change the stator material to silicon iron (M-19). This material has a lower saturation limit of about 1.8 T as compared to cobalt iron, so increased flux leakage should be expected. The fine-tooth motor designs described herein can still provide higher shear stress than conventional linear motors even with this material change. By way of further example, a general purpose C1018 steel was selected for the magnet back iron rather than cobalt iron. Use of cobalt iron can decrease the moving mass by reducing the back iron thickness (e.g., to about 3 mm) due to the advantage of a higher saturation limit. Pre-ground C1018 steel can reduce cost and manufacturing or lead time over cobalt iron, and a greater thickness (e.g., to about 4.76 mm) can be utilized so as to have higher structural integrity. Regardless of increased mass, the increased performance of the fine-tooth motor designs described herein can still deliver higher acceleration than a conventional motor.

Table 2 also indicates a change to use thinner gauge wires to wind a greater number of turns. For example, an initial determination for this embodiment was 20 AWG wire with 63 turns per slot because thicker wires providing a higher fill factor. However, using thicker wires can make the winding process more difficult and time-consuming. This is because multi-phase full-pitch windings require the end-turns to be reformed to deal with overlapping one another. For thick wires, the end-turn reformation is more difficult due to their high stiffness, thereby requiring more time and even longer end-turn length. Accordingly, to ease winding and reduce end-turn size, it is possible to select a thinner 23 AWG wire with 126 turns per slot. In such a case the ampere-turns are kept the same, so no force performance reduction is expected. The completed stator armature with windings is shown in FIG. 6.

Even with the above-described design modifications, this embodiment of a fine-tooth motor demonstrates higher shear stress and higher acceleration than a comparable conventional motor at every power and current density level. For example, simulated performance results show that the fine-tooth motor is expected to generate a shear stress of 0.115 N/mm$^2$ at a lower power level of 10 W/mm, showing an approximately 28% increase over a conventional motor's shear stress of 0.090 N/mm$^2$ at the same power level. At a maximum RMS current density of 50 A/mm2, an even higher shear stress increase of about 84% is expected from 0.167 N/mm$^2$ (≈24 psi) by the conventional motor to 0.308 N/mm$^2$ (≈45 psi) by the fine-tooth motor. Predictions for acceleration similarly show significant force enhancement.

Figure 13:
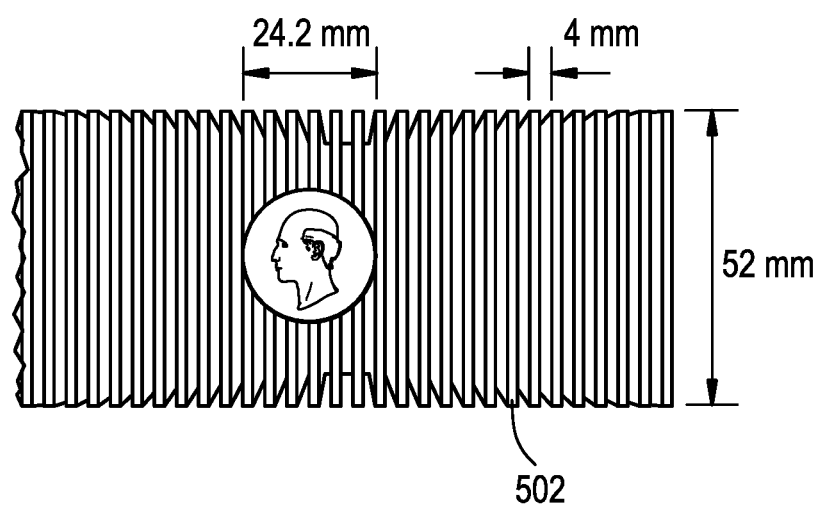
FIG. 13 is shows a top detail view of a portion of the stator lamination of FIG. 12.
Figure 14A:
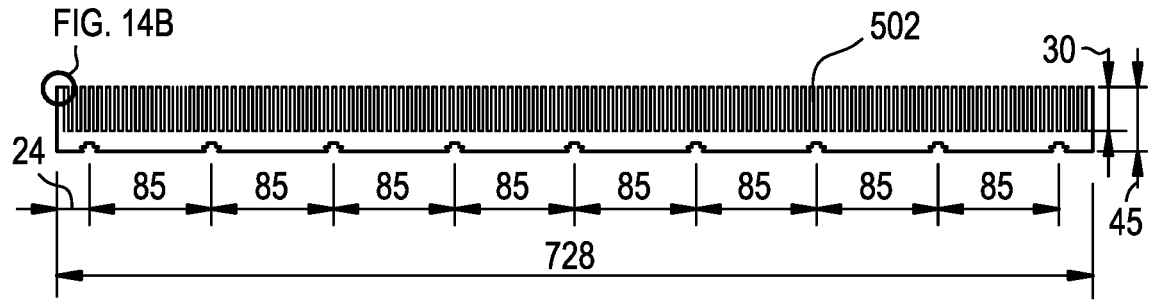
FIG. 14A is a side view illustration of the stator lamination of FIG. 12.
Figure 14B:
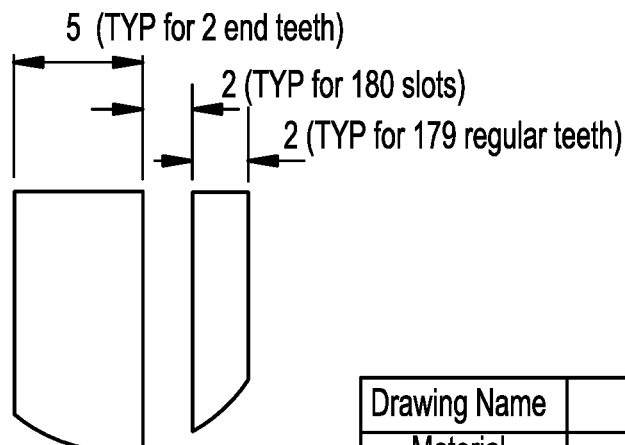
FIG. 14B is a side detail view illustration of the stator lamination of FIG. 14A.
Figure 15A:
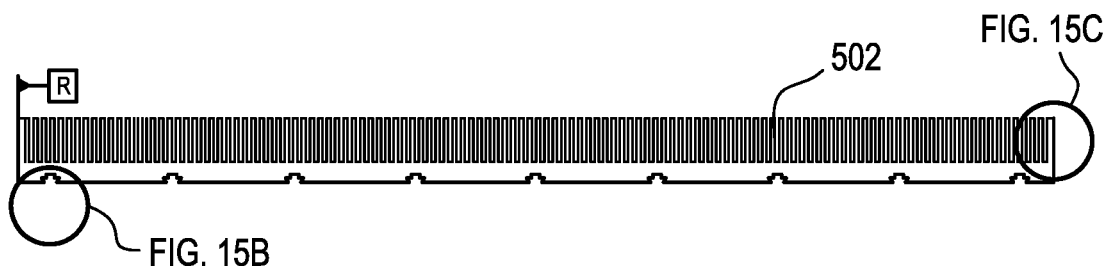
FIG. 15A is an alternative side view illustration of the stator lamination of FIG. 12.
Figure 15B:
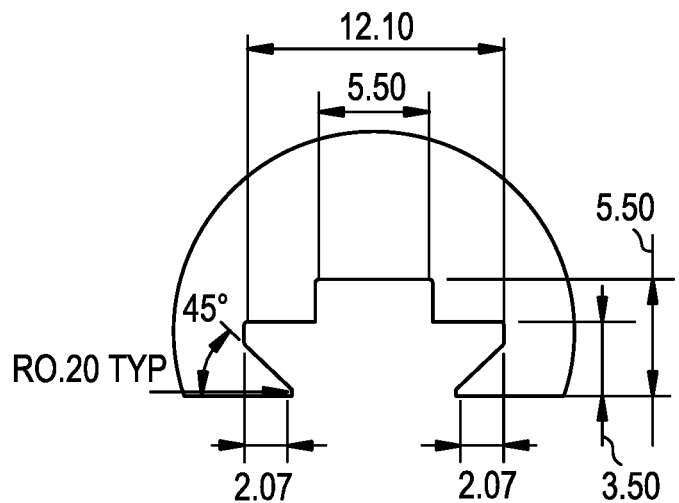
FIG. 15B is a side detail view illustration of the stator lamination of FIG. 15A.
Figure 15C:
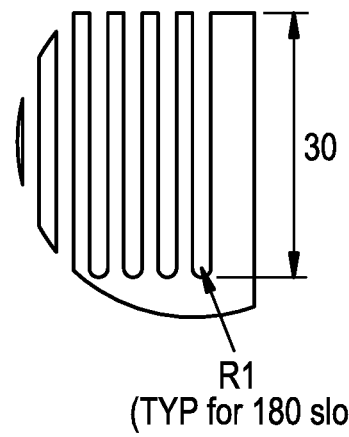
FIG. 15C is an alternative side detail view illustration of the stator lamination of FIG. 15A.

FIGS. 12-15C illustrate the stator armature 502 in greater detail without showing the windings of FIG. 6. The stator lamination in the illustrated embodiment has a total length of 728 mm and a total number of 180 slots. The U.S. quarter coin in FIGS. 6 and 13 provides a size reference. The silicon iron M-19 laminations are laser-cut and stacked to have a motor or armature depth of 52 mm. Of course, in other embodiments the stator armature can have different dimensions.

Figure 16:
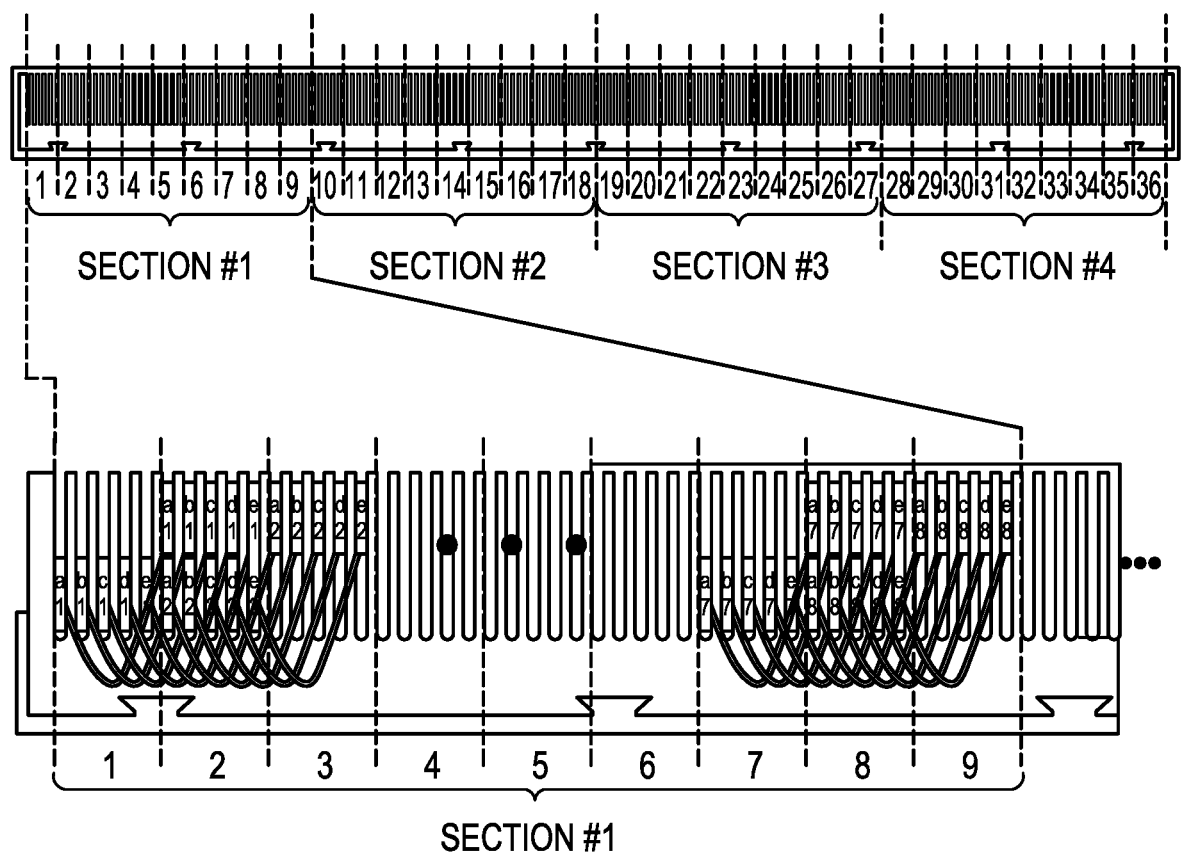
FIG. 16 is an illustration of one embodiment of a winding scheme for a 5-phase double-layered full-pitch winding of a fine-tooth iron-core linear motor stator armature.
Figure 17:
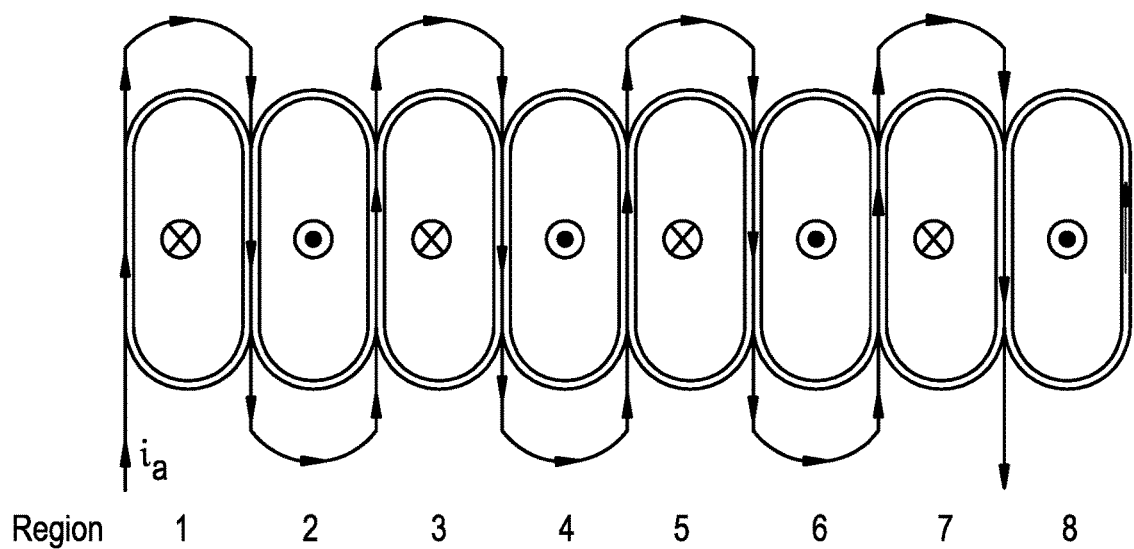
FIG. 17 is an illustration of one embodiment of a wiring scheme of phase A coils in the first section of FIG. 16 where the eight phase A coils are connected in series to have alternating polarities.

The illustrated embodiment of a fine-tooth motor has five phases, so there are a total of 36 (e.g., 180/5) basic winding regions, as labeled in FIG. 16. These winding regions are divided into four labeled sections to distribute the motor driving power. The 5-phase coils are wound in each section as shown with the winding scheme of section #1 shown in detail in FIG. 16. The illustrated embodiment employs a double-layer and full-pitch winding method for each phase A, B, C, D, and E, respectively. The double-layer winding method is to wind a coil from the bottom half of a first slot to the top half of a second full-pitch-distanced slot, as shown in the figure. This can help reduce the overlapping area of the winding end-turns. Note that in this winding pattern, the first 5 and last 5 slots are only half-filled. That is, regions 1 and 36 have half-filled slots. The coils for each phase in each section can be wired in series to have alternating polarities, as shown with the wiring schematic of the phase-A coils in FIG. 17. This can result in a total of 5 phase winding coils per section and a total of 20 resultant winding coils for the whole stator armature. Each of these winding coils can be individually driven by a power amplifier. Each phase winding can have two lead wires for a total of 40 lead wires (10 lead wires per section) that can be coupled to power amplifiers for selective energization to drive the motor.

Figure 18:
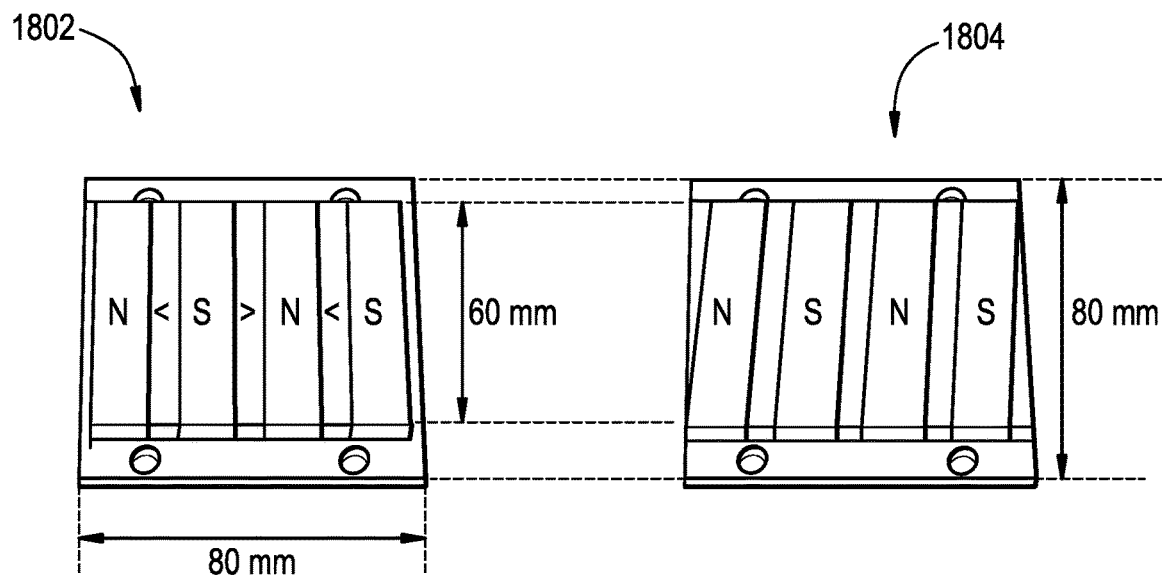
FIG. 18 shows perspective view photographs of embodiments of short Halbach array magnet tracks with both non-skewed and skewed magnets.
Figure 19:
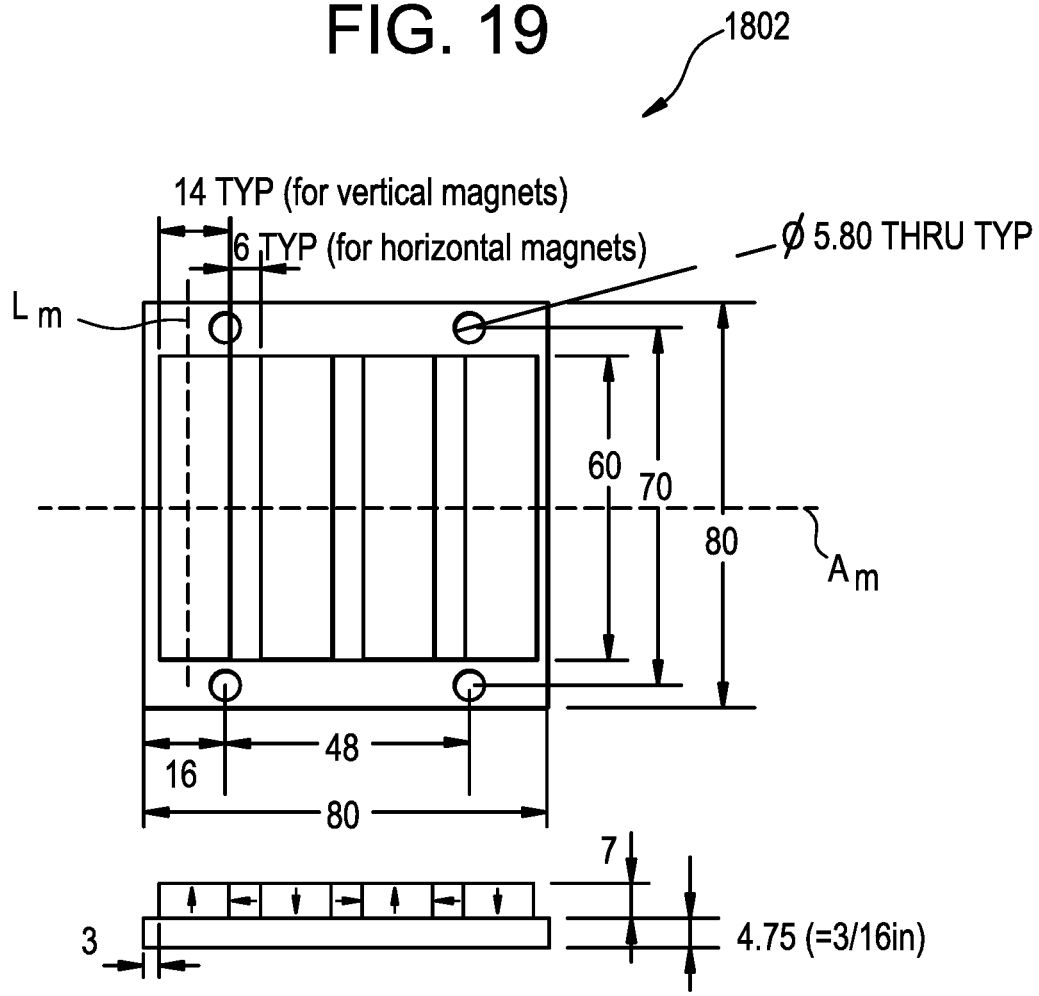
FIG. 19 is an illustration of the non-skewed Halbach array magnet track of FIG. 18.
Figure 20:
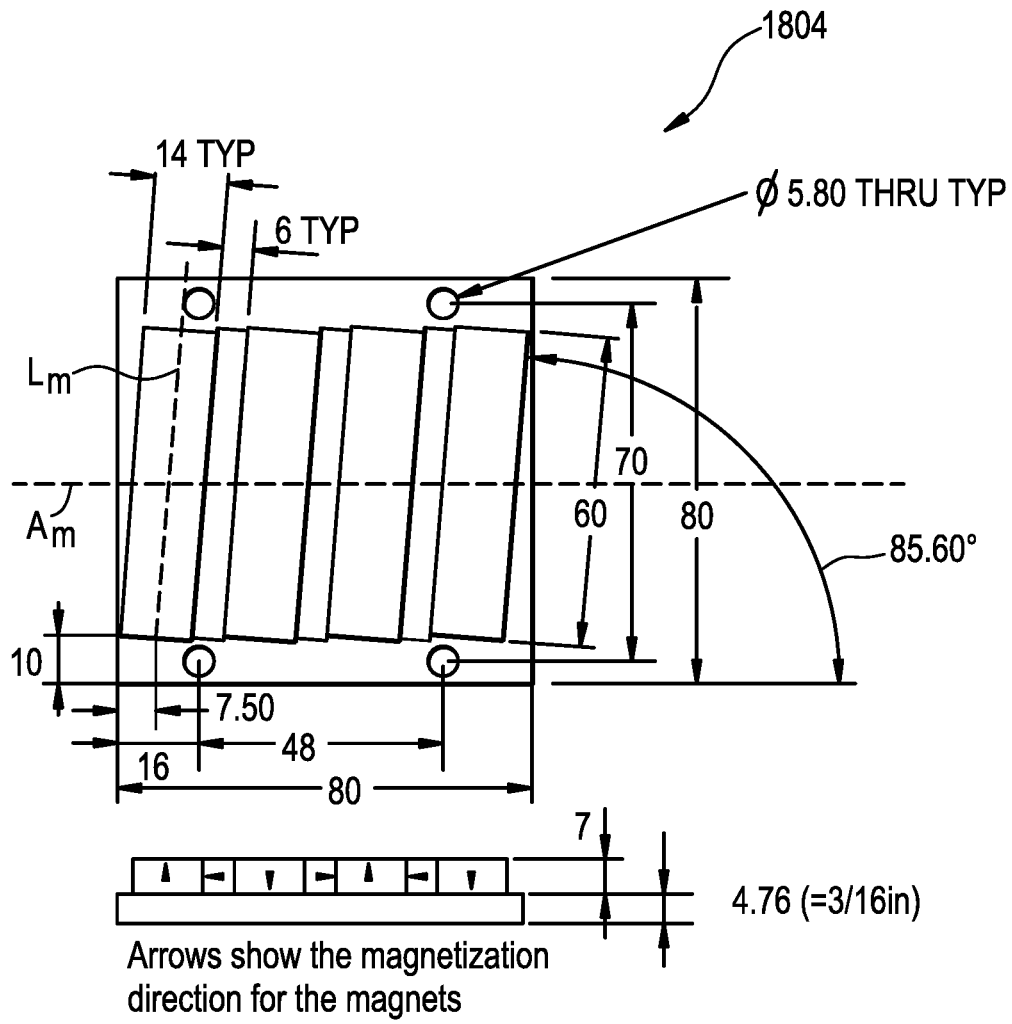
FIG. 20 is an illustration of the skewed Halbach array magnet track of FIG. 18.

FIGS. 18-23 illustrate various embodiments of moving stages having permanent magnet arrays coupled thereto that can be used in the fine-tooth motors described herein. FIG. 18, for example, illustrates a comparison of "short" moving stages having a Halbach array of permanent magnets in both a non-skewed (left, 1802) and skewed (right, 1804) configuration. FIGS. 19 and 20 illustrate each of these configurations in greater detail. As noted in the Figures, the stage back iron can be about 80 mm square and each permanent magnet can have a length of about 60 mm. Of course, in other embodiments moving stages of other sizes can be utilized. Exemplary magnets for use in such moving stages can include N42 grade neodymium magnets, though other permanent magnets can also be utilized in other embodiments.

Figure 21:
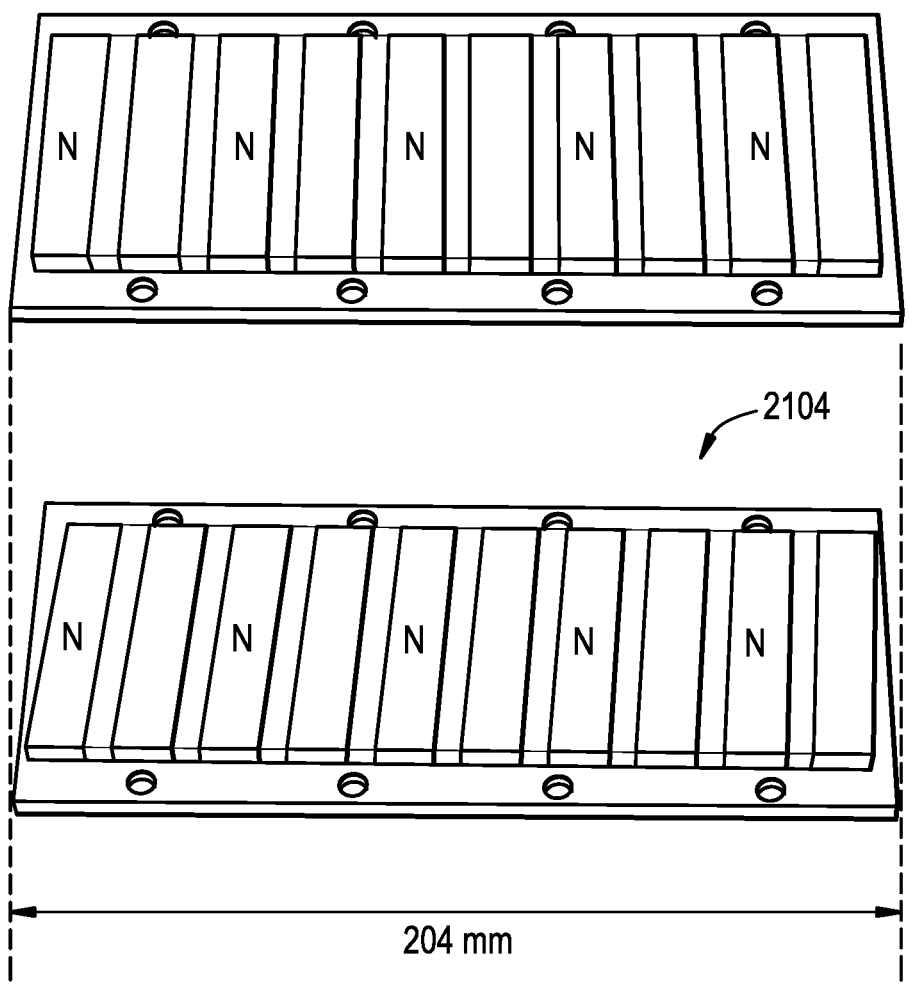
FIG. 21 shows perspective view photographs of embodiments of long Halbach array magnet tracks with both non-skewed and skewed magnets.
Figure 22:
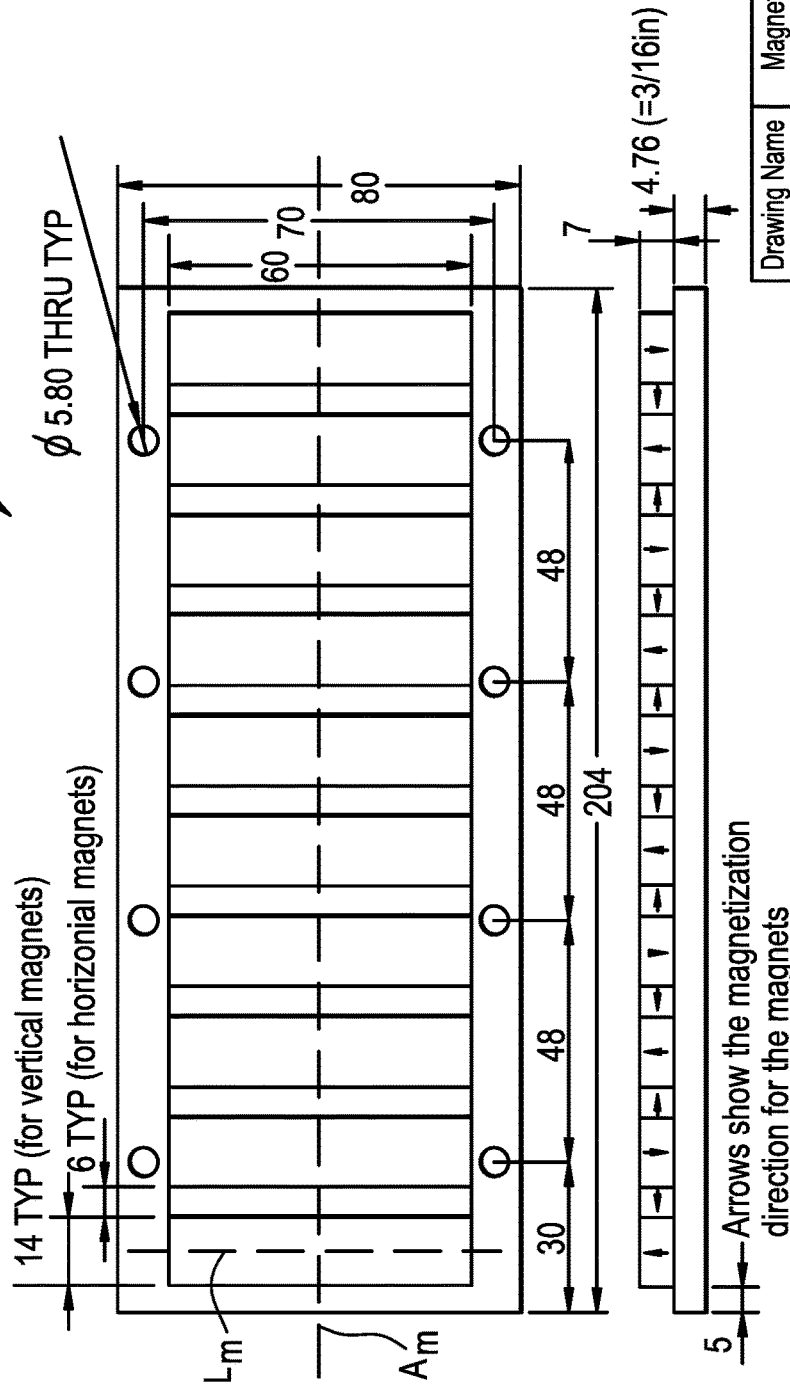
FIG. 22 is an illustration of the non-skewed Halbach array magnet track of FIG. 21.
Figure 23:
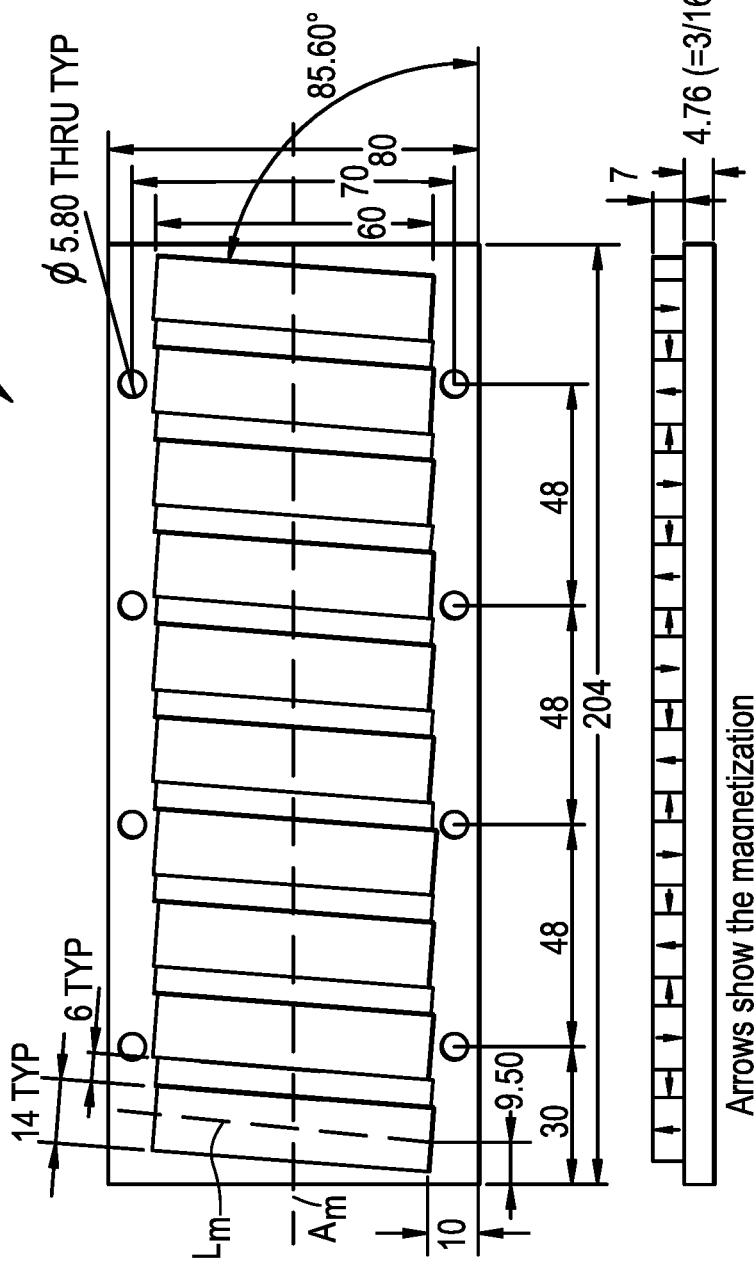
FIG. 23 is an illustration of the skewed Halbach array magnet track of FIG. 21.

FIG. 21 illustrates another comparison of "long" moving stages having a Halbach array of permanent magnets in both a non-skewed (top, 2102) and skewed (bottom, 2104) configuration. FIGS. 22 and 23 illustrate each of these configurations in greater detail. As noted in the Figures, the stages can have a length of about 204 mm and a similar width of about 80 mm. Similar magnets can be utilized as in the short stages described above, but the Halbach array can include a greater number of the magnets. Of course, in other embodiments stages having entirely different dimensions can be utilized.

As shown in the Figures and described herein, the permanent magnets can be arranged in a variety of configurations. For example, an array of alternating polarity magnets can be utilized without any horizontally-oriented magnets or a Halbach array can be utilized that includes intervening horizontally-oriented magnets between each vertically-oriented pole. Further, the permanent magnets can be arranged such that a longitudinal axis $L_m$ of each permanent magnet is normal to the movement axis $A_m$, as in FIGS. 19 and 22, or each permanent magnet can be skewed such that a longitudinal axis $L_m$ of each permanent magnet is oblique to the movement axis $A_m$, as in FIGS. 20 and 23.

In embodiments where skewing of the permanent magnets is employed, an angle ($\alpha$) between the longitudinal axis of each permanent magnet and the movement axis can be based on the iron core pitch distance ($\tau_t$) and a depth or width of the armature (D) such that:

$$\alpha = 90 - \tan^{-1} \frac{\tau_t}{D} \qquad \text{Eq. 18}$$

Such an arrangement can maximize the reduction in motor force fluctuation (e.g., due to cogging and force ripple) by skewing the permanent magnets to cover a full iron-core tooth pitch within a stator width/depth. In some embodiments, this angle can be between about 80 degrees and about 90 degrees. For example, in the embodiments of FIGS. 20 and 23, the angle is about 85.6 degrees, corresponding to a skew angle of about 4.4 degrees from the normal orientation of FIGS. 19 and 22. In other linear motors with different dimensions, this angle could be different based on Equation 18 above.

Structural designs of linear motors can be dependent on the magnetic configuration of the motor armature and magnet track. For example, depending on which part is moving or stationary and which is long or short, there can be different configurations of (1) moving short magnet with stationary long armature, (2) stationary long magnet with moving short armature, (3) moving long magnet with stationary short armature, and (4) stationary short magnet with moving long armature. A number of embodiments of fine-tooth linear motors are described below and shown in FIGS. 24A-38. Note that many of the designs shown in FIGS. 24A-33B show double-sided motor configurations where a first component is disposed between a second component and a third component to interact with both. For example, an array of permanent magnets can be disposed between a first armature and a second armature, or vice versa. In some embodiments, two complete sets of motor components can be utilized such that, for example, two armatures interact with two sets of permanent magnets (e.g., a moving stage with two sets of permanent magnets on opposing surfaces thereof can interact with two armatures disposed on opposite sides of the moving stage). In each of the disclosed embodiments, a double-sided configuration can be converted to a single-sided configuration by removing one half. The reverse is also possible to create double-sided configurations. Differences between double-sided and single-sided motor configurations are further illustrated by comparing the embodiments of FIGS. 35 and 36 (single-sided configuration) with those of FIGS. 37-39 (double-sided configuration). Moreover, a person of ordinary skill in the art will appreciate that the configurations of the present disclosure can also be adapted in some embodiments for use with other linear motors, such as conventional linear motors.

FIGS. 24A-24C illustrate one embodiment of a linear motor 2400 employing a moving short magnet 2402 and a stationary long armature 2404 (or coil). The front view of FIG. 24A shows the upper and lower armatures 2404a, 2404b with the moving magnet track 2402 in between. The whole system can be installed on a large supporting surface to provide a high mass ratio and handle expected high reaction forces during operation of the motor. Note that only one half of the motor 2400 is depicted for simplicity in the front view of FIG. 24A about the symmetry line 2406. The detail perspective view of FIG. 24B shows a bearing guide rail 2408 to control movement of the moving stage 2402 during operation. The top view of FIG. 24C illustrates the entire motor 2400.

In some embodiments, position sensors can be included to aid in controlling operation of the motor 2400. For example, a position sensor can include an encoder read-head 2409 and a linear scale 2410 to obtain the real-time position of the moving stage 2402. In the illustrated configuration, the encoder read-head 2409 can be disposed on the moving short magnet track 2402 and the encoder scale 2410 can be disposed on the longer stationary structure 2404 so as to provide a long measurement range. As noted above, the moving stage 2402 can be guided in the movement direction (along the Y axis of the Figures) by a bearing system with bearing trucks 2412 on the stage 2402 and linear guide rails 2408 on a fixed structure, as shown in the isometric detail view of FIG. 24B. Note that the bearing system is schematically drawn with trucks and linear rails, but other bearing mechanisms can be utilized in various embodiments, including, for example, air bearings.

The moving portion is the short magnet track 2402 visible in the top view of FIG. 24C, this configuration can achieve higher acceleration for the same magnetic force exerted on both the armature and the magnets. It can also be beneficial to have moving permanent magnets in that the number of umbilical cables can be minimized. Further, the illustrated embodiment is a modular design where (1) the single- and double-sided configurations can be independent by attaching or detaching the upper armature module 2404a and (2) the motor can be changed to a different kind without fully disassembling the stage structure.

Figure 25A:
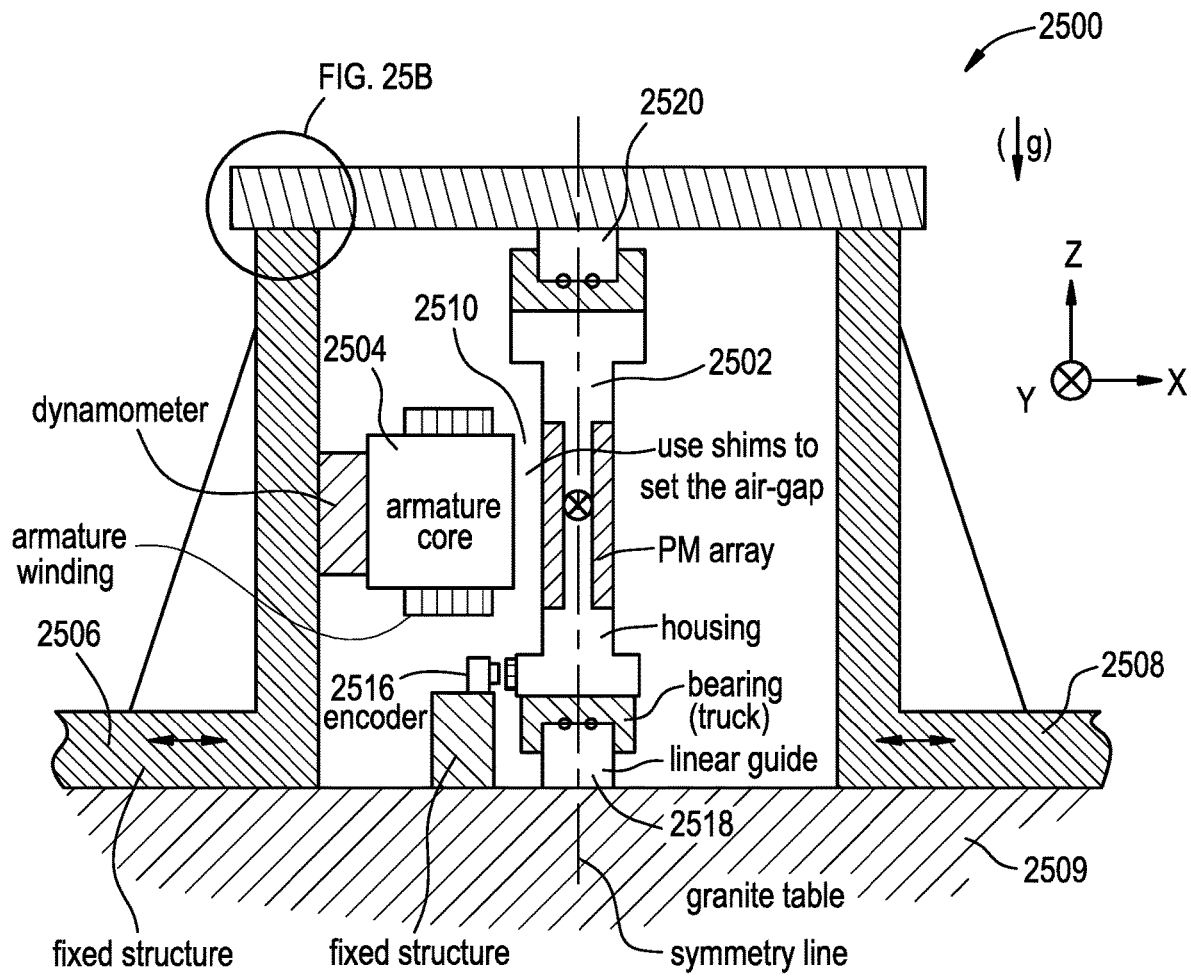
FIG. 25A is a front view illustration of one embodiment of a fine-tooth iron-core permanent magnet linear motor having a moving short magnet and a stationary long coil.
Figure 25B:
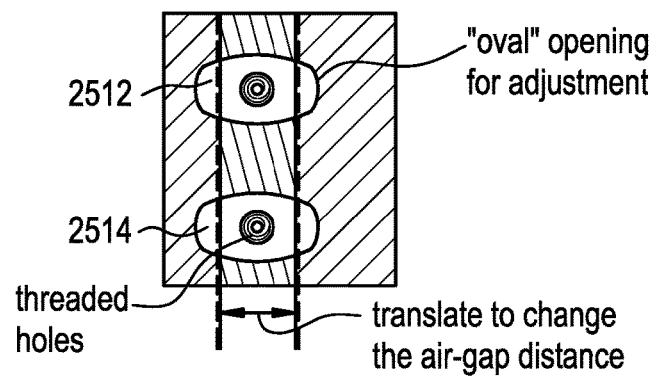
FIG. 25B is a top detail view of the fine-tooth linear motor of FIG. 25A.

Another embodiment of a motor 2500 with a magnetic configuration of a moving short magnet 2502 and stationary long coil 2504 is shown in FIGS. 25A and 25B. This design can be generalized as a 90°-rotated version of the motor 2400 of FIGS. 24A-24C. In the motor 2500, commercially available cast-iron angle plates 2506, 2508 can be utilized as a base structure to hold the stationary long armatures 2504a (second armature not shown). The angle plates 2506, 2508 can be translated on a support surface 2509 to set or adjust a motor air gap 2510 with the help of shims and as allowed by oval openings 2512, 2514 of the top plate, as depicted in the detailed top view of FIG. 25B. In this embodiment, disassembly and reassembly of the armature 2504 may facilitate easier transition between single- and double-sided configurations, since there is easy access to the mounting area from the backs of the angle plates 2506, 2508. Similar to the embodiment described above, the motor 2500 can include an encoder 2516 for position feedback and one or more guiderails 2518, 2520 to guide motion of the moving magnet 2502.

Figure 26A:
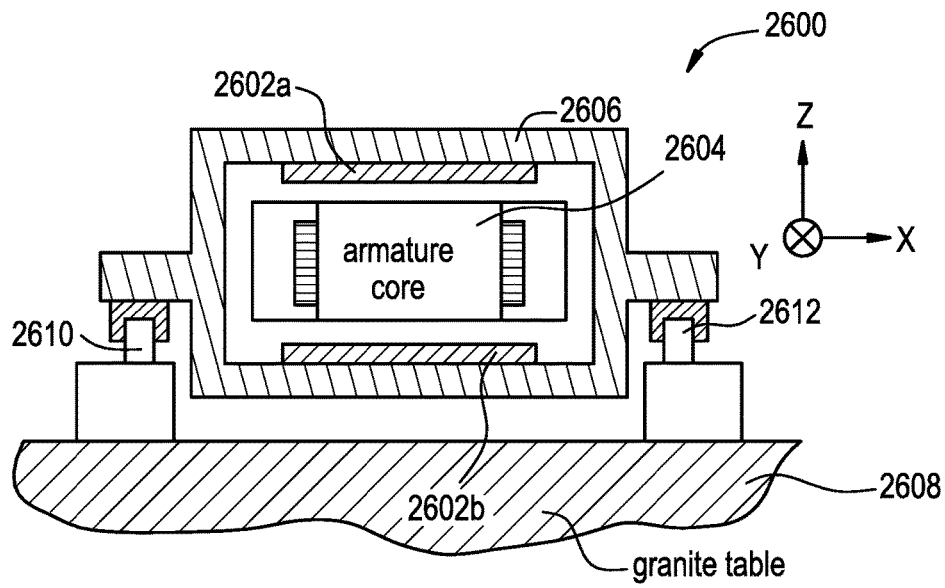
FIG. 26A is a front view illustration of one embodiment of a fine-tooth iron-core permanent magnet linear motor having a moving short magnet and a stationary long coil.
Figure 26B:
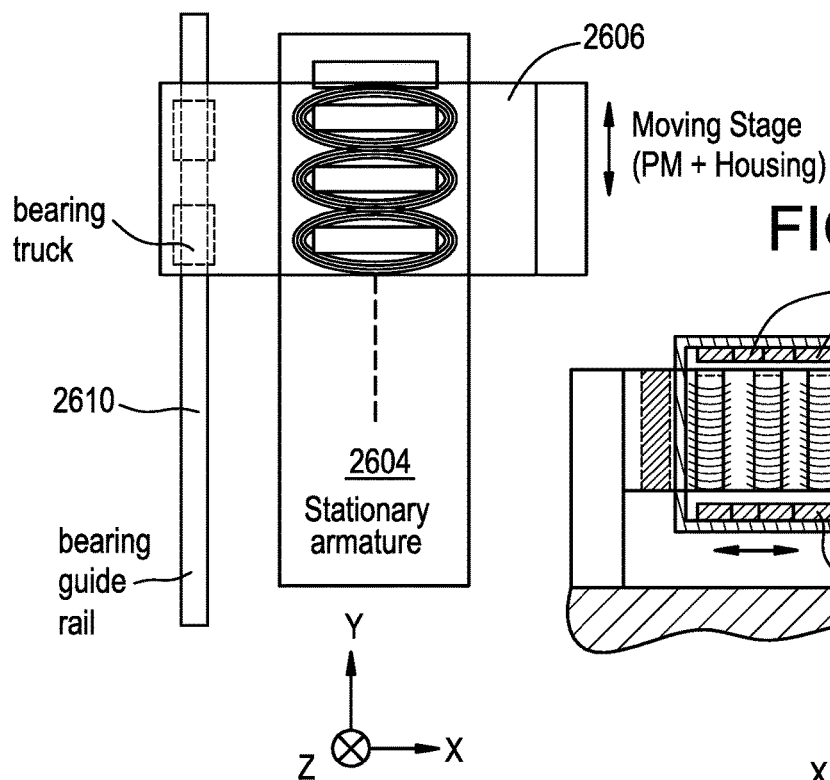
FIG. 26B is a top view of the fine-tooth linear motor of FIG. 26A.
Figure 26C:
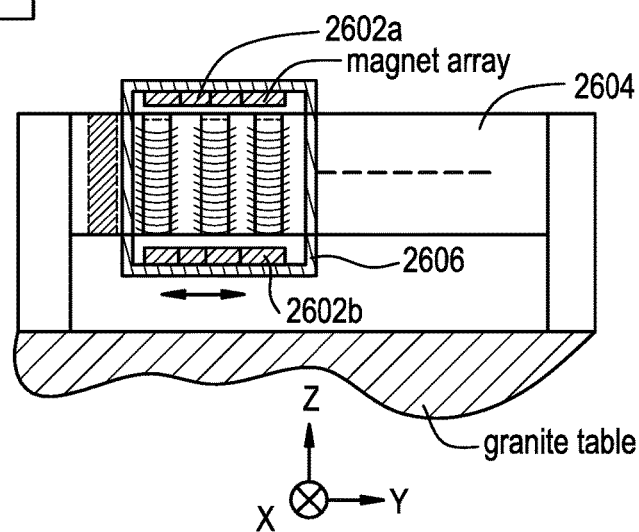
FIG. 26C is a side view of the fine-tooth linear motor of FIG. 27A.

FIGS. 26A-26C illustrate another embodiment of a linear motor 2600 where moving short magnets 2602 are positioned outside of a stationary central armature core 2604. Unlike the above-described embodiments where the short magnets are sandwiched between two armatures, here upper and lower moving magnet arrays 2602a, 2602b are positioned in upper and lower parts of the moving stage structure 2606. The long iron-core armature 2604 in the middle can be made out of two armatures mounted back to back. Note that in some embodiments for the illustrated double-sided configuration, the iron-core armature 2604 can be customized as one piece without a back yoke since the magnetic flux can return through the magnet track. In this embodiment, it can be easy to switch between single- and double-sided configurations by simply adding or removing one of the magnet tracks 2602a, 2602b. The structure 2606 can move relative to a support surface 2608 along guiderails 2610, 2612.

Embodiments such as those described above that employ moving short magnet stages and stationary long coils can present a number of advantages. For example, the moving mass of magnet tracks can be smaller than the iron-core armatures, meaning that increased stage acceleration can be achieved for the same magnet force. Further, the long and heavy armatures can add significant mass to the stationary portion of the system. These heavy armatures, together with base structures and support surfaces, in comparison to the light moving magnets can allow achievement of a high mass ratio to handle high reaction forces during operation of the motor. Still further, this configuration can allow the minimization of moving cables, thereby making the assembly simpler and the minimizing undesired cable dynamics. But longer armatures than magnets can also mean that there are parts of coils which are not engaged with magnets. These un-engaged coils can increase the electric power dissipation. To avoid this, the armature can be divided into several sections and un-engaged windings can be selectively turned off. In certain cases, such a strategy can require an increased number of power amplifiers and also can cause the traveling of heat along the long armature. Such moving heat sources can be troublesome in precision machines, as thermal deformation never reaches steady-state, so in some cases it can be best to operate all coils despite the larger power dissipation.

Figure 27A:
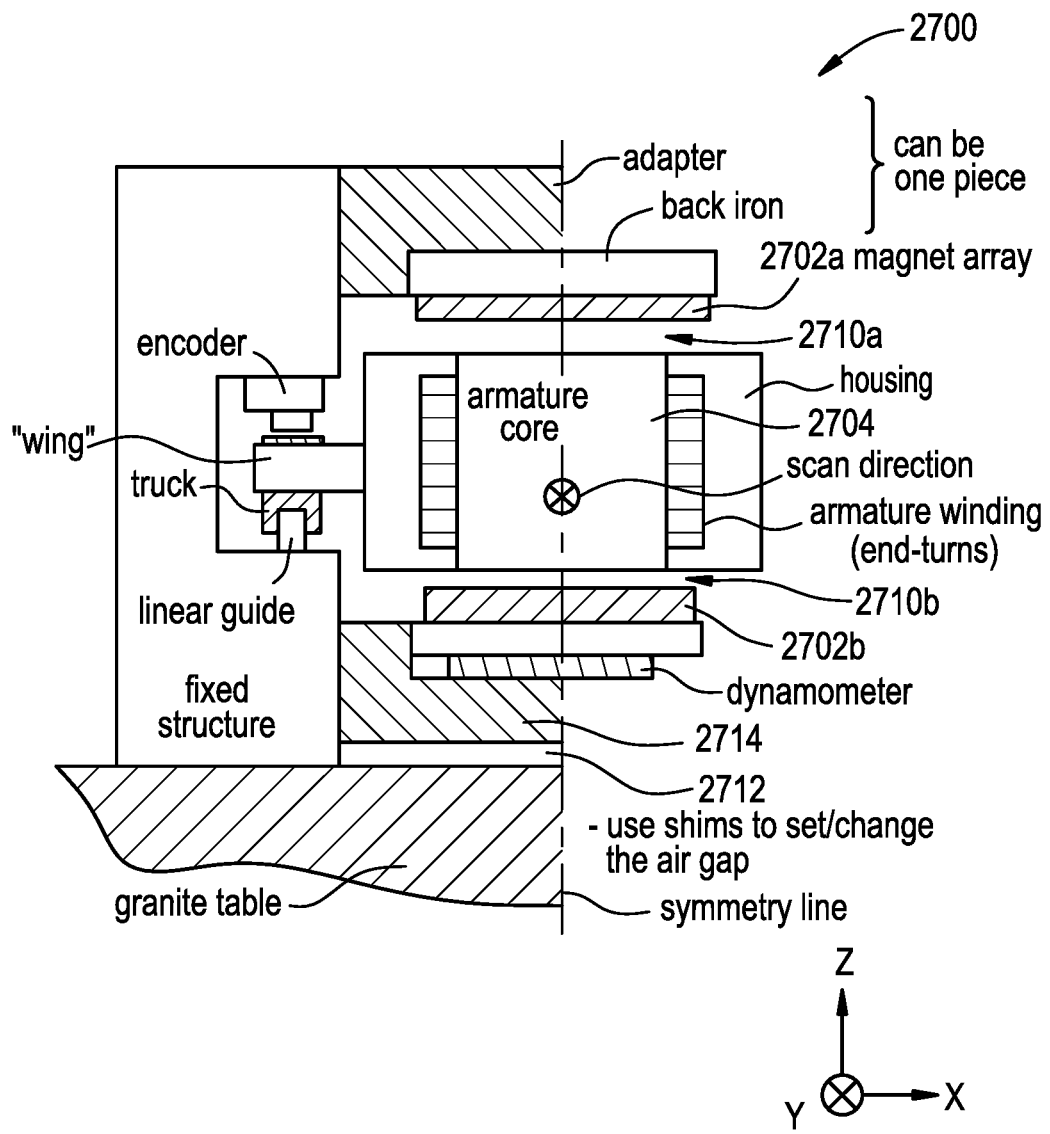
FIG. 27A is a front view illustration of one embodiment of a fine-tooth iron-core permanent magnet linear motor having a stationary long magnet and a moving short coil.
Figure 27B:
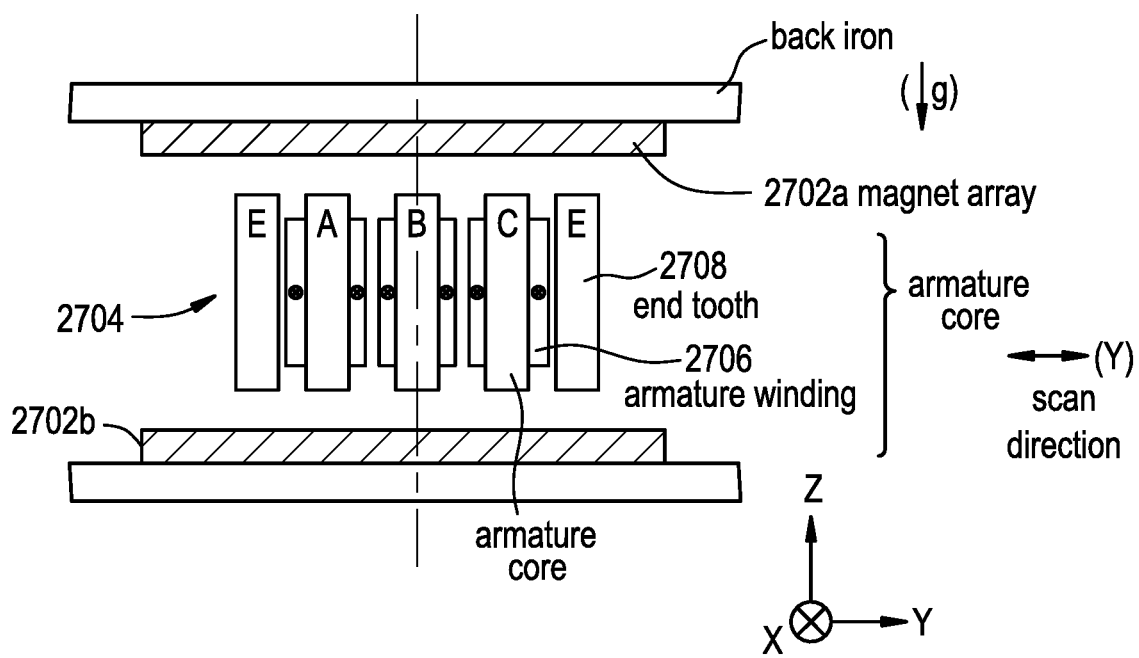
FIG. 27B is a side view of the fine-tooth linear motor of FIG. 27A.
Figure 28:
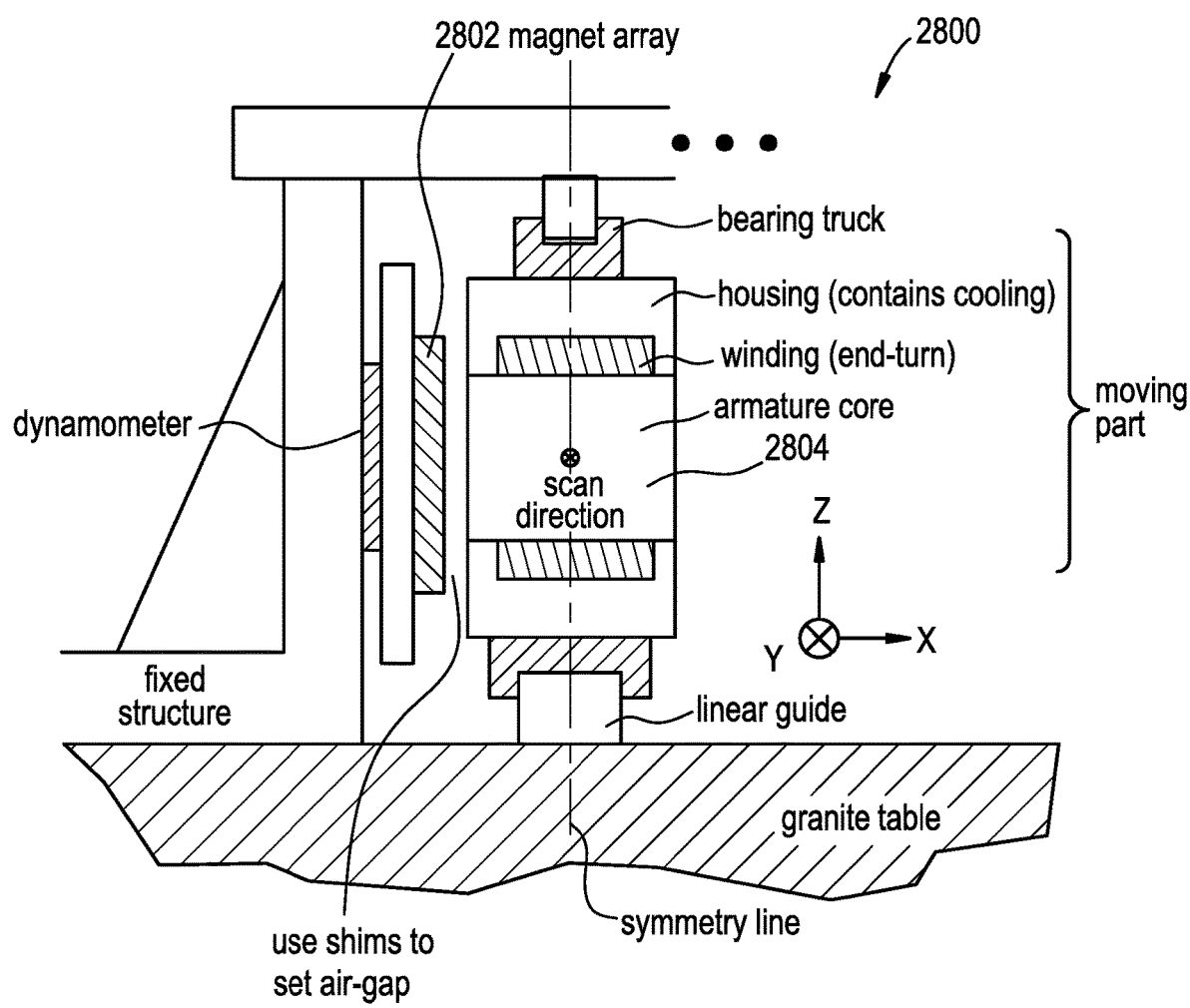
FIG. 28 is a front view illustration of one embodiment of a fine-tooth iron-core permanent magnet linear motor having a stationary long magnet and a moving short coil.

The second magnetic motor configuration includes a stationary long magnet and a moving short coil, which is the opposite of the previous magnetic structure described above. One embodiment of such a motor 2700 is illustrated in FIGS. 27A and 27B. The overall testbed structure can remain the same as described above but the magnet tracks 2702a, 2702b can be long, stationary, and located outside, while the moving iron-core armature 2704 can be sandwiched between the upper and lower magnet tracks 2702a, 2702b. The side-view sketch of FIG. 27B schematically shows a conventional 3-phase armature 2704 with the coils 2706 lump-wound on iron cores 2708. The moving short armature 2704 can be placed between two magnet tracks 2702a, 2702b without a back yoke. As before, the motor air gap 2710a, 2710b can be set or adjusted by using shims placed in a gap 2712 below the bottom magnet track support structure 2714. The modular design of this embodiments eases disassembly and reassembly for changing motors or switching between single- and double-sided configurations. FIG. 28 illustrates a similar embodiment of a motor 2800 that is rotated 90° relative to the motor 2700 and includes vertically-oriented and stationary magnet array 2802 interacting with moving armature 2804.

The moving short armature designs in FIGS. 27A-28 can be advantageous in that all the coils are always engaged with magnets and there is no unnecessary power consumption, and a reduced number of power amplifiers can be required, thereby making the electric assembly simpler. For example, in some embodiments only one commercial 3-phase power amplifier can be sufficient to drive a conventional 3-phase motor when the armature is short and moving. In the case of the above-described 5-phase fine-tooth motor, a maximum of 5 amplifiers would be required. These are some of the reasons why the magnetic motor configuration of stationary long magnet and moving short coil is the most common type in industry. However, the moving armature can have a mass larger than that of the magnet arrays, which can reduce the performance of the motor in comparison to a moving magnet stage for any given power level. This can result in lower achievable stage acceleration and a lower mass ratio between stationary and moving parts for handling reaction forces. Further, in some embodiments motor armatures can include cooling mechanisms, such as a liquid cooling system, which can exacerbate the problem by adding still further mass. A cooling structure can be omitted for motors operated on a short duty cycle that do not approach thermal limits, but cooling can be required for certain commercial-level motors operating at high acceleration, such as the above-described lithography scanner devices. In addition to increasing moving mass, the armature contains numerous coils and possibly cooling water supply lines, meaning potentially a large number of umbilical cables can be required with a moving armature motor design.

Figure 29:
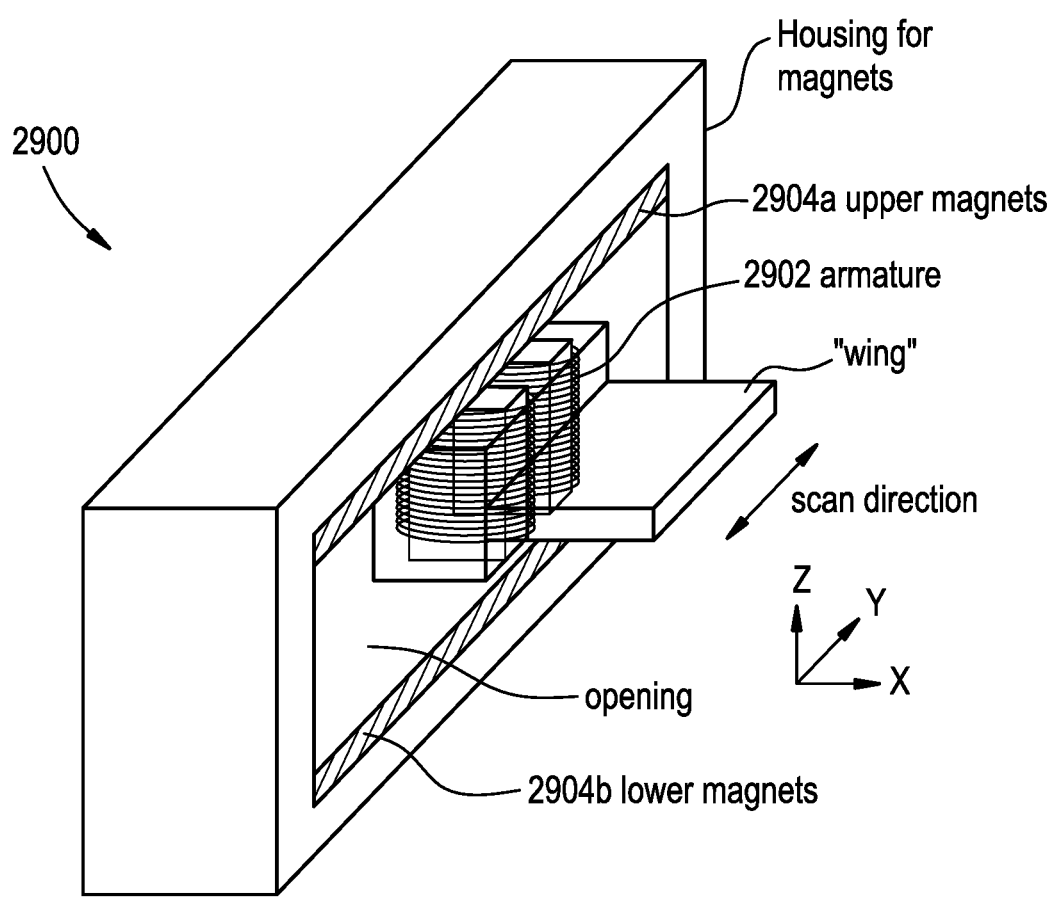
FIG. 29 is a perspective view illustration of one embodiment of a fine-tooth iron-core permanent magnet linear motor having a moving or stationary long magnet and a stationary or moving short coil.

The third magnetic motor configuration is a moving long magnet and stationary short coil. One embodiment of a motor 2900 having such a configuration is shown in FIG. 29. This design can be understood as either a moving long magnet with a stationary short coil or a stationary long magnet with a moving short coil, depending on the choice of which is the moving part. In the illustrated embodiment, the armature 2902 is disposed between upper and lower magnet arrays 2904a, 2904b. Either component can be configured as the moving stage or the stationary stage. For example, if the magnet arrays 2904a, 2904b are stationary and the armature 2902 moves with its motion guided by bearing systems (not shown), then the motor 2900 can be similar to the motor 2700 of FIGS. 27A and 27B. If, on the other hand, the magnet arrays 2904a, 2904b are configured to move and the armature 2902 is stationary, then the motor 2900 can be similar to the motor 2400 of FIGS. 24A-24C where the moving magnet tracks are longer and the stationary armatures shorter.

Both of the above-described motor designs (e.g., moving magnets disposed outside or inside of a long moving magnet case) can have the above-described advantages associated with short armatures. For example, all coils can be engaged with magnets at all times, thereby minimizing unnecessary power consumption and the number of required power amplifiers. Further, the number of umbilical cables can be minimized. The moving mass, however, can still be larger than embodiments that utilize a moving short magnet array and this can be a significant factor in achieving high acceleration.

Figure 30A:
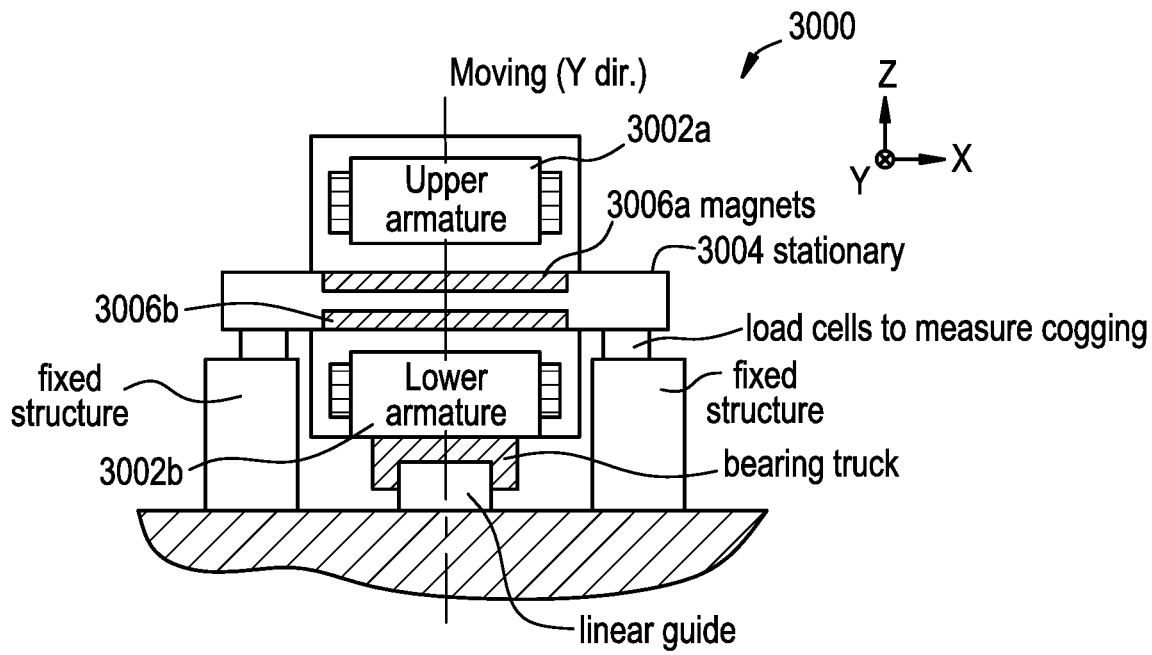
FIG. 30A is a front view illustration of one embodiment of a fine-tooth iron-core permanent magnet linear motor having a stationary short magnet and a moving long coil.
Figure 30B:
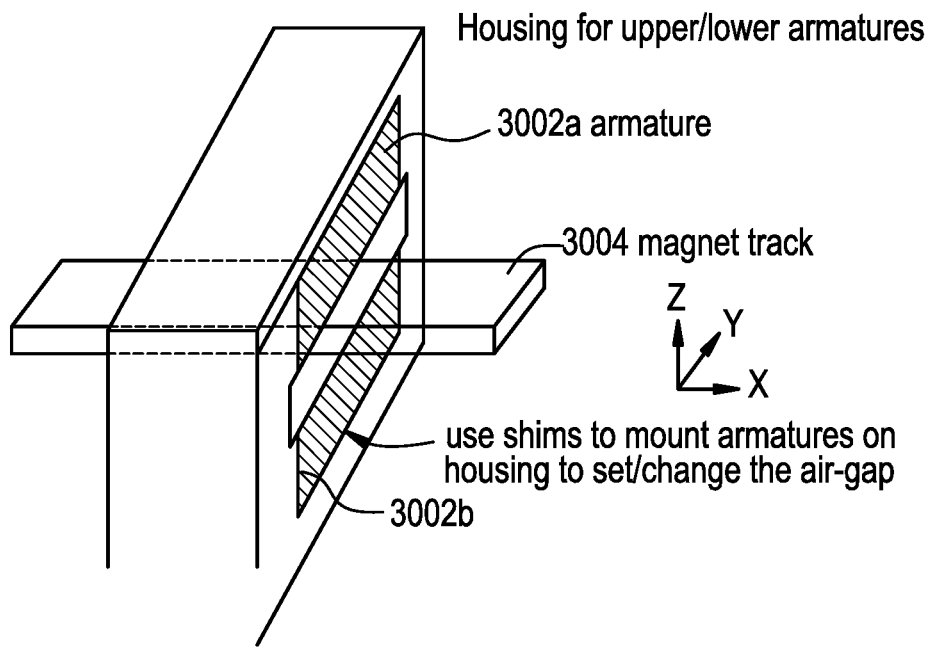
FIG. 30B is a perspective view of the fine-tooth linear motor of FIG. 30A.

A further motor configuration variant is a stationary short magnet and a moving long coil. One embodiment of a motor 3000 having such a configuration is illustrated in FIGS. 30A and 30B. As can be seen in the figure, the motor 3000 is a reversed (between moving and stationary parts) version of the motor 2400 in FIGS. 24A-24C with long moving armatures 3002a, 3002b positioned outside of a stationary structure 3004 having upper and lower magnet arrays 3006a, 3006b. In an alternative embodiment, however, the moving long armatures 3002a, 3002b can be positioned inside of the stationary magnet arrays 3006a, 3006b. One example of this can be seen by reversing the moving and stationary components of the motor 2600 shown in FIGS. 26A-26C.

Figure 31A:
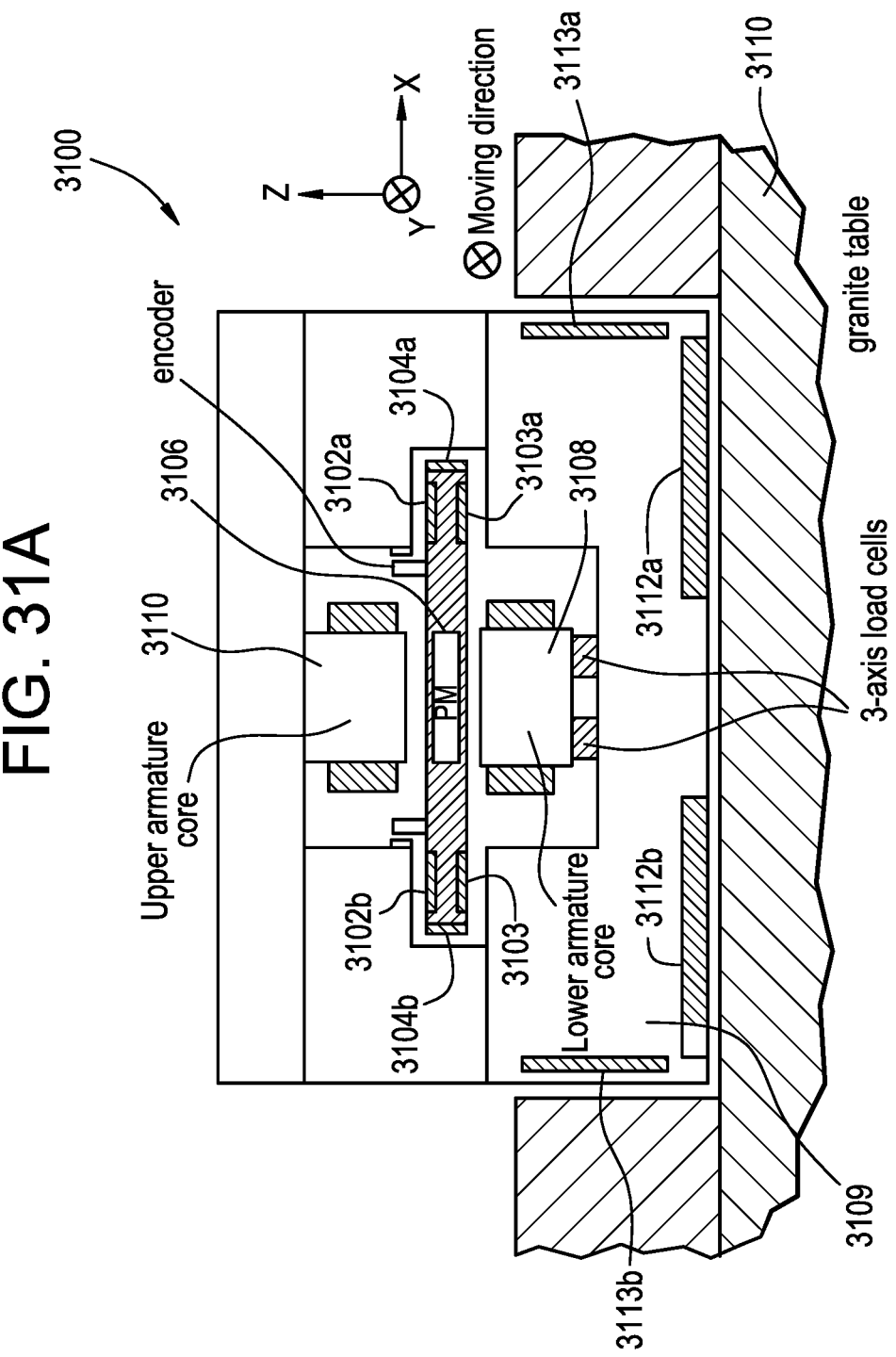
FIG. 31A is a front view illustration of one embodiment of a fine-tooth iron-core permanent magnet linear motor having air bearings preloaded via symmetrical balancing.
Figure 31B:
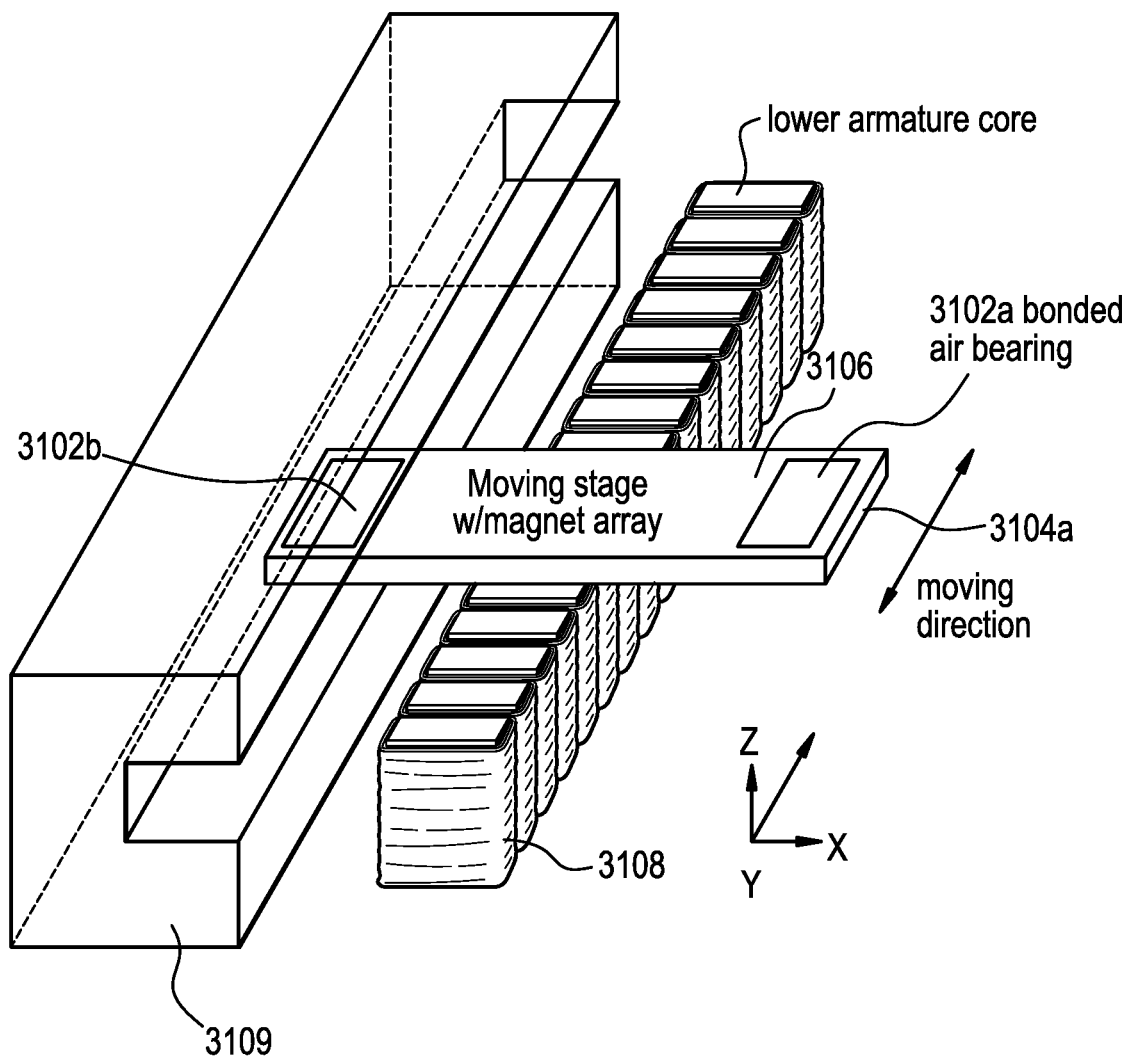
FIG. 31B is a perspective view of the fine-tooth linear motor of FIG. 31A.

In any of the above-described embodiments, motion of the moving stage of the motor can be guided by any of a variety of bearing or guiding structures. In some embodiments, air bearings can be utilized to minimize friction and vibro-acoustic noise that can be generated by sliding or rolling contact surfaces. In order for air bearings to work, the bearings have to be floated by compressed air and at the same time pressed down by a preloading force against a guide surface. There can be many different ways of preloading, and one of these is to use the same bearings in the opposite direction. FIGS. 31A and 31B show one embodiment of a motor 3100 in which opposed air bearings 3102a, 3102b, 3103a, 3103b, 3104a, and 3104b are utilized. As discussed above, this embodiment utilizes a magnetic motor configuration of a moving short magnet 3106 and a stationary long coil 3108 (with a possible second stationary long coil 3110 in a double-sided configuration). Air bearings 3102a, 3102b, 3103a, 3103b can be used both on the top and bottom of the moving stage 3106 to constrain its motion in the vertical or Z-axis direction, and air bearings 3104a, 3104b can be used symmetrically on both sides to constrain lateral motion in the X-axis direction. Note that the air bearings in FIGS. 31A and 31B are schematically represented by bonded air bearings, but other types of bearings (e.g., bearings with different mounting configurations, etc.) can also be employed.

FIG. 31A also illustrates that the motor 3100 can use the base structure 3109 as a balance mass to dissipate reaction energy by mounting the base structure to a support surface 3110 using air bearings 3112a, 3112b, 3113a, 3113b. For example, a flat portion of the support surface 3110 can be a guide surface and, with a proper selection of air bearing size, the bearings 3112a, 3112b can be preloaded by the weight of the base structure 3109. Lateral motion of the balance mass can be constrained by opposing side bearings 3113a, 3113b against vertical portions of the support surface 3110. Use of this balance mass configuration may not be necessary in lower acceleration applications (e.g., targeting acceleration up to about 45 m/s$^2$ in some embodiments) where there is already a sufficiently high mass ratio between stationary and moving masses, but can be advantageous in higher acceleration applications (e.g., targeting acceleration as high as 200 m/s$^2$ or 20 G's). For example, double-sided motor configurations targeting these higher acceleration values may benefit from such a configuration.

Figure 32:
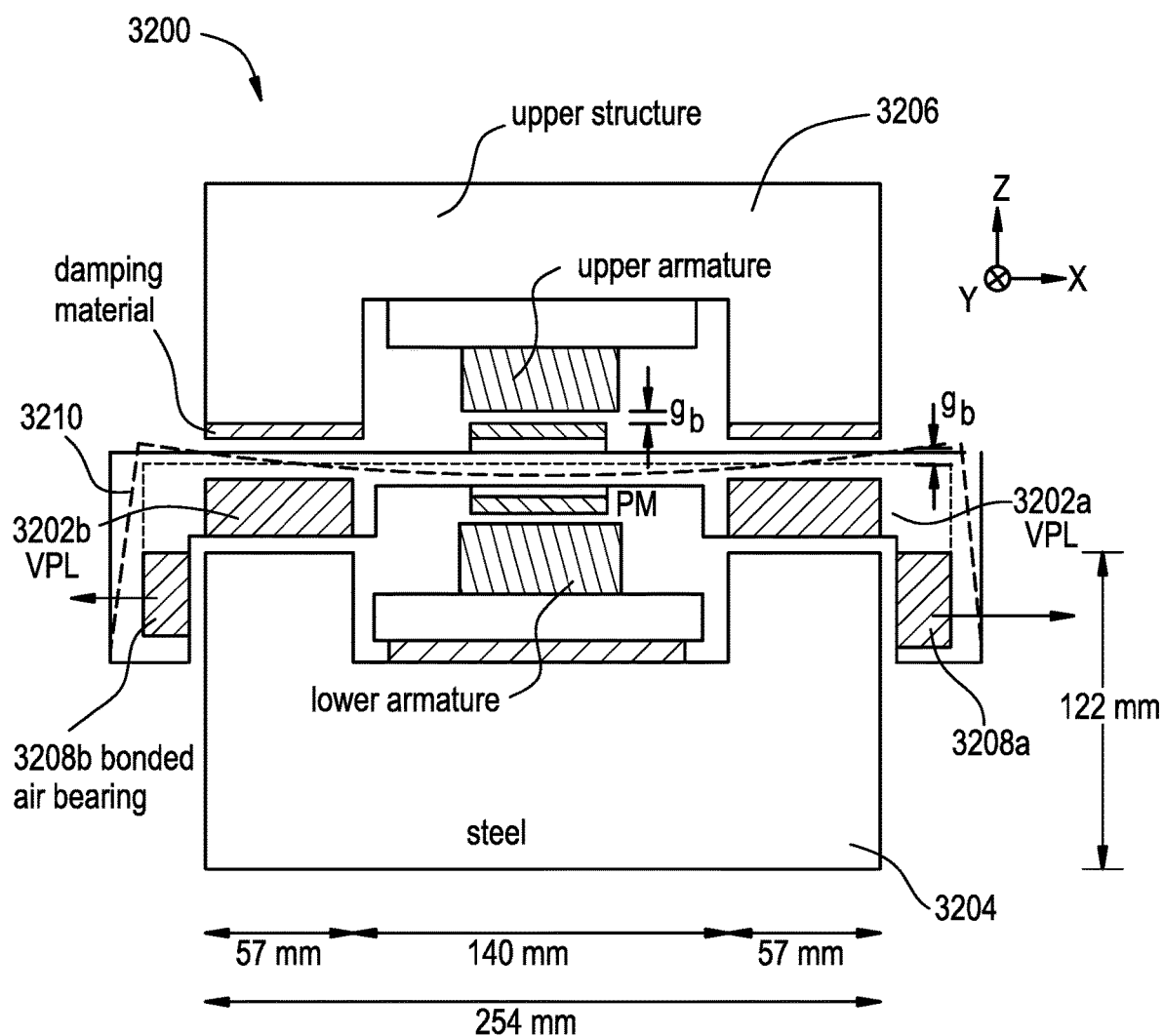
FIG. 32 is a front view illustration of one embodiment of a fine-tooth iron-core permanent magnet linear motor having air bearings with vacuum preloading.

In some embodiments, use of counter guide surfaces can be avoided by preloading air bearings by vacuum. One embodiment of a motor 3200 having vacuum preloaded (VPL) air bearings is shown in FIG. 32. As shown in the figure, the top bearings 3202a, 3202b can be vacuum-preloaded, thereby allowing the entire bearing system to be operational with one base guide bar 3204. This can allow a single-sided motor configuration to be a stand-alone system without the need for the entire upper structure 3206. In such an embodiments, side bearings can utilize either a regular air bearing 3208a preloaded by an opposed bearing 3208b from the other side or a VPL bearing on only one side (e.g., bearing 3208a alone with bearing 3208b removed). Using opposing bearings on both sides can provide higher stiffness, but it can also cause a bending moment on the stage, as depicted in FIG. 32 with the dashed line 3210. With VPL bearings on one side, the bending moment can be avoided.

Figure 33A:
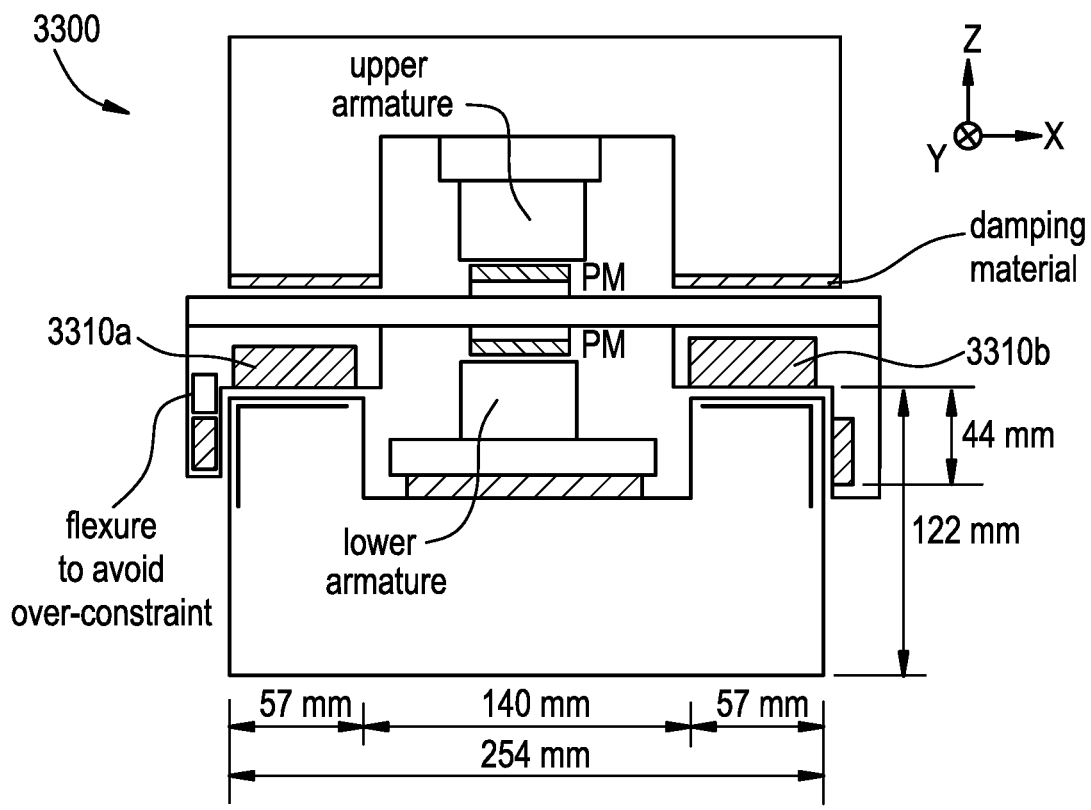
FIG. 33A is a front view illustration of one embodiment of a fine-tooth iron-core permanent magnet linear motor having air bearings and preloading magnets.
Figure 33B:
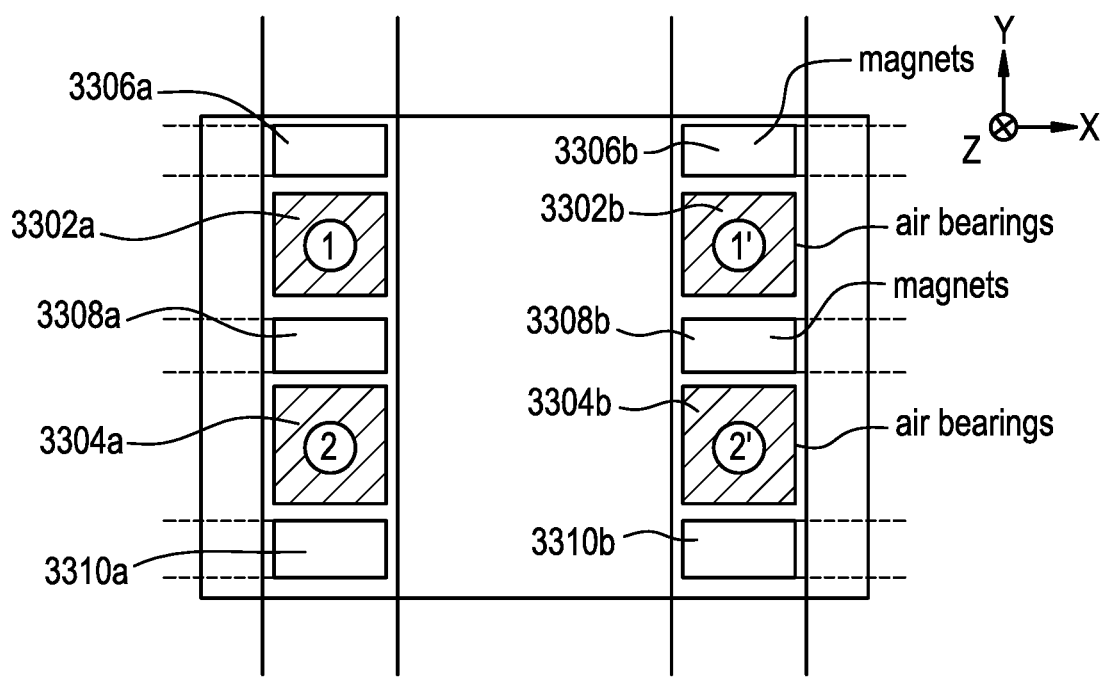
FIG. 33B is a top view of the fine-tooth linear motor of FIG. 33A.

Another way to preload the air bearings without the need for counter flat guide surfaces is to use magnetic forces. In many cases, an array of magnets can be used with steel straps to provide proper preloading forces to air bearings. FIGS. 33A and 33B illustrate one embodiment of a motor 3300 having air bearings preloaded by magnets. FIG. 33B illustrates a top view that schematically shows an arrangement of top air bearings 3302a, 3302b, 3304a, 3304b and preloading magnets 3306a, 3306b, 3308a, 3308b, 3310a, 3310b disposed thereabout. The magnetic pressure from such magnets is, in general, higher than the vacuum used in VPL bearings, so it can be more space-efficient to use magnetic preloading. For example, using magnets the air bearings can be preloaded at the same level with only about 10% of the guide surface area as compared to using vacuum, thereby not compromising the total travel length and the achievable stage acceleration.

Figure 34A:
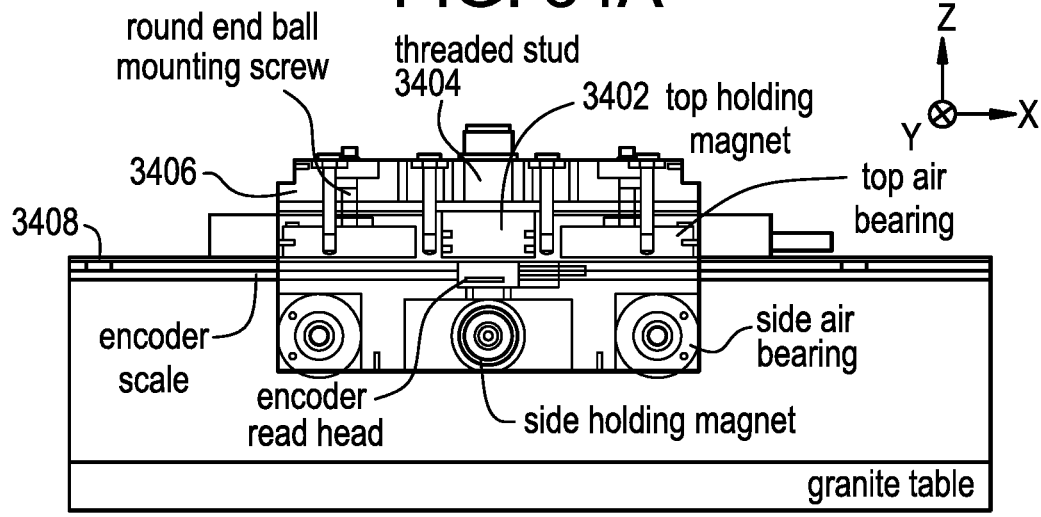
FIG. 34A is a side view illustration of one embodiment of a linear motor having air bearings and preloading magnets.
Figure 34B:
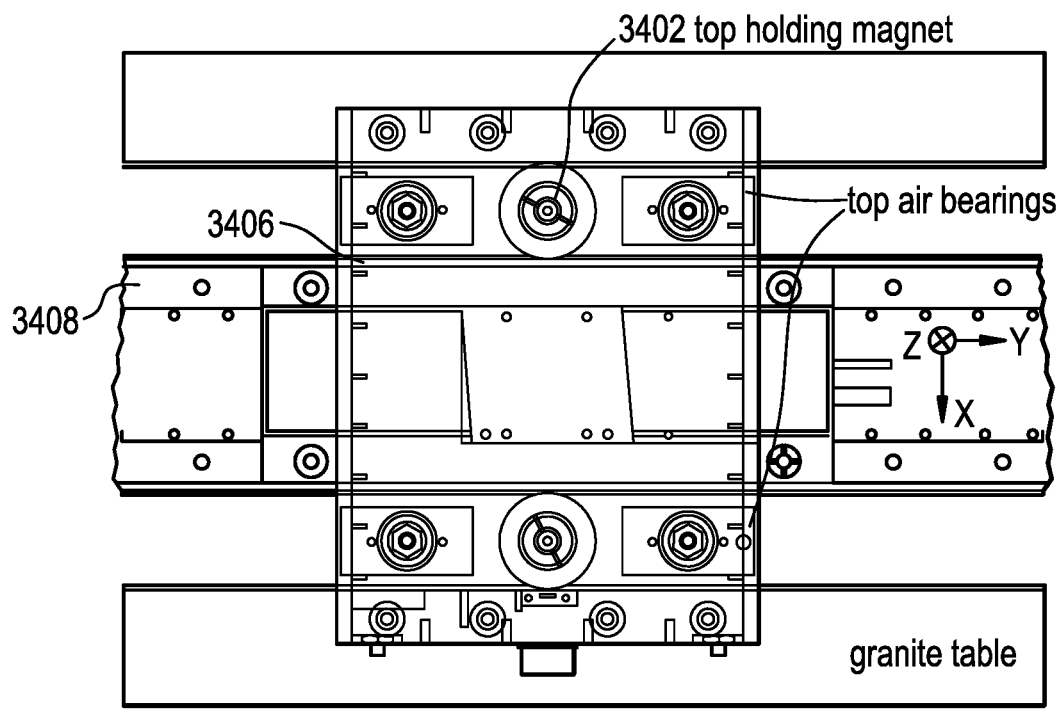
FIG. 34B is a top view of the linear motor of FIG. 34A.

In some embodiments of either a single- or double-sided motor configuration (and using either a conventional or a fine-tooth motor), there can be a need to control preloading force. One way to do this is to change magnet sizes for different preloading levels using magnet pockets formed in the stage. Another way shown in FIGS. 34A and 34B is to use magnets 3402 coupled to threaded studs 3404 that can variably extend from the moving stage 3406 to adjust the magnetic gap between magnets 3402 and the guide surface 3408.

Figure 35:
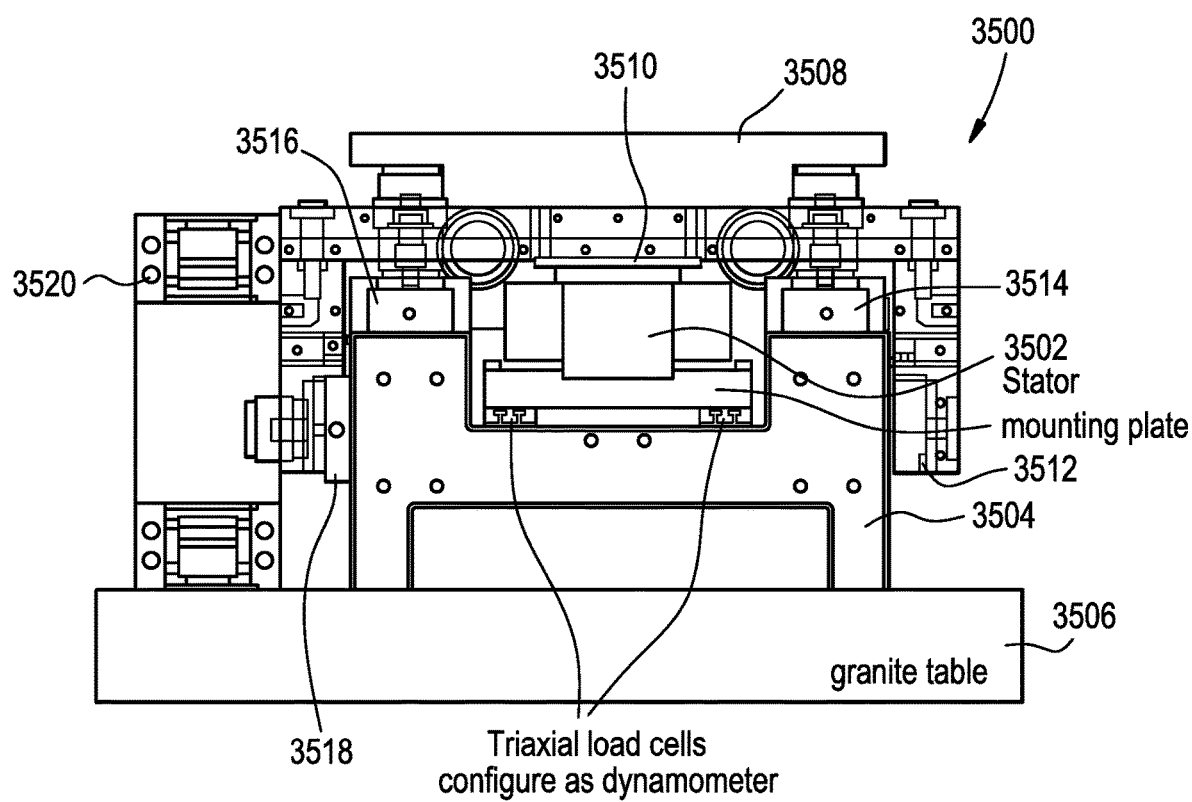
FIG. 35 is a front view illustration of one embodiment of a single-sided fine-tooth iron-core permanent magnet linear motor.
Figure 36:
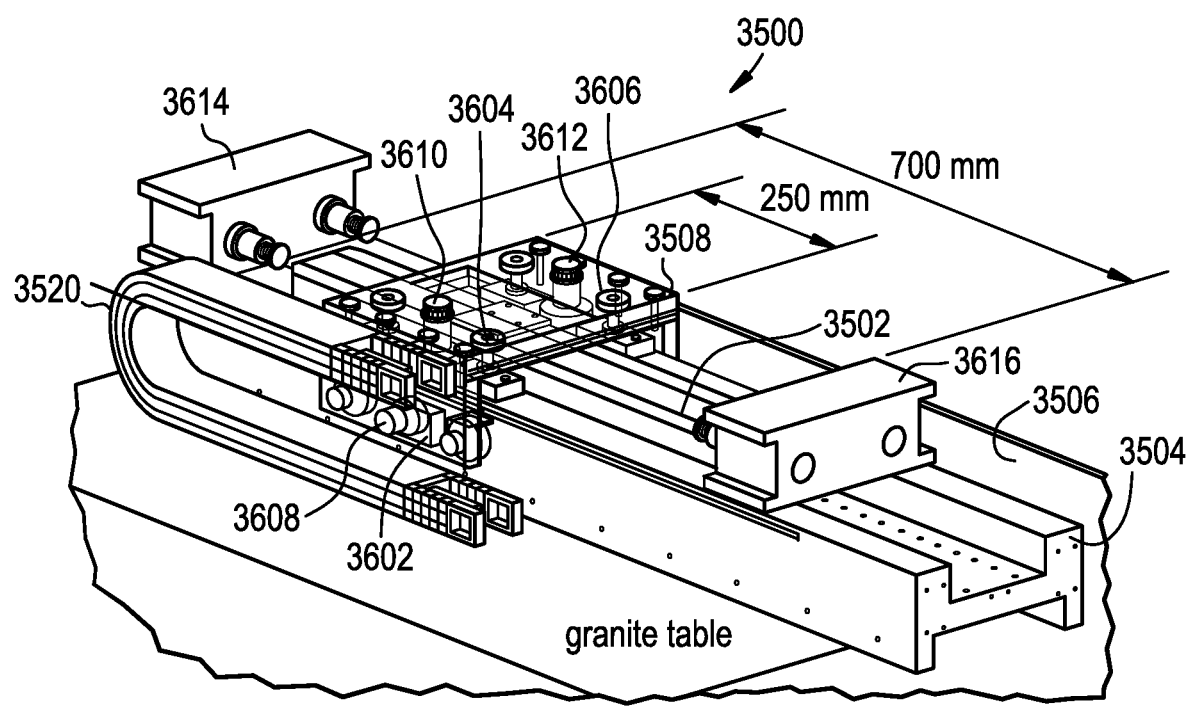
FIG. 36 is a perspective view of the single-sided fine-tooth linear motor of FIG. 35.

FIG. 35 illustrates a front view (i.e., along a movement axis) of one embodiment of a fine-tooth linear motor 3500 according to the teachings provided herein. FIG. 36 illustrates a perspective view of the motor 3500. The motor 3500 can include a stationary armature 3502 mounted to a support stage 3504 that sits on a support surface 3506. A moving stage 3508 having an array of permanent magnets 3510 rides on air bearings 3512, 3514, 3516, 3518 to facilitate reduced friction travel along the support stage 3504. The air bearings can be preloaded using magnets 3602, 3604, 3606 mounted on threaded studs 3608, 3610, 3612 received in bores formed in the moving stage 3508, as described above. An umbilical carrier 3520 can connect various components of or on the moving stage 3508 to the support surface 3506 (e.g., air supply lines, sensor communication lines, etc.). Further, first and second stops 3614, 3616 can be placed at various locations along a length of the support stage 3504 to limit travel of the moving stage 3508.

Figure 37:
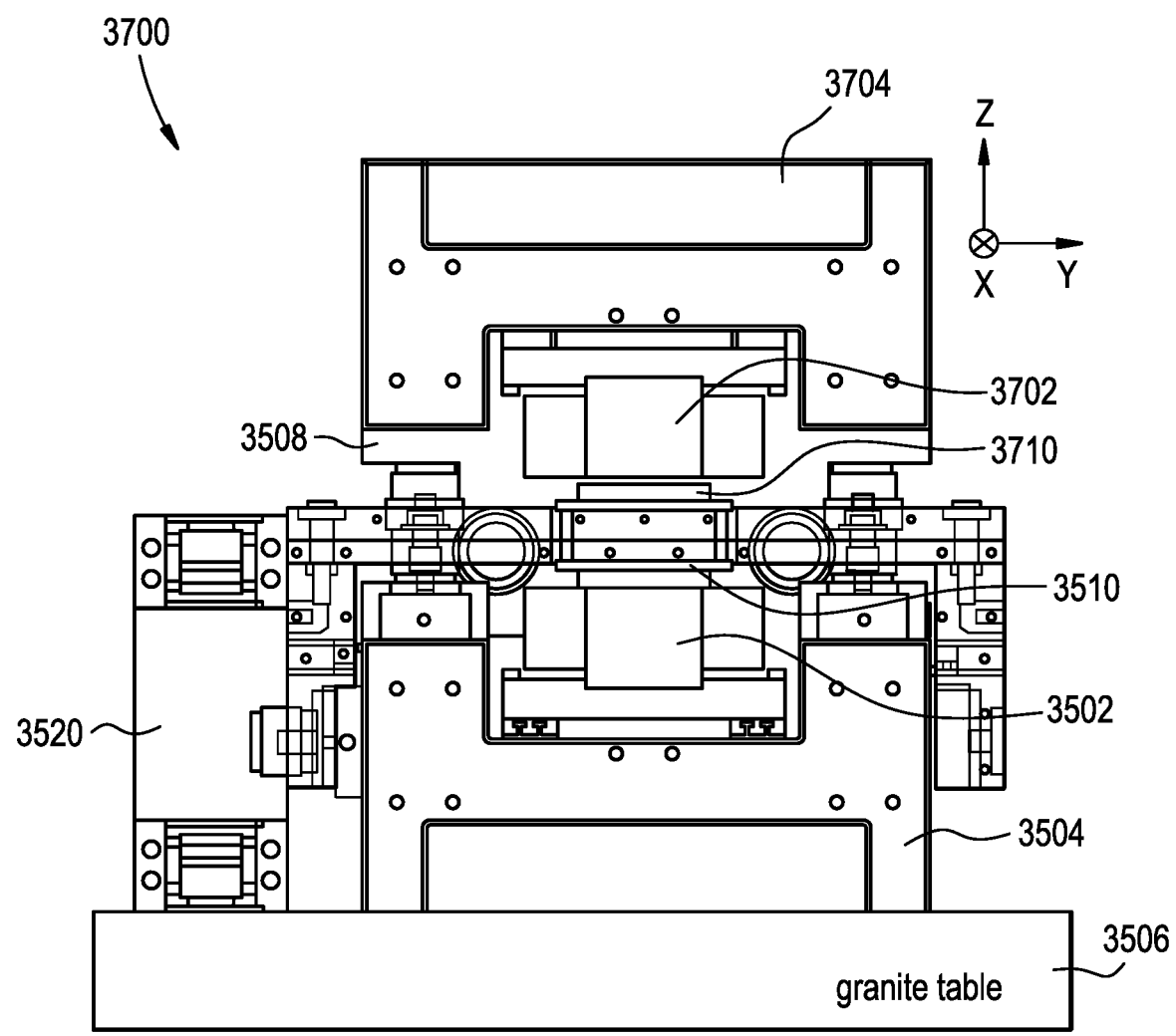
FIG. 37 is a front view illustration of one embodiment of a double-sided fine-tooth iron-core permanent magnet linear motor.
Figure 38:
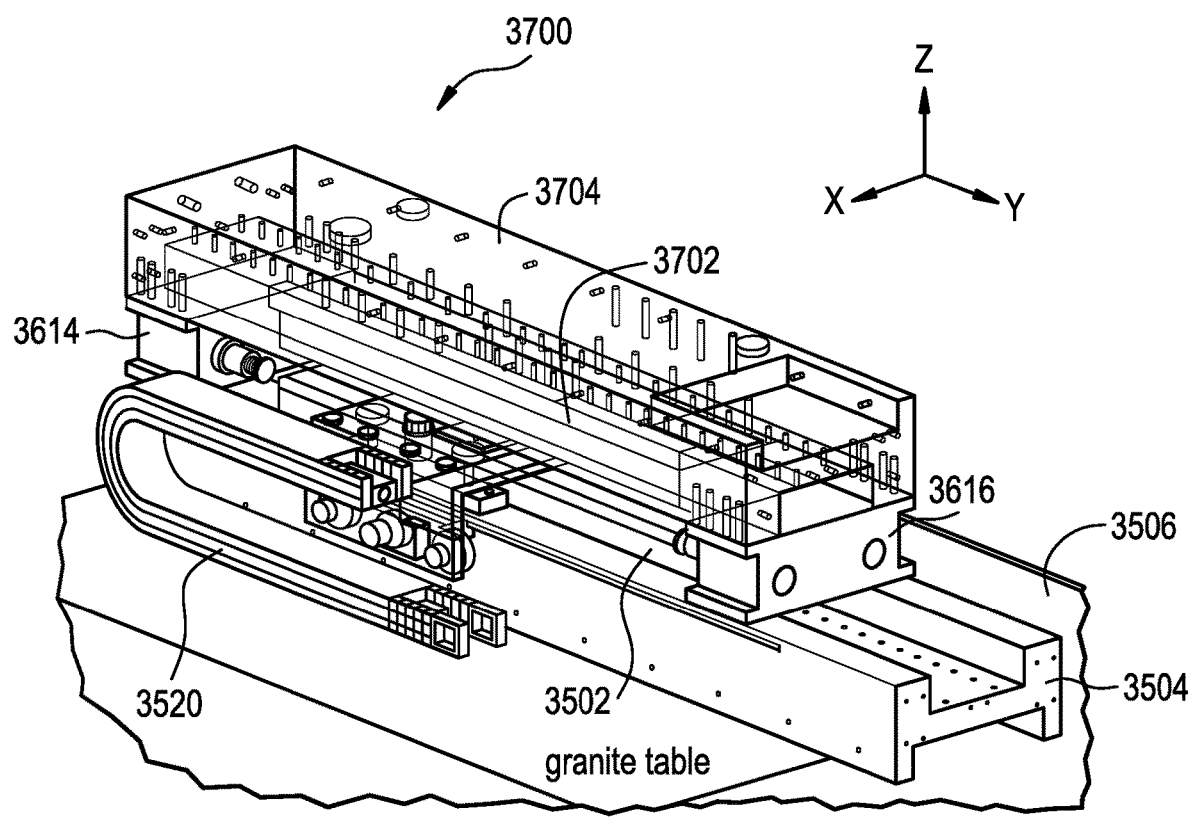
FIG. 38 is a partially transparent perspective view of the double-sided fine-tooth linear motor of FIG. 37.
Figure 39:
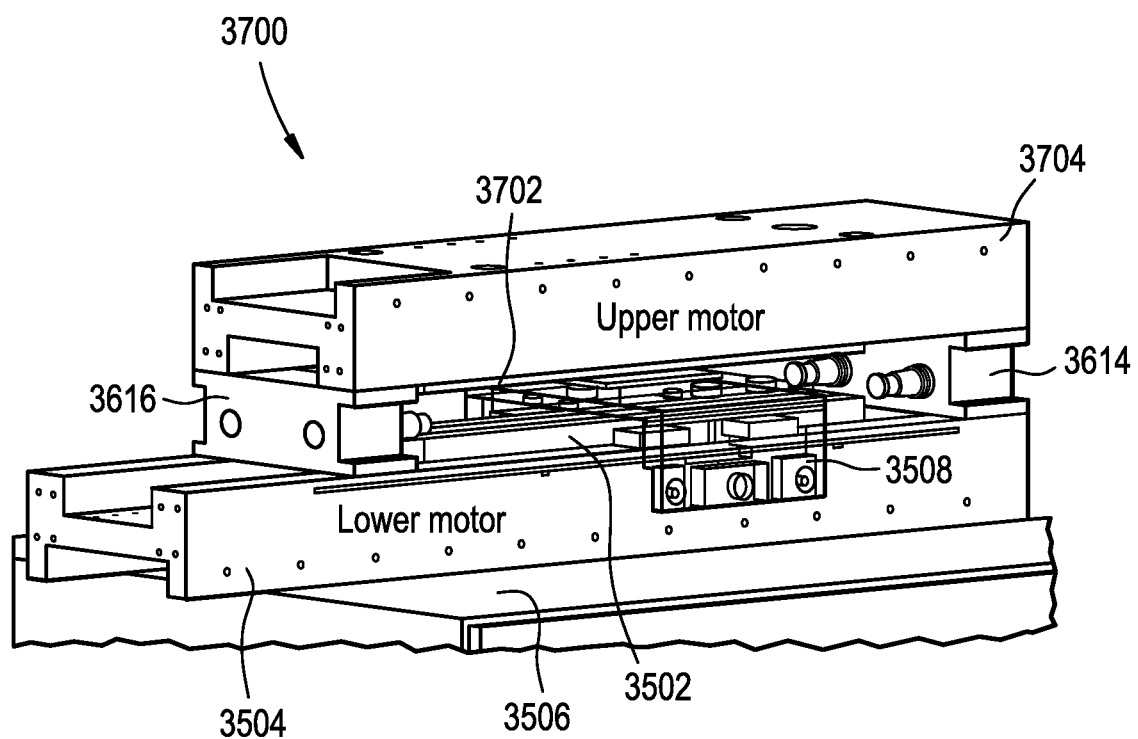
FIG. 39 is an alternative perspective view of the double-sided fine-tooth linear motor of FIG. 37.

The fine-tooth motor 3500 illustrated in FIGS. 35 and 36 is a so-called single-sided motor configuration because there is a single armature interacting with a single permanent magnet array (i.e., an armature on a single side of the moving stage 3504 interacts with a magnet array disposed on one side of the moving stage). FIGS. 37-39 illustrate an alternative embodiment of a motor 3700 that is similar to the motor 3500 but has a so-called double-sided motor configuration. In this embodiment, a second armature 3702 is coupled to a second support stage 3704 that is mounted above the support stage 3504 such that the moving stage 3508 is disposed therebetween. Further, the moving stage 3508 can include a second array of permanent magnets 3710 mounted to an opposite side thereof from the array 3510. In use, the moving stage 3508 can be driven by excitation of coils in the first armature 3502 that interact with the permanent magnet array 3510 of the moving stage 3508 and by excitation of coils the second armature 3702 that interact with the second permanent magnet array 3710 of the moving stage. Double-sided motor configurations can have advantages in that they can achieve higher force performance due to the dual armatures and permanent magnet arrays. Further, the opposed positions of the permanent magnet arrays and armatures can reduce vibro-acoustic noise even further by providing perfect cancelation of force disturbances in the normal direction (i.e., along the Z-axis of FIGS. 37 and 38).

As noted above, in certain embodiments with small temporal duty cycles and lower power levels linear motors can be operated without active cooling. In such embodiments, the motor thermal mass can be relied upon to absorb power spikes and air cooling to dissipate the average power. In higher power and more continuous operating conditions (e.g., for industrial high-power continuous operations, such as in photo-lithography machines, etc.), however, it can be important to have a cooling mechanism to remove heat from the motor. Accordingly, in some embodiments, the fine-tooth linear motors described herein can include such a cooling mechanism. A number of different mechanisms are possible and, in some embodiments, liquid cooling can be utilized. In the case of fine-tooth motors with narrow iron-core teeth and slots, liquid cooling can be implemented on the end-turns for large conduction surface contact directly with the coils.

Figure 40:
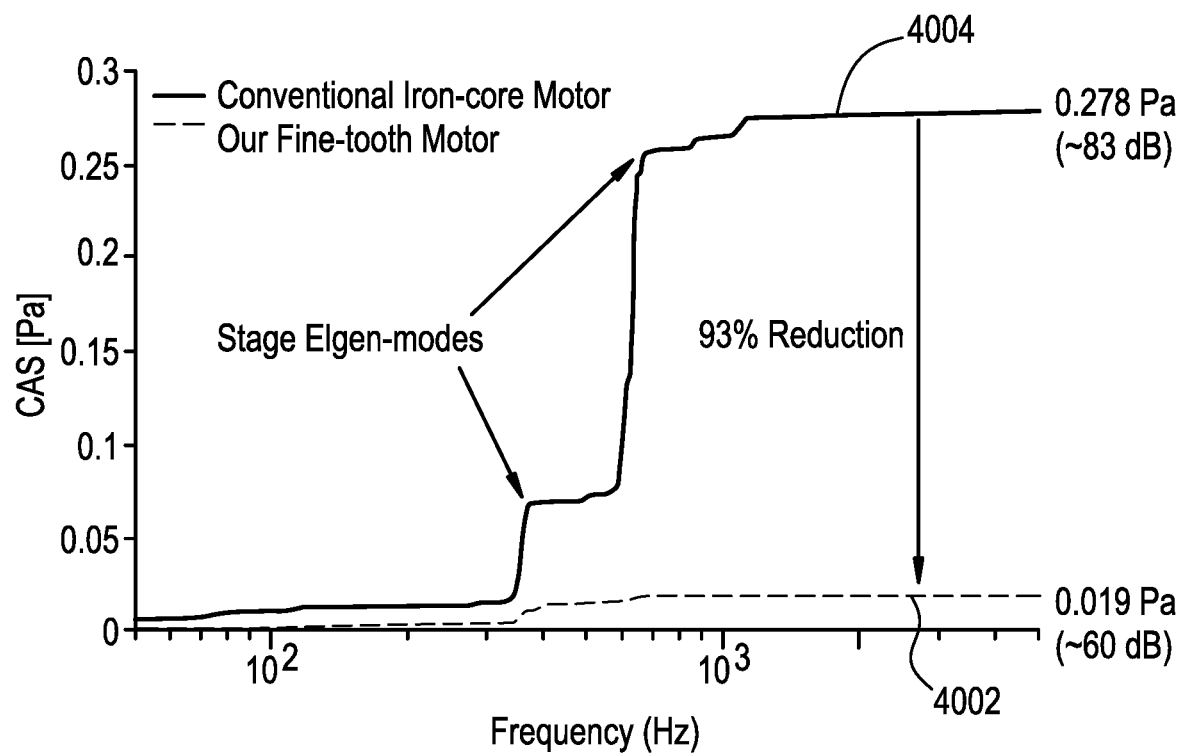
FIG. 40 is a plot of cumulative amplitude spectrum (CAS) of measured acoustic noise for one embodiment of a conventional iron-core linear motor and one embodiment of a fine-tooth iron-core permanent magnet linear motor.

The above-described embodiments of fine-tooth iron-core permanent magnet linear synchronous motors can achieve significant reductions in vibro-acoustic noise during operation when compared to conventional 3-4 combination linear motors. FIG. 40 shows a comparison of a cumulative amplitude spectrum (CAS) of measured acoustic noise between one embodiment of a fine-tooth motor (line 4002) and one embodiment of a conventional motor (line 4004). Note that the cumulative amplitude spectrum (CAS) is the standard deviation integrated over frequencies. The value at the end of the CAS curve, therefore, shows the total standard deviation in the chosen bandwidth, which is up to 5 kHz for the measured acoustic noise in FIG. 40. The CAS data shows that the fine-tooth motor has an acoustic noise reduction of 93% in Pascals as compared with the conventional motor in an acceleration region with both motors using non-skewed magnets. In terms of the sound pressure level (SPL), this significant noise reduction from 83 dB to 60 dB is qualitatively equivalent to the noise difference felt between a big truck passing by and a quiet office.

FIGS. 41 and 42 present the vibro-acoustic noise of one embodiment of a fine-tooth motor in comparison to that of an embodiment of a conventional motor in greater detail to compare the overall noise levels. For the data presented in these figures, the motor noise was measured while the stage was cycled following a fourth order position trajectory with a maximum acceleration of 25 m/s$^2$ and a maximum velocity of 1 m/s.

The vibrational noise (FIG. 41) during acceleration with the conventional motor (a TL18 by Tecnotion) using non-skewed magnets shows the average cumulated noise level of 9 m/s$^2$ (line 4102) while it is about 0.9 m/s$^2$ with the fine-tooth motor (line 4104). This is a significant noise reduction, namely ten to one. The acoustic noise during acceleration (FIG. 42) also shows a significant noise reduction in average from 0.253 Pa ($\approx$82 dB) to 0.0156 Pa ($\approx$58 dB), showing about 16 to 1 reduction (line 4202 representing the conventional motor and line 4204 representing the fine-tooth motor). These significant overall noise reductions are also observed during constant velocity regions for both vibrational and acoustic noises, as shown by lines 4106, 4206 for the conventional motor and lines 4108, 4208 for the fine-tooth motor. This is because the fine-tooth motor contains, by design, less force harmonics so that the stage dynamics are not significantly excited in either the acceleration or constant velocity regions. Specifically, the major stage eigen-frequencies of 360 Hz, 500 Hz, and 630 Hz dominate the overall noise level when using a conventional motor. However, when the fine-tooth motor is used, these eigen-modes are less excited, as can be seen by the smaller jumps at those frequencies from the CAS's in FIGS. 41 and 42. The overall noise level is also smaller when using skewed magnets, as evidenced by lines 4110, 4112, 4210, 4212 for the conventional motor and lines 4114, 4116, 4214, 4216 for the fine-tooth motor. This is because skewing magnets helps reduce cogging and serves as a low-pass-filter for the rotor MMF to have less harmonics. Further demonstration of effects of skewing is described below and illustrated in FIGS. 45-47.

TABLE 3

| | Output | | | | | |
|---|---|---|---|---|---|---|
| | CA of Vibration Noise (Ratio) [m/s²] | | | CA of Acoustic Noise (Ratio) [Pa, dB] | | |
| Case | Acc/Decel. Region | | Const. Vel. Region | | Acc/Decel. Region | Const. Vel. Region |
| Tecnotion w/Non-skewed PM | 10.31 | (1) | 8.71 | (0.84) | 0.278≈83 dB (1) | 0.228≈81 dB (0.82) |
| Tecnotion w/ skewed PM | 7.67 | (0.74) | 6.41 | (0.62) | 0.227≈81 dB (0.82) | 0.167≈78 dB (0.60) |
| Finetooth w/Non-skewed PM | 1.14 | (0.11) | 0.89 | (0.09) | 0.019≈60 dB (0.07) | 0.019≈60 dB (0.07) |
| Finetooth w/Non-skewed PM | 0.58 | (0.06) | 0.56 | (0.05) | 0.012≈55 dB (0.04) | 0.010≈54 dB (0.04) |

In Table 3 above lists cumulated noise levels during both acceleration and constant velocity regions for each of the four motor types (i.e., conventional 3-4 combination motor by Tecnotion using non-skewed or skewed permanent magnets and fine-tooth motor using non-skewed or skewed permanent magnets). Note that the cumulative amplitude (CA) of vibrational noise has units of [m/s²], and the acoustic noise is in [Pa] and [dB]. The decibel value indicates the sound pressure level (SPL) calculated with respect to a reference pressure, $P_{ref}$=20 µPa. For instance, if we compare the acoustic noise level between the conventional motor and the fine-tooth motor both with non-skewed permanent magnets, the sound pressure level is decreased from 83 dB to 60 dB. Qualitatively speaking, this is the noise difference between a truck passing by and a quiet office, i.e., a large reduction. The table also shows ratio values within parentheses. For both vibrational and acoustic noises, the case of the conventional motor with non-skewed permanent magnets during an acceleration region is used as the reference. For example, the fine-tooth motor with skewed magnets has a vibrational noise reduction of 94% compared to the conventional motor with non-skewed magnets (i.e., a ratio change from 1 to 0.06).

Figure 43:
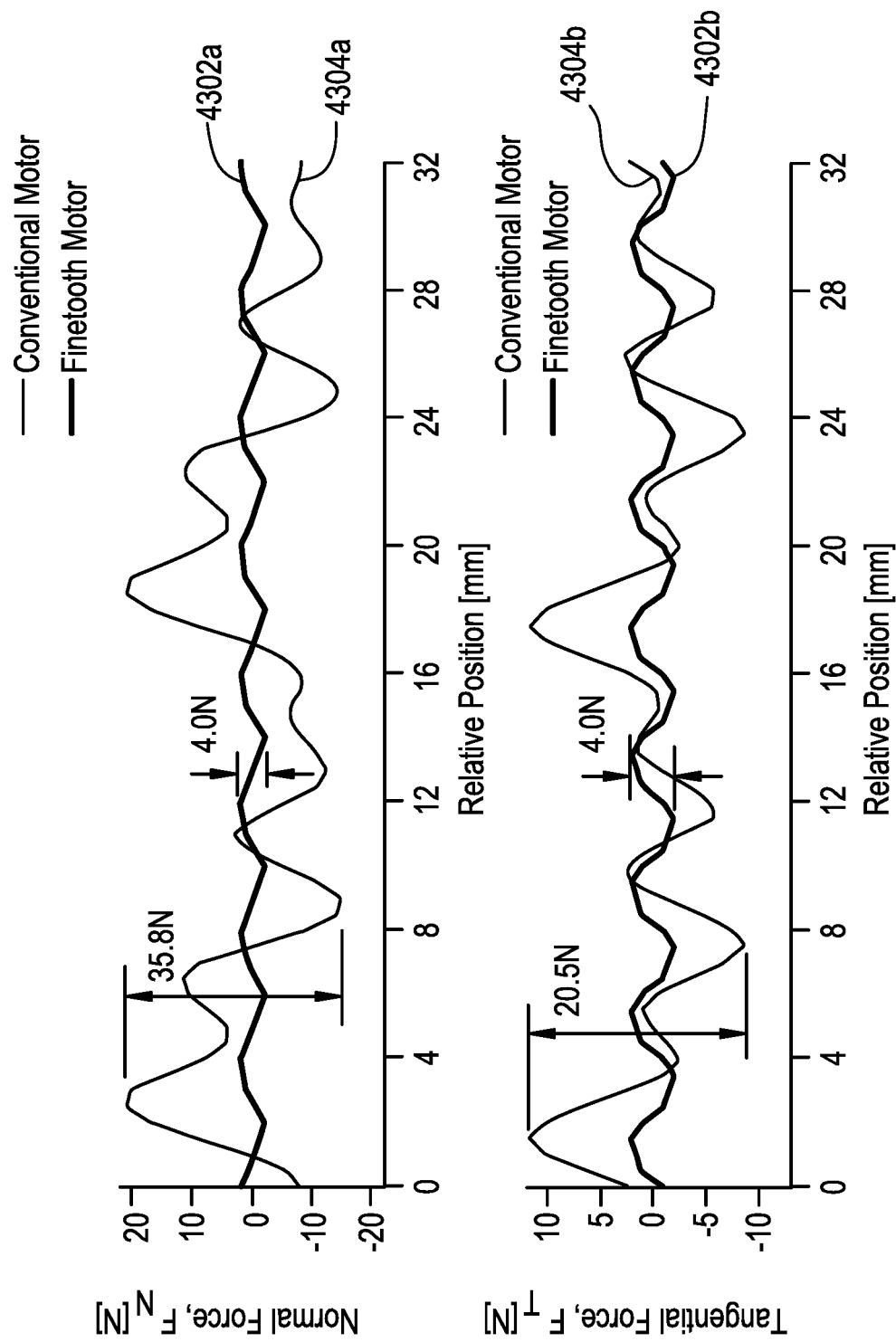
FIG. 43 is a plot of simulated force ripple in normal and tangential directions for one embodiment of a conventional iron-core linear motor and one embodiment of a fine-tooth iron-core permanent magnet linear motor.

FIG. 43 compares force ripples of one embodiment of a fine-tooth motor (using the design parameters of Table 2 above (lines 4302a, 4302b) to that of a conventional motor (lines 4304a, 4304b). The upper plot of FIG. 43 shows the force ripple in the normal direction and the lower plot shows the force ripple in the tangential direction. Note that skewed magnets are used for both motors in this case. As shown in FIG. 43, the fine-tooth motor generates smaller force ripple. More specifically, there is a significant peak-to-peak force ripple reduction with the ratio of 9-to-1 and 5-to-1 in the normal and tangential directions, respectively. The fine-tooth motor also contains less force harmonics from the spatial spectrum of the force ripples shown in FIG. 44, where the lines 4402a, 4402b represent the fine-tooth motor and the lines 4404a, 4404b represent the conventional motor. The conventional motor has a strong fundamental harmonic 4406 along with the second, third, and also fourth harmonics 4408, 4410, 4412 of significant amplitudes. On the other hand, the fine-tooth motor exhibits almost solely the fundamental harmonic 4414 without any notable high harmonics due to the smoother stator and rotor MMFs, as shown in FIG. 8.

Figure 45:
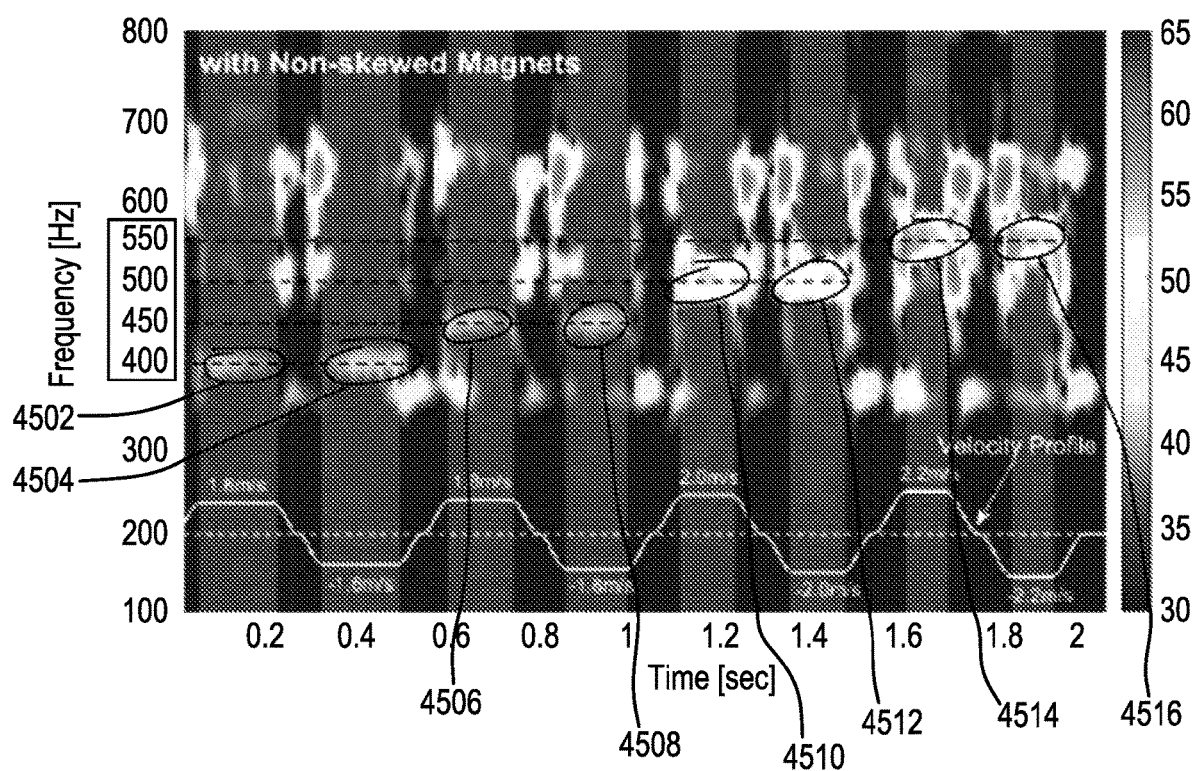
FIG. 45 is a spectrogram of acoustic noise of one embodiment of a fine-tooth iron-core permanent magnet linear motor with non-skewed magnets during increasing velocity cycles.
Figure 46:
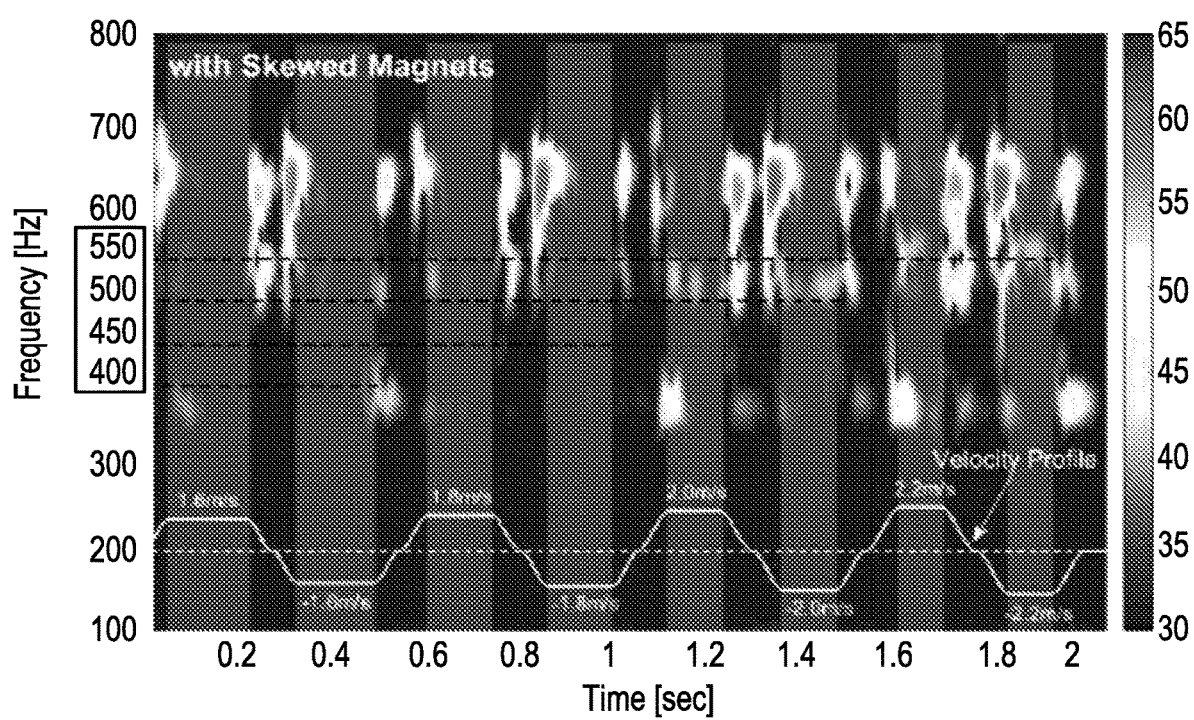
FIG. 46 is a spectrogram of acoustic noise of one embodiment of a fine-tooth iron-core permanent magnet linear motor with skewed magnets during increasing velocity cycles.

FIGS. 45-47 illustrate effects of utilizing skewed permanent magnets to reduce cogging-oriented and velocity-dependent noise with the fine-tooth motors described herein. Note that cogging is a force fluctuation caused by the magnetic interaction between the iron-core teeth and the magnets with no phase coils energized and is thus largely independent of excitation current. The above-described force ripple, on the other hand, is a force variation observed when the phase coils are energized and is thus approximately proportional to excitation current.

Figure 44:
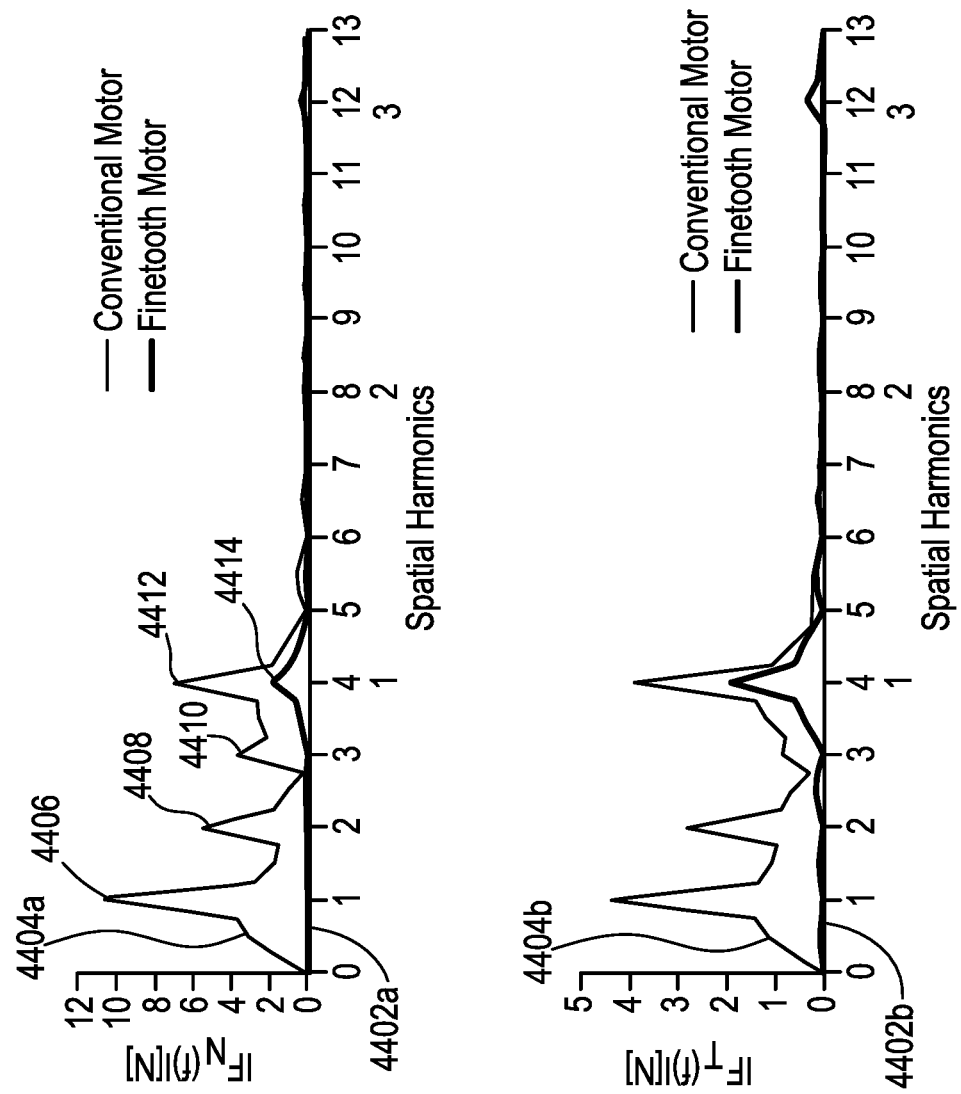
FIG. 44 is a plot of simulated force ripple spectrum in normal and tangential directions for one embodiment of a conventional iron-core linear motor and one embodiment of a fine-tooth iron-core permanent magnet linear motor.

In conventional motors with wider spacing, skewed magnets are designed to reduce the high cogging harmonics, but they do not address the fundamental cogging component. In order to reduce the fundamental cogging component, the skewing angle has to be large enough to have the magnet shift be the same as the full tooth pitch. In a conventional motor, this will result in significantly compromising the thrust because, in the above-described conventional motor configuration, maximum thrust is achieved when the magnets extend perpendicular to the movement direction and zero thrust is achieved when the magnets extend parallel to the movement direction. As a result of the thrust that would be lost, such large skew angles are not used in practice with conventional linear motors. And, even with skewed magnets, the force ripple of the conventional motor contains strong fundamental, second, third, and fourth harmonic components, as shown in FIG. 44. This is because the magnetic design of the conventional 3-4 combination motor contains high harmonics in the stator and rotor MMFs which generate high force harmonics. Accordingly, because the conventional magnetic design includes a large tooth pitch, using skewed magnets cannot significantly reduce the fundamental and some higher force harmonics of the conventional motor. This results in vibrating the stage and also radiating acoustic noise.

FIGS. 45 and 46 illustrate spectrograms of measured acoustic noise by one embodiment of a fine-tooth motor with non-skewed magnets (FIG. 45) and skewed magnets (FIG. 46). As can be seen in the figures, the noise behavior can be distinguished between the acceleration/deceleration regions (darker portions) and the constant velocity regions (brighter portions). In the acceleration periods, the noise by the stage dynamics excitations is dominant while it is the cogging noise that dominates during the constant velocity periods. With the non-skewed magnets, we observe the clear cogging noise with velocity-dependency, as highlighted by reference numerals 4502, 4504, 4506, 4508, 4510, 4512, 4514, 4516. With the skewed magnets, however, the cogging noise is significantly reduced due to the fine-tooth motor design.

Due to the advantage of having a fine tooth pitch, cogging can be reduced significantly without compromising thrust by only slightly skewing the magnets. In order for the skewed magnets to span the full tooth pitch of $\lambda_t$=4 mm with 52 mm-long magnets (in one embodiment), we can determine the skew angle to be a tan(4/52)≈4.4° (see Equation 18 above). The cogging force of one embodiment of a fine-tooth motor with skewed magnets (lines 4702a, 4702b) is compared to a case of non-skewed magnets (lines 4704a, 4704b) in FIG. 47. As can be seen from the figure, skewing significantly reduces cogging in both the normal and tangential directions. Specifically, the peak-to-peak amplitudes are reduced from 22.26 N (in the normal direction) and 28.62 N (in the tangential direction) to 2.22 N and 2.99 N, respectively. This is about a 10-to-1 reduction in both directions.

Figure 48:
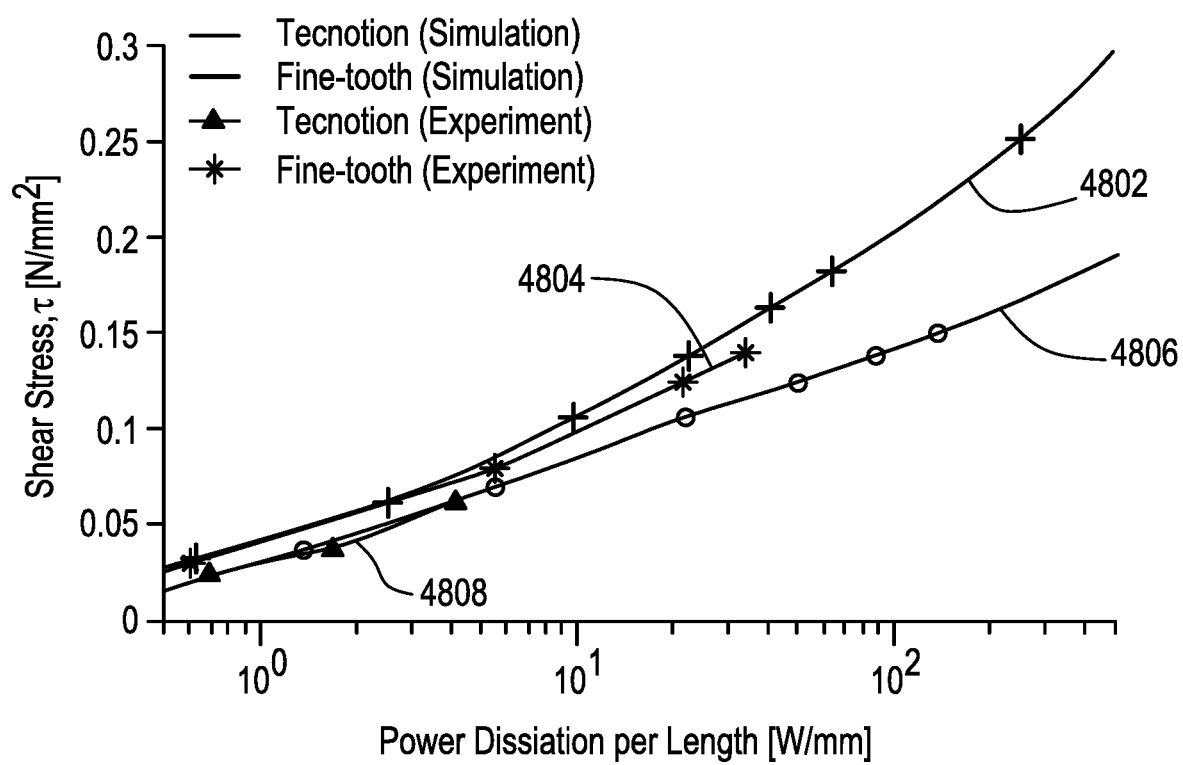
FIG. 48 is a plot of simulated and experimentally observed linear motor performance for one embodiment of a conventional iron-core linear motor and one embodiment of a fine-tooth iron-core permanent magnet linear motor.

In additional to the significant noise reduction discussed above, the fine-tooth motors described herein also achieve higher force performance than a conventional 3-4 combination iron-core motor. FIG. 48 illustrates curves showing simulated (line 4802) and experimentally observed (line 4804) force performance of a one embodiment of a fine-tooth linear motor in comparison to simulated (4806) and experimentally observed (4808) force performance of one embodiment of a conventional iron-core linear motor. The force performance is presented in FIG. 48 in terms of shear stress (N/mm²).

In the case of the simulated results, power dissipation is estimated with calculated coil resistances by the wire gauge (or cross-section area) and expected coil length. The estimated coil resistance of a fundamental unit is $R_{Tec,unit,cal}=2.58\Omega$ for the conventional motor and $R_{FT,unit,cal}=7.02\Omega$ for the fine-tooth motor. Note that the fundamental unit indicates a basic magnetic configuration required to generate thrust, which is a 3-coil-4-magnet combination length for the conventional motor and a one pole-pair length for the fine-tooth motor, as described above. In the case of the experimentally observed results, measured values of winding resistances are used to calculate power dissipation and plot the shear stress performance for both simulation and experimental results. The measured resistance values for a fundamental unit are $R_{Tec,unit,meas}=2.64\Omega$ and $R_{FT,unit,meas}=9.10\Omega$. The measured winding resistance of the fine-tooth motor is about 30% larger than the calculation while it is only 2% different for the conventional motor. This is due to the end-turn length, which is calculated as an arc in the simulation. The conventional motor has lumped (or shortest pitch) windings, so the actual end-turn length is well predicted with the arc assumption. However, with the fine-tooth motor, the end-turn has to be longer to cope with the coil overlapping caused by the double-layered full pitch windings over the narrow slots. In fact, the coils in the experimental embodiment were even longer to facilitate manufacturing and could be shortened in other embodiments.

Using the measured resistance values, the shear stress performance plots of FIG. 48 were obtained for both the simulated data and the experimental data. The experimental data points of the shear stress, $\tau$ versus the unit length power dissipation, $p_\lambda$ are obtained by Equations 19 and 20 below where $M_{stage}$, $M_{PM}$, $a_p$, A, $P_{diss}$, $I_p$, and $\lambda_u$ are the stage structure mass, moving magnets mass, peak acceleration, thrust-generating area, instantaneous power dissipation, peak current, and fundamental unit length, respectively. Note that the thrust force is calculated with the total moving mass multiplied by the peak acceleration, which is achieved at the peak current. This peak current value is then used to calculate the unit length power dissipation. Note also that skewed magnets are used for both motor types.

$$\tau = \frac{F_{thrust}}{A} = \frac{(M_{stage}+M_{PM})a_p}{A}[N/mm^2] \qquad \text{Eq. 19}$$

-continued $$p_\lambda = \frac{p_{diss}}{\lambda_u} = \frac{I_p^2 R_{unit}}{\lambda_u}[W/mm] \qquad \text{Eq. 20}$$

Returning to the plot of FIG. 48, note that the data points for the conventional motor are limited to relatively low power because this motor emitted too much vibro-acoustic noise even at a relatively low power level and was therefore not run at higher power levels. The data points for the fine-tooth motor, on the other hand, are limited by the thermal and travel length limits. The experimental results of the conventional motor agree well with simulated results while there is discrepancy with the fine-tooth motor as the power level increases. This is likely due to a saturation limit difference between the simulation and the actual material used. Despite this discrepancy, however, the fine-tooth motor behaves closely to the simulation results, showing higher force performance than the conventional motor. Given that material saturation and leakage issues can be mitigated by using different materials (e.g., a cobalt-iron, such as Hyperco50) for the stator material rather than silicon-iron (M-19), as discussed connection with Table 2 above, it is expected that more force potential can be achieved from the fine-tooth motor in other embodiments, especially for a higher power range.

In summary, acoustic noise of linear iron-core motors is caused by mechanical vibration of the moving stage, which is excited by magnetic force fluctuations. In other words, high force harmonics mechanically vibrate the moving stage and this vibration radiates the acoustic noise. Forces exerted on the moving stage include magnetic force generated by energizing phase currents to achieve necessary accelerations and to overcome any force disturbance (e.g., cogging) and magnetic force disturbance, which is mostly cogging caused by the magnetic interaction between iron-core teeth and permanent magnets. Generated force contains various spatial harmonics depending on the motor magnetic design. These spatial force harmonics can be transferred to temporal harmonics through stage velocity. Magnetically generated force is, in general, dominant during acceleration and deceleration periods. Force disturbance can be represented by cogging force when the stage cycles without any friction or load. This cogging force may also contain spatial harmonics depending on the geometric relation of magnetic components, which can also be transmitted to temporal harmonics by stage velocity. Cogging force generally dominates during constant velocity regions.

Conventional 3-4 combination iron-core motors contain high force harmonics caused by their coarse-tooth design. These force harmonics are generated throughout a whole cycle to achieve a required acceleration during acceleration regions and to overcome the cogging force during constant velocity periods. Stage dynamics are excited for both regions due to these high harmonics in the magnetically generated force. Even with skewed magnets, a significant amount of cogging still remains to be overcome by magnetic forces, thereby also exciting stage eigen-modes. Vibro-acoustic noise from the stage dynamics excitation dominates the noise over a whole stage cycle period so that the motor noise caused by cogging is not noticeable during constant velocity regions.

The fine-tooth motors described herein generate less force harmonics due to their fine-tooth design. This is why the stage eigen-modes are less excited and the overall noise level is significantly reduced. With non-skewed magnets, a clear distinction on the motor noise can be observed: the stage dynamics noise for acceleration regions and the cogging-oriented noise for constant velocity regions. The cogging noise also shows velocity dependency so that it can be heard at several different noise pitches as the stage velocity changes. Using skewed magnets in combination with fine-tooth pitch can significantly reduce cogging noise in both acceleration and constant velocity regions. This noise reduction can be evidenced by a lack of noise pitch changes when the stage is cycled at different velocities. Results from testing an embodiment of a fine-tooth linear motor as described herein shows significant vibro-acoustic noise reduction compared to the conventional iron-core motor, about 90% in average. Motor vibro-acoustic noises can likely be further reduced in both acceleration and constant velocity regions by use of a double-sided configuration that can perfectly cancel force disturbances in a direction normal to a movement axis. The fine-tooth motors described herein also show higher force capability, namely higher shear stress per unit power, than conventional iron-core linear motors. The fine-tooth motor therefore has a greater potential for high-power and high-current-density applications, e.g., those required in a lithography scanner, high speed transportation, high throughput conveyance systems, high throughput cutting machines, high accuracy printers, high throughput additive manufacturing systems, robotics, and any other systems that require high throughput (i.e., high acceleration/speed and accuracy).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A linear motor, comprising:
a first component having an armature including a plurality of core teeth separated by slots and surrounded by coil windings, wherein the coil windings include a plurality of phase windings each wired in series to have alternating polarities, wherein a coil of one or more of the plurality of phase windings overlaps with coils of other ones of the plurality of phase windings, wherein the coil windings include coils wound from a bottom half of a first slot to a top half of a second slot, wherein there are one or more slots located between the first and second slot; and
a second component having a plurality of permanent magnets with alternating polarity;
wherein the first component and the second component are adjacent and configured to translate relative to one another along a movement axis;
wherein the plurality of core teeth are spaced apart from one another by an iron core pitch distance and the plurality of permanent magnets are spaced apart from one another by a permanent magnet pole pitch distance;
wherein a ratio of the iron core pitch distance to the permanent magnet pole pitch distance is less than or equal to 0.2.

2. The linear motor of claim 1, wherein the first component is stationary and the second component is configured to translate relative to the first component.

3. The linear motor of claim 1, wherein the second component is stationary and the first component is configured to translate relative to the second component.

4. The linear motor of claim 1, wherein the first component has a length extending along the movement axis that is greater than a length of the second component extending along the movement axis.

5. The linear motor of claim 1, wherein the second component has a length extending along the movement axis that is greater than a length of the first component extending along the movement axis.

6. The linear motor of claim 1, wherein the plurality of permanent magnets are arranged in a Halbach array.

7. The linear motor of claim 1, wherein a longitudinal axis of each of the plurality of permanent magnets is normal to the movement axis.

8. The linear motor or claim 1, wherein a longitudinal axis of each of the plurality of permanent magnets is oblique to the movement axis.

9. The linear motor of claim 8, wherein an angle ($\alpha$) between the longitudinal axis of each permanent magnet and the movement axis is based on the iron core pitch distance ($\tau_I$) and a depth of the armature (D) such that:

$$\alpha = 90 - \tan^{-1}\frac{\tau_t}{D}.$$

10. The linear motor of claim 8, wherein an angle between the longitudinal axis of each permanent magnet and the movement axis is between about 80 degrees and about 90 degrees.

11. The linear motor of claim 10, wherein the angle is about 85.6 degrees.

12. The linear motor of claim 1, further comprising a power source coupled to the coil windings and configured to selectively energize the coil windings to cause relative movement of the first component and the second component.

13. The linear motor of claim 1, wherein the coil windings include a plurality of separate phase windings.

14. The linear motor of claim 1, wherein the coil windings include greater than three phase windings.

15. The linear motor of claim 1, wherein the coil windings include five phase windings.

16. The linear motor of claim 1, wherein the plurality of permanent magnets are disposed on a surface of the second component; and
wherein the first component and the second component are arranged such that the surface of the second component having the plurality of permanent magnets faces the armature of the first component.

17. The linear motor of claim 16, further comprising:
a third component having a second armature including a second plurality of core teeth surrounded by coil windings; and
a second plurality of permanent magnets with alternating polarity disposed on an opposite surface of the second component from the surface having the plurality of permanent magnets;
wherein the second component is disposed between the first component and the third component such that each of the armatures faces one of the plurality of permanent magnets disposed on the second component.

18. The linear motor of claim 16, further comprising:
a third component having a second plurality of permanent magnets with alternating polarity disposed on a surface thereof;

wherein the first component is disposed between the second component and the third component.

19. A method of reducing acoustic noise and vibration in a linear motor, comprising:
providing a first component having a plurality of core teeth separated by slots and surrounded by coil windings, wherein the coil windings include a plurality of phase windings each wired in series to have alternating polarities, wherein a coil of one or more of the plurality of phase windings overlaps with coils of other ones of the plurality of phase windings, wherein the coil windings include coils wound from a bottom half of a first slot to a top half of a second slot, wherein there are one or more slots located between the first and second slot;
providing a second component adjacent to the first component, the second component having a plurality of permanent magnets with alternating polarity; and
selectively energizing the coil windings to cause relative translation of the first component and the second component along a movement axis;
wherein the plurality of core teeth are spaced apart from one another by an iron core pitch distance and the plurality of permanent magnets are spaced apart from one another by a permanent magnet pole pitch distance;
wherein a ratio of the iron core pitch distance to the permanent magnet pole pitch distance is less than or equal to 0.2.

20. The method of claim 19, further comprising skewing each of the plurality of permanent magnets such that a longitudinal axis of each permanent magnet is oblique to the movement axis.

21. The method of claim 20, wherein an angle between the longitudinal axis of each permanent magnet and the movement axis is about 85.6 degrees.

22. The method of claim 19, further comprising:
providing a second plurality of permanent magnets with alternating polarity on an opposite side of the second component from the plurality of permanent magnets; and
positioning a third component having a second plurality of core teeth surrounded by coil windings such that the second component is disposed between the first component and the third component and each of the armatures faces one of the plurality of permanent magnets of the second component to balance forces normal to the movement axis.

23. The method of claim 19, further comprising:
providing a third component having a second plurality of permanent magnets with alternating polarity; and
positioning the third component such that the first component is disposed between the second component and the third component.

24. A linear motor, comprising:
a first component having an armature including a first winding region having N core teeth and a second winding region having N core teeth, the armature further including N phase winding coils wound around lower portions of corresponding ones of the N core teeth of the first winding region and upper portions of corresponding ones of the N core teeth of the second winding region, wherein N is greater than or equal to five; and
a second component having a plurality of permanent magnets with alternating polarity;
wherein the first component and the second component are adjacent and configured to translate relative to one another along a movement axis;
wherein the plurality of core teeth are spaced apart from one another by an iron core pitch distance and the plurality of permanent magnets are spaced apart from one another by a permanent magnet pole pitch distance;
wherein a ratio of iron core pitch distance to the permanent magnet pole pitch distance is less than or equal to 0.2.

25. The linear motor of claim 24, wherein the armature further includes a third winding region having N core teeth, the N phase winding coils wound around lower portions of the corresponding ones of the N core teeth of the second winding region and upper portions of corresponding ones of the N core teeth of third winding region, the windings around the core teeth of the second and third winding regions being in a direction opposite that of the windings around the core teeth of the first and second winding regions.

26. The linear motor of claim 25, wherein ones of the N phase winding coils are wired across the first, second, and third winding regions to be energized using a single pair of lead wires.

27. The linear motor of claim 25, wherein the first, second, and third winding regions are ones of a plurality of winding regions of a winding section, wherein ones of the N phase winding coils are wired across the winding section to be energized using a single pair of lead wires, wherein the winding section includes at least nine winding regions.

28. The linear motor of claim 27, wherein the winding section is one of a plurality of winding sections of the armature, wherein the armature includes at least four winding sections.

* * * * *